(12) United States Patent
Kamen, Jr. et al.

(10) Patent No.: US 10,730,763 B2
(45) Date of Patent: *Aug. 4, 2020

(54) APPARATUS, SYSTEM AND METHOD FOR RESOURCE DISTRIBUTION

(71) Applicant: DEKA Products Limited Partnership, Manchester, NH (US)

(72) Inventors: Dean Kamen, Jr., Bedford, NH (US); Matthew A. Norris, Londonderry, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,177

(22) Filed: Jul. 9, 2018

(65) Prior Publication Data
US 2019/0169045 A1 Jun. 6, 2019

Related U.S. Application Data

(63) Continuation of application No. 14/031,559, filed on Sep. 19, 2013, now Pat. No. 10,017,399, which is a
(Continued)

(51) Int. Cl.
| | |
|---|---|
| *C02F 1/18* | (2006.01) |
| *F01K 17/04* | (2006.01) |
| *B01D 1/00* | (2006.01) |
| *C02F 1/16* | (2006.01) |
| *B01D 5/00* | (2006.01) |

(Continued)

(52) U.S. Cl.
CPC ............ *C02F 1/18* (2013.01); *B01D 1/0035* (2013.01); *B01D 5/006* (2013.01); *C02F 1/04* (2013.01); *C02F 1/14* (2013.01); *C02F 1/16* (2013.01); *E04H 1/1205* (2013.01); *E04H 1/1222* (2013.01); *E04H 3/02* (2013.01); *E04H 3/08* (2013.01); *E04H 9/10* (2013.01); *F01K 17/04* (2013.01); *C02F 1/041* (2013.01); *E04H 2001/1283* (2013.01); *H02J 7/0027* (2013.01); *Y02A 20/212* (2018.01); *Y02W 10/37* (2015.05)

(58) Field of Classification Search
CPC ....... F01K 17/04; B01D 5/006; B01D 1/0035; C02F 1/16; C02F 1/14; C02F 1/04; C02F 1/041; E04H 9/10; E04H 3/08; E04H 3/02; E04H 1/1222; E04H 1/1205; E04H 2001/1283; Y02A 20/212; Y02W 10/37; H02J 7/0027

See application file for complete search history.

(56) References Cited

U.S. PATENT DOCUMENTS

| | | | | |
|---|---|---|---|---|
| 6,393,775 B1* | 5/2002 | Staschik | .................. | C02F 9/00 210/170.08 |
| 2006/0033674 A1* | 2/2006 | Essig, Jr. | ............... | B01D 61/06 343/912 |

(Continued)

*Primary Examiner* — Patrick Hamo
*Assistant Examiner* — Wesley G Harris
(74) *Attorney, Agent, or Firm* — Michael Norris

(57) ABSTRACT

A system for the distribution of resources. The system includes a housing, at least one power generation source connected to the housing, a power control and distribution system and at least one water distillation device, wherein power from at least one power generation source powers that at least a water distillation device.

20 Claims, 54 Drawing Sheets

Related U.S. Application Data continuation-in-part of application No. 13/793,552, filed on Mar. 11, 2013, now Pat. No. 9,936,596.

(60) Provisional application No. 61/703,015, filed on Sep. 19, 2012, provisional application No. 61/866,350, filed on Aug. 15, 2013.

(51) Int. Cl.
| | |
|---|---|
| *E04H 1/12* | (2006.01) |
| *E04H 3/02* | (2006.01) |
| *E04H 3/08* | (2006.01) |
| *E04H 9/10* | (2006.01) |
| *C02F 1/04* | (2006.01) |
| *C02F 1/14* | (2006.01) |
| *H02J 7/00* | (2006.01) |

(56) References Cited

U.S. PATENT DOCUMENTS

| | | | |
|---|---|---|---|
| 2008/0133181 A1* | 6/2008 | Kamen | B01D 1/0035 702/188 |
| 2010/0200476 A1* | 8/2010 | Mayuzumi | C01B 3/34 210/97 |
| 2011/0175444 A1* | 7/2011 | Yunes | F01K 13/00 307/23 |

* cited by examiner

APPARATUS, SYSTEM AND METHOD FOR RESOURCE DISTRIBUTION

CROSS REFERENCE TO RELATED APPLICATIONS

The present application is a Continuation Application of U.S. patent application Ser. No. 14/031,559, filed Sep. 19, 2013 and entitled Apparatus, System and Method for Resource Distribution, now U.S. Pat. No. 10,017,399, issued Jul. 10, 2018, which is a Continuation-in-Part application of U.S. patent application Ser. No. 13/793,552, filed Mar. 11, 2013 and entitled Apparatus, System and Method for Resource Distribution, now U.S. Pat. No. 9,936,596, issued Apr. 3, 2018, which claims the benefit of U.S. Provisional Patent Application Ser. No. 61/703,015, filed Sep. 19, 2012 and entitled Apparatus, System and Method for Resource Distribution, each of which is hereby incorporated herein by reference in its entirety.

U.S. patent application Ser. No. 14/031,559, is also a Nonprovisional application which claims the benefit of U.S. Provisional Patent Application Ser. No. 61/866,350, filed Aug. 15, 2013 and entitled Apparatus, System and Method for Resource Distribution, which is hereby incorporated herein by reference in its entirety.

FIELD OF INVENTION

The present disclosure relates to resource distribution. More particularly, the present disclosure relates to an apparatus, system and method for resource distribution.

BACKGROUND

Dependable access to the resources necessary to sustain life and foster prosperity eludes vast portions of humanity. Even in well developed areas of the world, natural disasters have demonstrated such access can be erased in little time at all. In some instances, e.g. military operations, the ability to easily create this access is extremely important.

According to the Canadian International Development Agency, about 1.2 billion people lack access to safe drinking water. The UN reports that a full 1.6 billion people lack electricity. Again, according to the UN, nearly one billion people lack access to the most basic of health services and about 3 times that number live on less than two dollars per day. Reports attribute tens of millions of deaths each year to entirely preventable water related diseases alone. Sadly, many of these deaths are children. Illness caused by water related disease affects even more and often leads to missed schooling and work. By improving dependable access to life sustaining and prosperity fostering resources the well being of billions of people throughout the world could be improved. Moreover, these people would be enabled to contribute trillions of dollars to the global economy every year.

Many means of providing such access are well known, however, these means are significantly obstructed in situations where infrastructure is either minimal or has been destroyed. Some solutions to these problems require large numbers of consumables such as filters and chemicals which can be costly and are hard to import into an isolated location. Some require highly skilled operators or constant maintenance by a trained technician. Others only address, for example, the water quality or medical aspect of the problem. Additionally, known solutions do not offer the dependent population a way to foster economic activity. Known solutions are also not easily adaptable to the differing needs of different areas, populations, or situations. Another issue with existing solutions is that they rely on donated funding and are therefore limited. Many solutions provide free services which in effect may actually stifle economic growth because a local entrepreneur who desires to offer such services will not be able to compete with the free nature of the services.

The ability to provide these necessary resources from a single locus without the need for large quantities of consumables or skilled staff while at the same time providing a hub for economic activity is, accordingly, acutely desirable. Additionally desirable is the ability to easily tailor such a locus to the needs of any given area, population, or scenario. Ideally such a solution should be self sustainable and economically profitable at the local, regional, and global level.

SUMMARY

In accordance with an embodiment of the present disclosure, a system for the distribution of resources is disclosed. The system includes a housing, at least one power generation source connected to the housing, a power control and distribution system and at least one water distillation device, wherein power from at least one power generation source powers that at least a water distillation device.

Some embodiments of this aspect of the invention include one or more of the following. Wherein the system further includes a water distillation system including a first product reservoir, at least one source reservoir, a first plumbing line connected to the water distillation device, the first plumbing line feeds into a second plumbing line, wherein the second plumbing line is connected to the first product reservoir, wherein water from the at least one source reservoir is distilled by the water distillation device to produce product water, and wherein the first plumbing line is located higher in elevation than the second plumbing line. Wherein the second plumbing line comprising a valve. Wherein the system further includes a second product reservoir. Wherein the system further includes a third plumbing line connected to the first plumbing line and the second product reservoir. Wherein the third plumbing line comprising a valve. Wherein the first product reservoir comprising a water liquid level sensor. Wherein the first product reservoir comprising a water line connected to a check valve. Wherein the at least one source reservoir comprising at least two liquid level sensors. Wherein the at least one power generation source is a Stirling generator. Wherein the system further includes at least one energy storage device. Wherein the at least one energy storage device is a battery bank. Wherein the at least one power generation source is at least one solar panel. Wherein the system further includes at least one communications tower. Wherein the system further includes a charging station configured to charge at least one portable power source.

In accordance with an embodiment of the present disclosure, a water distillation system is disclosed. The water distillation system includes a first product reservoir, at least one source reservoir, a water distillation device, wherein water from the at least one source reservoir is distilled by the water distillation device to produce product water, and a first plumbing line connected to the water distillation device, the first plumbing line feeds into a second plumbing line, wherein the second plumbing line is connected to the first product reservoir, wherein the first plumbing line is located higher in elevation than the second plumbing line.

Some embodiments of this aspect of the invention include one or more of the following. Wherein the second plumbing line comprising a valve. Wherein the system further includes a second product reservoir. Wherein the system further includes a third plumbing line connected to the first plumbing line and the second product reservoir. Wherein the third plumbing line comprising a valve. Wherein the first product reservoir comprising a water liquid level sensor. Wherein the first product reservoir comprising a water line connected to a check valve. Wherein the at least one source reservoir comprising at least two liquid level sensors.

In accordance with an embodiment of the present disclosure, a system for the distribution of resources is disclosed. The system includes a housing including at least one water distillation device, at least one power generating device, at least one source water reservoir, at least one product water reservoir, and at least one energy storage device.

Some embodiments of this aspect of the invention include one or more of the following. Wherein the at least one power generating device is a Stirling generator. Wherein the at least one power generating device is a solar power generating device. Wherein the system for the distribution of resources further comprising a refrigerator. Wherein the refrigerator includes a general section, and a medical refrigeration section, the medical refrigeration section segregated from the rest of the general section. Wherein the system further including at least one oven. Wherein the oven is heated by waste heat from the power generating element. Wherein the housing comprising a shipping container. Wherein the at least one energy storage device is a fuel storage tank. Wherein the at least one energy storage device is a battery bank. Wherein the power generating device supplies power to an electrical grid. Wherein the system includes at least one communications tower. Wherein the system further includes a charging station configured to charge at least one portable power source.

In accordance with an embodiment of the present disclosure, a system for the distribution of resources is disclosed. The system includes a housing including a first compartment, the first compartment including at least one water distillation device, the water distillation device in fluid communication with a source water reservoir and a product water reservoir, a second compartment, the second compartment including at least one fuel requiring element providing electrical power to the at least one water distillation device, at least one refrigeration apparatus, at least one oven, wherein the at least one oven connected to the fuel requiring element wherein the waste heat from the fuel requiring element is transferred to the at least one oven, and a fuel reservoir in fluid communication with the fuel requiring element.

Some embodiments of this aspect of the disclosure include one or more of the following. Wherein the at least one fuel requiring element is a Stirling generator. Wherein the system further includes at least one energy storage device. Wherein the at least one energy storage device is a battery bank. Wherein the system further includes at least one solar panel. Wherein the system for the distribution of resources further includes at least one communications tower. Wherein the system further includes a charging station configured to charge at least one portable power source.

In accordance with an embodiment of the present disclosure, a system for the distribution of resources is disclosed. The system includes a housing including at least one water distillation apparatus, at least one power generating device, at least one source water tank, at least one product water tank, and at least one fuel tank.

In accordance with an embodiment of the present disclosure there is a kiosk for the distribution of resources. The kiosk may be used in many situations and locations, including, but not limited to, in emergency/disaster relief applications, military applications, and/or as an entrepreneurial micro-business. In some embodiments, the kiosk includes a water purification device. The water purification device is fluidly connected to a source water reservoir and a product water reservoir. The kiosk also includes at least one refrigeration apparatus. Some embodiments of the refrigeration apparatus includes at least one compartment. The kiosk also includes at least one heating element. The kiosk also includes a fuel requiring element and fuel reservoir connected to the fuel requiring element. The fuel requiring element provides power to at least the water purification device and the at least one refrigerator.

In accordance with other embodiments of the kiosk, the kiosk includes a water purification device which is a vapor compression water distillation device. In some embodiments at least one of the refrigerators includes a medical refrigeration compartment/section. In some embodiments the power generating element powering is a Stirling engine generator. In some embodiments, the power generating element may also power one or more other devices. Other devices may include, but are not limited to, one or more of the following: a TV, speakers serving as the audio output of the TV, lighting, at least one computer, a cellular communications tower, a charging station for chargeable devices, and an electrical mini-grid. In some embodiments, at least the TV screen is protected by a transparent panel which may be, in some embodiments, a ½" thick polycarbonate panel, however, in other embodiments, the thickness of the panel and/or the material the panel is made from may vary. In embodiments including a computer, the computer may be connected to the internet. In some embodiments, the kiosk may include at least one heating element. In some embodiments, the heating elements may be an oven. In these embodiments, the oven may be heated with the waste heat of the power generating element and may include a means for controlling the flow of waste heat to the oven. Some embodiments also include a teaching area and/or a medical clinic In some embodiments the kiosk includes a housing. In some embodiments, the housing is a shipping container. Some embodiments of the housing may include, but are not limited to, one or more of the following characteristics/functions/elements: at least one door, water tight, and ventilation.

In accordance with some embodiments, the kiosk may include, but is not limited to, one or more of the following: a means to fill the source water reservoir; a means to dispense product water from the product water reservoir; a spigot to dispense product water from the product water reservoir; at least one refrigerator comprising at least one cooled product water reservoir, and a component with a monetarily operated mechanism.

These and other aspects of the disclosure are not meant to be exclusive and other features, aspects, and advantages of the present disclosure will be readily apparent to those of ordinary skill in the art when read in conjunction with the appended claims and accompanying drawings.

BRIEF DESCRIPTION OF THE DRAWINGS

These and other aspects will become more apparent from the following detailed description of the various embodiments of the present disclosure with reference to the drawings wherein.

Like reference symbols in the various drawings indicate like elements.

DETAILED DESCRIPTION

Figure 1:
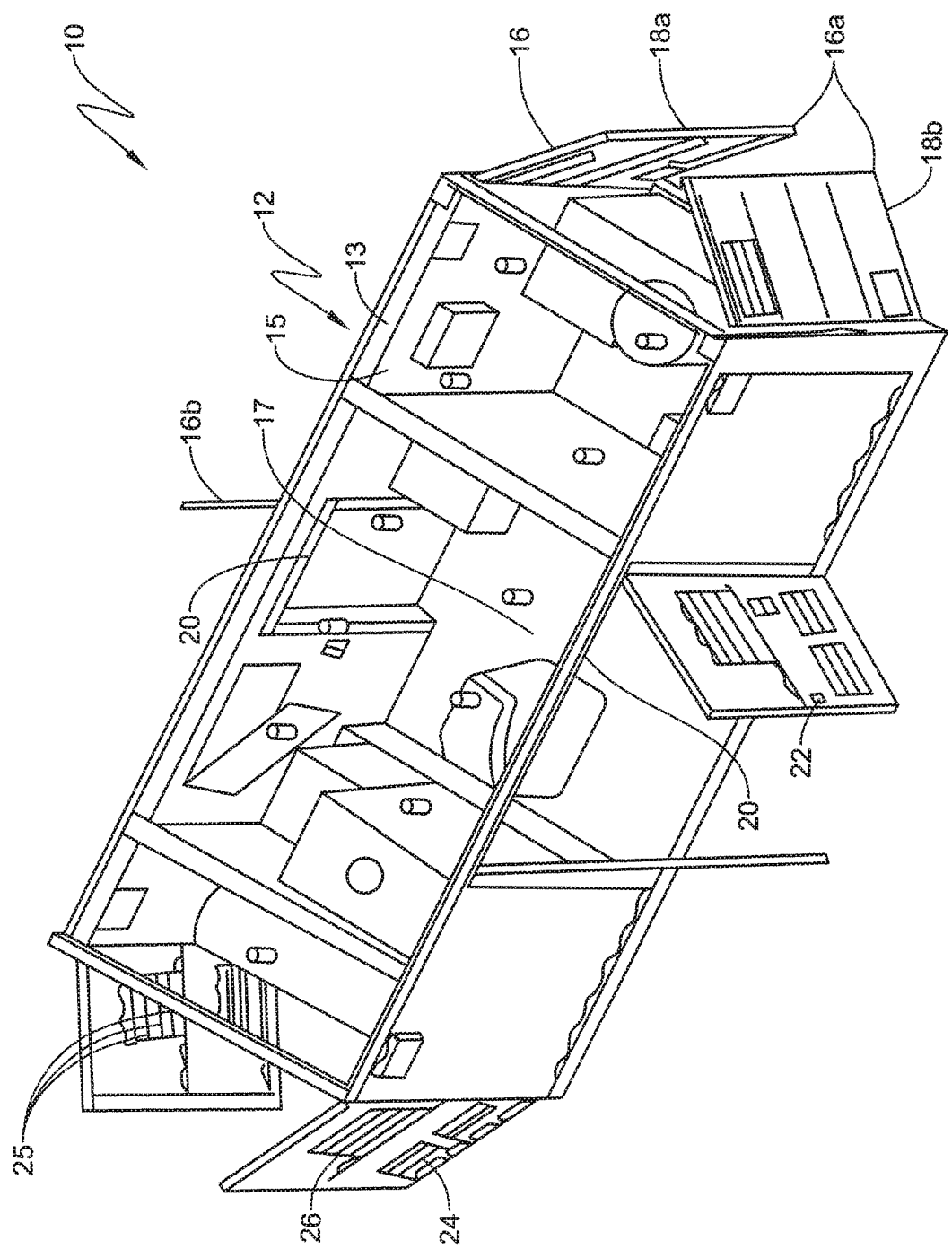
FIG. 1 is a view of a kiosk for resource distribution in accordance with one embodiment of the present disclosure.

Referring now to FIG. 1, an example embodiment of an apparatus for resource distribution 10 is depicted. The term "kiosk" may be used throughout to refer to one or more embodiments of the apparatus and system. The kiosk for resource distribution 10 may be used to provide a large range of resources, services, etc. to a surrounding population. Additionally, the kiosk for resource distribution 10 may include a number of shared elements, components, resources, etc. in close proximity to one another. In some embodiments, the elements, components, resources, etc. within the kiosk for resource distribution 10 may leverage off one another and work in a symbiotic relationship with one another. This may allow for expanded functionality, capabilities, usage, and improved overall efficiency of the kiosk for resource distribution 10.

Figure 2:
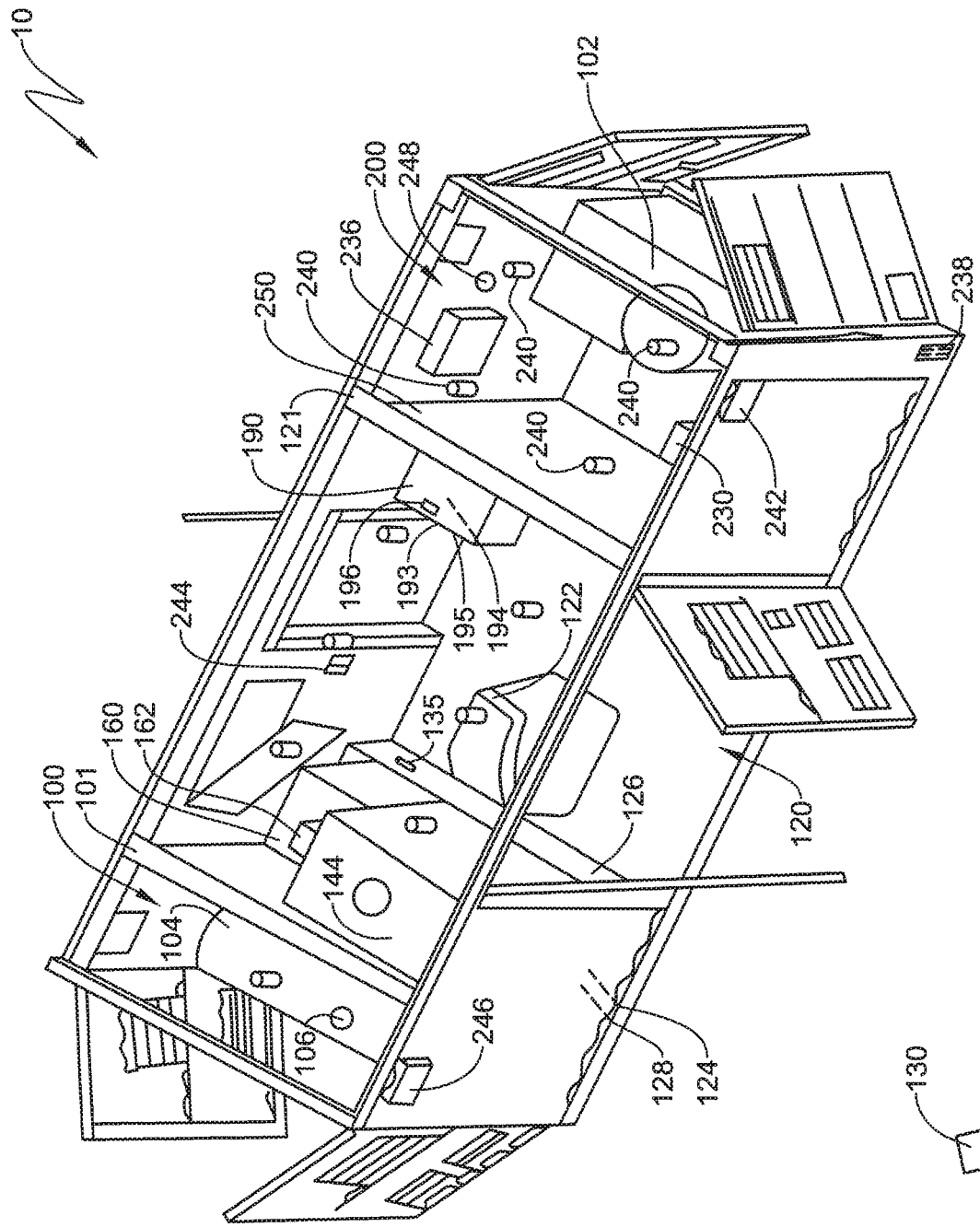
FIG. 2 is a view of a kiosk for resource distribution in accordance with one embodiment of the present disclosure.

The example kiosk for resource distribution 10 in FIG. 1 includes a housing 12. In the embodiments illustrated in, for example, FIGS. 1-3, the housing 12 is shown as a shipping container. However, in various other embodiments, the housing 12 may not be a shipping container and therefore may include proportions that are different than those shown herein. In addition, in various embodiments where the kiosk 10 housing 12 is a shipping container, the shipping container may be any sized shipping container. In some embodiments, including, for example, the embodiments shown in FIGS. 1-3, the container may be a 20'×8'×8' steel shipping container weighing approximately 4000 lbs. In alternate embodiments, any other variety of shipping containers may be used, for example, a 10×8×8 shipping container. In some embodiments the housing 12 may be any number of shipping containers of any suitable size or sizes. Referring now also to FIGS. 6-10, as shown the housing 12 may also include any other suitable structure such as, but not limited to, a vehicle, building, veranda, pavilion, gazebo, or the like. In some embodiments, the housing 12 may be water tight or made water tight for shipping, inclement weather, or any other occasion where a water tight housing 12 may be desirable. In various embodiments, a footing or footings (not shown) may be provided for the housing 12 of the kiosk for resource distribution 10. The footing or footings may, for example, be concrete.

In various embodiments, the housing may include insulation 13. The insulation 13 may be added for temperature moderation purposes. In some embodiments, the insulation 13 may be disposed about all interior surfaces of the housing 12 including the doors 16 (described in greater detail below). In some embodiments, the insulation 13 may be about 3.5 inch thick closed cell spray foam with an R-21 insulation factor. Other embodiments may use other types of insulation which may have differing R factors. In some embodiments, the insulation 13 may also exist in any desirable thickness. In some embodiments, the insulation 13 may be foam board insulation. In some embodiments, the insulation 13 may be made of recycled materials. In various embodiments, the insulation 13 may have one or more other desirable qualities, which include, but are not limited to, one or more of the following: sound reducing qualities. In some embodiments where noise levels may be a consideration, the housing 12 may also be fitted with soundproofing (not shown).

In some embodiments, the interior of the housing 12 may include a wall material 15. In embodiments where the housing 12 includes insulation 13, the wall material 15 may cover the insulation 13. The wall material 15 may be any suitable wall material 15, such as, but not limited to, drywall, cement board, tile, metal, plastic or plywood. Plywood or plastic may be desirable for a number of reasons, including, but not limited to, use of plywood or plastic as a wall material 15 allows easy customization and modification of the housing 12 interior. In embodiments utilizing plywood, the plywood may be finished with, for example, polyurethane to provide mold and rot protection. The wall material 15 may also be used for the ceiling of the kiosk for resource distribution 10. In some specific embodiments, steel framing members (not shown) may be included to provide an attachment point for the wall material 15 and to help support a ceiling of the kiosk for resource distribution 10.

The housing 12 may also include flooring 17 which covers the floor portion of the interior of the housing 12. The flooring 17 may be made of any of a variety of materials including, but not limited to wooden boards or planks, metal, tile, ceramic, carpet, laminate, vinyl, plywood, plastic, metal, etc. In an exemplary embodiment of the housing 12, the flooring 17 may be made from about 1" thick plywood panels. In such embodiments, the flooring 17 may be finished with a clear polyurethane or clear epoxy finish. In some embodiments, one or more different types of flooring 17 may be used within the housing 12.

The housing 12 may also include one or more, or a plurality of doors 16. The one or more doors 16 may be situated anywhere on the housing 12. In the embodiment depicted in FIG. 1, the one or more doors 16 are located generally in the center of the long sides of the housing 12 and, additionally, each of the ends of the housing 12 include doors 16. Some embodiments may only include doors 16 on one end of the housing 12. In various embodiments, the door(s) 16 may take any of a variety of forms.

In the embodiment shown in FIG. 1, three of the doors 16 are barn-style doors 16a. The barn-style doors 16a may be located on both ends of the housing 12 and on one of the long sides of the housing 12. Some embodiments of the barn-style doors 16a include a right panel 18a and a left panel 18b (directions given refer to orientations depicted in figure being discussed). The panels 18a and 18b are pivotally coupled to their respective right and left vertical spans of the door frame 20. The barn-style doors 16a may swing from a closed position to an open position. In the closed position (not shown) the right 18a and left 18b panels of the barn-style door 16a are fully pivoted toward the vertical centerline of the plane of the door frame 20. In this position, the barn-style doors 16a cover the opening to the inside of the housing 12 and preclude an individual from gaining entry to the interior of the housing 12. In the open position (not shown) the right 18a and left 18b panels of the barn-style door 16a may be pivoted substantially a full 180° from their closed position. In this position, the panels 18a and 18b do not obstruct entry to the housing 12. As shown in FIG. 1 the panels 18a and 18b of the barn-style doors 16a may also be pivoted to a location somewhere between the fully open and fully closed position.

Still referring to FIGS. 1-5, the barn-style doors 16a may additionally include a latch/lock mechanism 22. In some embodiments the latch/lock 22 may be a padlock or a dead bolt. Some embodiments may include any of a variety of other types of latch/lock mechanisms 22, such as, but not limited to, combination locks, pin/wafer/disc-tumbler locks, lever lock, tubular locks, etc. In various embodiments, the latch/lock 22 may also be any of a number of electronic locks or smart locks such as a keycard lock, keypad lock, RFID lock, etc. The latch/lock 22 may also be timed such that it will only open during business hours of the kiosk for resource distribution 10. In some embodiments, the door(s) 16 may include a combination of two or more different latch/lock mechanisms 22.

As in the embodiment shown in FIG. 1, the housing 12 may also have at least one generally conventional, single-leaf door 16b. As shown in FIG. 1, the single-leaf door 16b may be disposed on the long, back side of the housing 12. The single-leaf door 16b may be pivotally coupled to the housing 12 on either its right or left side. However, in various embodiments, at least one single-leaf door 16b may be located anywhere on the housing 12. The single-leaf door 16b may pivot between an open and closed position. In the closed position (not shown) the single-leaf door 16b completely obstructs the entry opening and prevents entry to the inside of the housing 12. In the fully open position, the single-leaf door 16b is pivoted substantially 180° from the closed position. In the open position, in some embodiments, the single-leaf door 16b generally rests against the exterior side of the housing 12 and unimpeded entry to the interior of the housing 12 is allowed.

Still referring to FIGS. 1-5, the single-leaf door 16b may additionally include one or more latch or locking mechanism 22. In an exemplary embodiment the latch/lock 22 may be a padlock or a dead bolt. Other embodiments may use any one or more of a variety of other types of latch/lock mechanisms 22, such as, but not limited to, combination locks, pin/wafer/disc-tumbler locks, lever locks, tubular locks, etc. In various embodiments, the latch/lock 22 may also be any of a number of electronic locks or smart locks such as a keycard lock, keypad lock, RFID lock, etc. In some embodiments, the latch/lock 22 may also be timed such that it will only open during business hours of the kiosk for resource distribution 10. In some embodiments, the door(s) 16 may include a combination of two or more different latch/lock mechanisms 22.

In the exemplary embodiment, the doors 16 are made of steel, however, in various other embodiments, the doors 16 may be made from different materials. Additionally, in some embodiments, every door 16 except one may be locked from the inside. This may be desirable for many reasons, including, but not limited to, security for the kiosk for resource distribution 10. However, in various other embodiments, more than one door 16 may be locked/unlocked from the outside.

Still referring to FIGS. 1-5 in some embodiments, there may be additional doors 16. Some embodiments may forgo some of the doors 16 described above. Moreover, alternative embodiments may have a greater number of barn-style doors 16a or a greater number of single-leaf type doors 16b. Some embodiments may only include barn-style doors 16a while still other embodiments may include only single-leaf type doors 16b. Embodiments may also use doors 16 of any number of varieties including those which may not be described herein. For example, some embodiments may include, but are not limited to, one or more of the following: bi-fold doors, roll up doors; garage type doors, sliding doors, etc. In some embodiments, one or more of the doors 16 may be top-hinged doors which may have the ability to be flipped up onto the roof of the housing 12. In some embodiments, the vertical side panels of the housing 12 may be removably coupled to the housing 12 such that the panels may be removed to provide access to the interior of the housing 12. In some embodiments the vertical panels of the housing 12 may be hingedly coupled to the housing 12 such that they may be pivoted to expose the interior of the housing 12.

Figure 9:
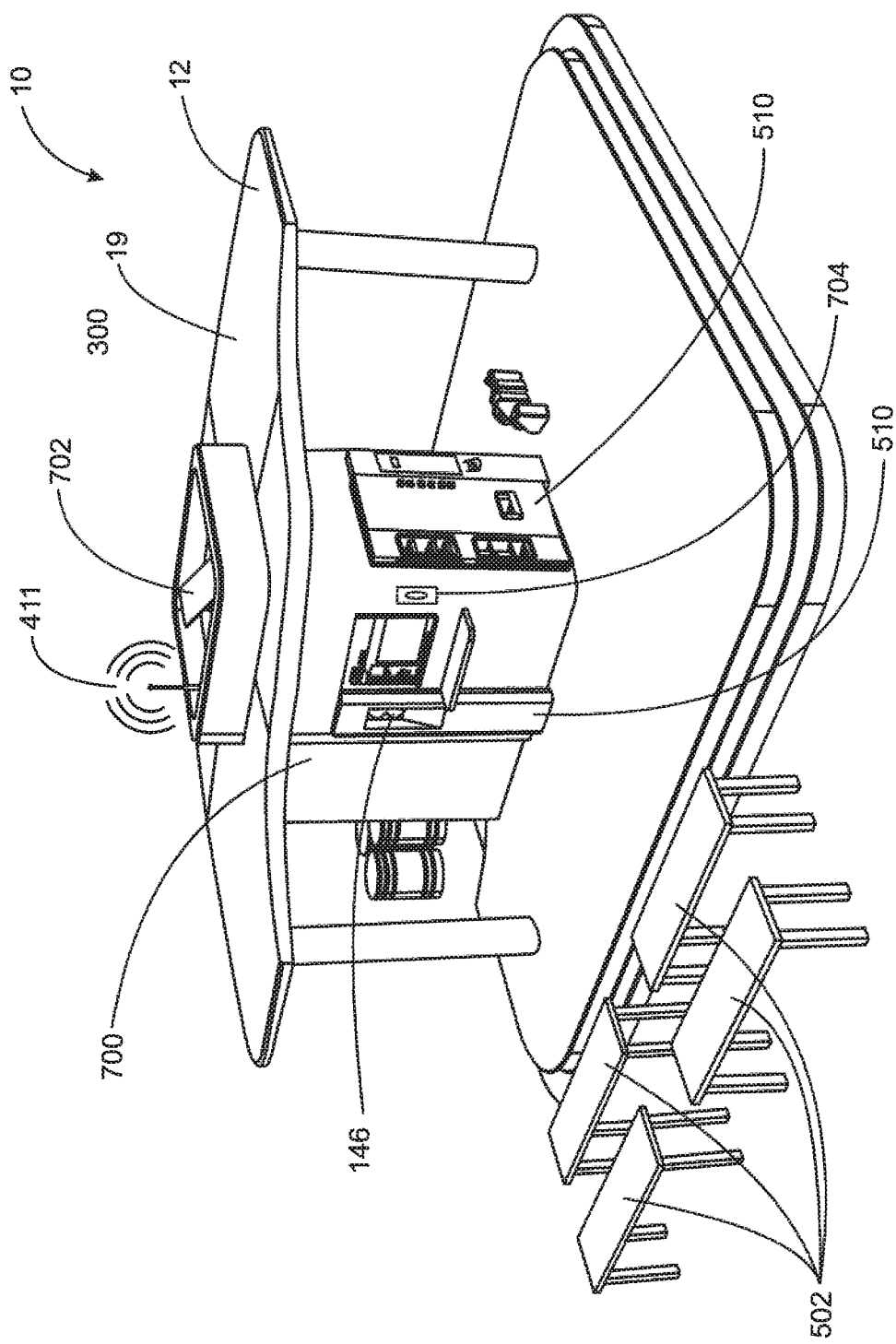
FIG. 9 is a view of a kiosk for resource distribution in accordance with one embodiment of the present disclosure.

In some embodiments, the housing 12 may be provided with one or more awnings 19 (some embodiments, for example, illustrated in FIG. 9). The awning 19 may be permanently or removably coupled to the housing 12. In some embodiments, the awning 19 may also be of the retractable, roll-out, swing-out, pop-up, etc. type. In some embodiments the awning 19 may be manually operated, while in other embodiments, the awning 19 may be electrically powered. The awning 19 may be made from any of an assortment of different materials, including, although not limited to, fabric (cloth, canvas, etc.), aluminum, sheet metal, fiberglass, polycarbonate, etc. Additionally, in various embodiments, at least one door 16 may be pivotally coupled to the housing 12, such that it may be pivoted and locked in a position where it functions as the awning 19. In some embodiments, the awning 19 may provide sun and rain protection. In various embodiments, the awning 19 may be certified to meet wind and snow load requirements for an intended area. In some embodiments, the awning 19 may be a separate auxiliary structure positioned near the housing 12.

In some embodiments, the housing 12 may include one or more mechanisms/apparatus/systems of ventilation. Various embodiments of ventilation are described herein. In various embodiments, one or more types of ventilation systems described herein may be included. In various embodiments, additional systems not described herein may be included. As shown in FIG. 1, in some embodiments, ventilation may be provided by a cross breeze created when the single-leaf door 16b and barn type door 16a opposite the single-leaf door 16b are opened. In some embodiments, light colored, or heat reflective paint may be employed to aid in reducing heat loading of the kiosk for resource distribution 10.

Referring still to FIGS. 1-5, the door(s) 16 may comprise one or more, or a plurality of vents 24. Vents 24 may also be positioned elsewhere along the sides of the housing 12. One or more vents 24 may also be disposed on the ceiling/roof of the housing 12. In some embodiments, the vents 24 may be cut into the housing 12 using, for example, a plasma cutter. In some embodiments, the vents 24 may be formed as a part of the housing 12 during manufacture or construction of the housing 12. The vents 24 contribute to ventilation of the kiosk for resource distribution 10. In some embodiments, the vents 24 may provide passive air circulation or in some embodiments, at least one vent 24 may include, for example, a fan to facilitate ventilation of the housing 12.

In some embodiments, the vents 24 may comprise a number of slats 25 which are arrayed within a polygonal orifice 26. In some embodiments, the polygonal orifice 26 may not be polygonal, but rather round. In the exemplary embodiment shown, the vents 24 are louvered so that orientation of the slats 25 may be adjusted by a user. This enables the user to control ventilation of the kiosk for resource distribution 10. The vent(s) 24 may also include a gasket (not shown). The gasket may be of any of a variety of materials, for instance silicone. In other embodiments, the gasket may be made from different materials. The vent(s) 24 may also be snow/water proof.

In various embodiments, the vent(s) 24 may include an exterior screen, interior screen, or both (none shown). The exterior screen and interior screen may be mesh screens. In some embodiments, the exterior screen may comprise a larger mesh relative to the interior screen. In such embodiments, the exterior screen may serve as a security precaution while the interior screen may prevent bugs and debris from entering the housing 12. Additionally, the vent(s) 24 may include a plug (not shown). The plug may be removably coupled to a vent 24 such that the polygonal orifice 26 is covered. The plug may be desirable for a many reasons, including, but not limited to, increased security of the kiosk for resource distribution 10, plugging the vents 24 during shipping or inclement weather, making the housing 12 water tight, etc. The plug may be made from any number of materials, including, but not limited to, metal, wood, polycarbonate, plastic, etc.

The interior of the housing 12 of the kiosk for resource distribution 10 may be divided into a number of different segments or compartments. In some embodiments, the housing 12 may be a single open space and may not include partitioned/sectioned areas. Referring still to FIGS. 1-5, these FIGS. depicts one of many possible ways that this may be done in embodiments where the housing 12 is a shipping container. The configuration shown in FIGS. 1-5 are non-limiting examples. The number, type, size, shape, location, usage, etc. of segments, compartments, or elements of the kiosk for resource distribution 10 may vary in various embodiments. Likewise, in embodiments where the housing 12 is not a shipping container, elements included within the various embodiments of the kiosk for resource distribution 10 may be set up and/or configured in any number of arrangements.

As shown in FIGS. 1-5, in some embodiments, one side of the housing 12 may be cordoned off into a storage area 100. The storage area 100 may be sectioned off by a partitioning wall 101 running in a plane substantially perpendicular to the long sides of the housing 12. In other embodiments, the partitioning wall 101 may be bent, curved, etc. to better suit the storage needs of the kiosk for resource distribution 10. The partition wall 101 may be made of a number of different materials, including, but not limited to plywood, etc. The storage area 100 may be used to store any number of items. Additionally, in some embodiments there may be a plurality of storage areas 100. The storage area 100 in FIGS. 1-5, is used to store fuel for a fuel requiring element 102, which, in some embodiments may be a Stirling engine power generator, for example, any one or more of the embodiments of Stirling engines described in U.S. patent application Ser. No. 12/829,320, filed Jul. 1, 2010 and entitled Stirling Cycle Machine, now U.S. Published Application No. US-2011-0011078-A1, published Jan. 20, 2011, which is hereby incorporated herein by reference in its entirety. Other embodiments may include other fuel requiring elements 102 or multiple fuel requiring elements 102.

In some embodiments, the fuel may be propane. In other embodiments, the fuel may be a different fuel, such as but not limited to, diesel, kerosene, biofuel, other natural gases, etc. In an exemplary embodiment, the fuel is stored in a fuel storage tank 104, specifically an 8'×5', 275 gallon fuel storage tank 104. In alternate embodiments, the fuel storage tank 104 may have different dimensions and capacity. Additionally, there may be a plurality of fuel storage tanks 104. In embodiments where there is a plurality of fuel storage tanks 104, some of the fuel storage tanks 104 may contain one fuel, while other fuel storage tanks 104 may contain other, different types of fuel. The fuel storage tanks 104 may have an opening 106 to allow for the filling of the fuel storage tanks 104. The opening 106 may be accessible from the exterior of the housing 12. In other embodiments, the opening 106 may only be accessed from the interior of the housing 12. This may be desirable for many reasons, including, but not limited to, security reasons as it may prevent tampering with and/or siphoning from the fuel storage tanks 104. In embodiments with a Stirling engine power generator, the fuel may be contaminated (e.g. by adding water) such that it is rendered useless for use in an internal combustion engine. This may also help to prevent tampering with and/or stealing from the fuel storage tanks 104. In some embodiments, at least one fuel storage tank 104 may be disposed outside of the housing 12. This may be particularly desired if the fuel storage tank 104 is storing propane.

In various embodiments, the fuel storage tanks 104 additionally include a connector to the fuel requiring element 102. In embodiments where there are a plurality of fuel storage tanks 104 the connector may be easily changed such that the fuel requiring element 102 may be interchangeably connected to any of the plurality of fuel storage tanks 104. In some embodiments, for example, in embodiments where the fuel requiring element 102 is a Stirling engine power generator, the fuel requiring element 102 may be run from any of a variety of fuels.

Still referring to FIGS. 1-5, the storage area 100 may also be used for any of a number of other purposes. For a non-limiting example, the storage area 100 may be used for other storage purposes. In some embodiments, the storage area 100 may be used to store materials for a library such as books or other media. The storage area 100 may also function as the mail room in embodiments where at least one of the functions of the kiosk for resource distribution 10 is a post office. In some embodiments, the storage area 100 may provide a secure storage location for the surrounding population. For example, the storage area 100 may include safety deposit boxes (not shown). In some embodiments, the storage area 100 may for example be the vault of a bank. In yet other embodiments of the kiosk for resource distribution 10, the storage area 100 may be the holding cell of a jail or record storage for a municipal office. The storage area 100 may be used to store consumables, commodities, or commercial products for an entrepreneurial business or humanitarian application. The storage area 100 may be used to store arms or other military hardware in military applications.

Still referring to FIGS. 1-5, in some embodiments, the housing 12 may include a second section of the interior. A second section of the interior of the housing 12, may be a middle compartment 120. The middle compartment 120 may be defined by the partitioning wall 101 of the storage area 100 and a second partitioning wall 121. The second partitioning wall 121 may run substantially parallel to the first partitioning wall 101 as it does in the embodiment illustrated in FIG. 2. Additionally, the second partitioning wall 121, may be offset from the first partitioning wall 101 by a distance in a direction substantially perpendicular to the plane of the first partitioning wall 101. Similar to the first partitioning wall 101, the second partitioning wall 121 may be curved, bent, etc. to better accommodate the needs of the kiosk for resource distribution 10. The first partition wall 101 and second partition wall 121 may be made of a number of different materials, including, but not limited to plywood, etc.

In some embodiments, the middle compartment 120 may be arranged as the distribution section of the kiosk for resource distribution 10. In embodiments where the kiosk for resource distribution 10 is so arranged, the middle compartment 120 may be manned by one or more individuals. In embodiments where the kiosk for resource distribution 10 is being used as an entrepreneurial micro-business, the middle compartment 120 may be manned by one or more entrepreneurs or their employee(s). In other embodiments where the kiosk for resource distribution 10 is being used in emergency relief applications, the middle compartment 120 may be staffed by one or more aid worker or the like. In various embodiments where the kiosk for resource distribution 10 is being utilized in a military application, the middle compartment 120 may be manned by one or more service members. In still other embodiments, the middle compartment 120 may be unmanned, automated, etc.

The middle compartment 120 may include one or more components. In the non-limiting embodiment shown in FIGS. 1-5, the middle compartment 120 includes at least one water distillation device 122. The water distillation device(s) 122 may be a water vapor distillation apparatus which may, in some embodiments, be similar to the one described in U.S. patent application Ser. No. 13/952,263, filed Jul. 26, 2013 and entitled Water Vapor Distillation Apparatus, Method and System, or in U.S. Pat. No. 8,505,323, issued on Aug. 13, 20113, and entitled Water Vapor Distillation Apparatus, Method and System, or U.S. Pat. No. 7,597,784, issued Oct. 6, 2009, and entitled Pressurized Vapor Cycle Liquid Distillation, or U.S. Pat. No. 8,006,511, issued Aug. 30, 2011, and entitled Water Vapor Distillation Apparatus, Method and System, which are each hereby incorporated herein by reference in their entireties. In various embodiments, other water distillation devices 122 may be used. In some embodiments, other varieties of water devices including distillation and/or purification devices could be used in conjunction with or in place of a water distillation device 122. Some embodiments may not include a water device or water distillation device 122.

In the embodiments shown, the water distillation device 122 is fed by a source water reservoir 124. The source water reservoir 124 may be a rigid structure such as a tank or drum. The source water reservoir 124 may also be a bulge in the floor, wall, or ceiling of the housing 12 or in either the first partitioning wall 101 or second partitioning wall 121. The source water reservoir 124 may also be disposed beneath the floor or on the roof of the housing 12. In an exemplary embodiment, the source water reservoir 124 is a deformable structure, specifically a 300 gallon bladder. However, the size of the bladder may vary in various embodiments. In the exemplary embodiment, the source water reservoir 124 may be disposed on the floor of the middle compartment 120 adjacent to the first partitioning wall 101. In some embodiments, the source water reservoir 124 may be located in both the storage area 100 and the middle compartment 120. In some embodiments, the source water reservoir 124 may be disposed about the floor of the storage area 100 and a portion of the middle compartment 120. In various other embodiments, the source water reservoir 124 may be located elsewhere within the housing 12. In some embodiments the source water reservoir 124 may be located on the roof of the housing 12. In other embodiments, the source water reservoir 124 may be located external to the housing 12. Moreover, alternate embodiments may have a plurality of source water reservoirs 124. In embodiments where there are a plurality of source water reservoirs 124, there may be at least one source water reservoir 124 inside the housing 12 and at least one source water reservoir 124 outside of the housing 12. In other embodiments all source water reservoirs 124 may be located either within the interior of the housing 12 or outside of the housing 12. Furthermore, in embodiments with multiple source water reservoirs 124, the source water reservoirs 124 may come in a variety of types (tank, bladder, etc.) or may all be of the same type.

Still referring to FIGS. 1-5, the at least one source water reservoir 124 may be encased by a case 126. The case 126 protects the reservoir from damage and also creates a platform or shelf on which other components of the kiosk for resource distribution 10 may be placed. The case 126 may be made from any of a variety of materials including steel, other metals, plastic, wood, or preferably plywood. In some embodiments, the case 126 may include insulation to mitigate potential of the source water reservoir 124 freezing. Additionally, in some embodiments, a mechanism may be provided to treat water in the source water reservoir 124 with an additive, such as antifreeze, to prevent freezing. In some embodiments, the mechanism may be an automatic mechanism and in some embodiments, the mechanism may include an access area to the source water to manually add the additive. In some embodiments, water in the source water reservoir 124 may be prevented from freezing by means of a thermal heat source which may, for example, be an electric heater.

Still referring to FIGS. 1-5, the at least one source water reservoir 124 also includes a mechanism to fill the source water reservoir 124. The source water reservoir 124 may be coupled to a source water conduit 128 which facilitates external filling of the at least one source water reservoir 124. The source water conduit 128 may be in fluid communication with a source water pump 130. In some embodiments, the source water pump 130 may be deployed into/onto a water body 129 (see FIG. 7), including, but not limited to, a pond, a lake, a river, a stream, a puddle, well, the ocean, etc. When the source water pump 130 is running, the source water pump 130 pumps water through the source water conduit 128 and into the source water reservoir 124. In some embodiments, the source water reservoir 124 may include an overfill snorkel (not shown) which prevents overfilling or bursting of the source water reservoir 124. In some embodiments, the source water reservoir 124 may include a vent that vents air out of the source water reservoir 124. In some embodiments, the vent may be connected to a line that may extend upwards about six feet (or in other embodiments, less than or greater than 6 feet) from the source water reservoir 124.

The source water pump 130 may be a submersion pump in some embodiments. In embodiments where the source water pump 130 is a submersion pump, the source water pump 130 may be fitted with a floatation material which keeps the source water pump 130 suspended in the middle of the water column. Additionally, the source water pump 130 may include an anchor which is capable of keeping the source water pump 130 in a desired location in/on a water body 129. In various embodiments, the source water pump 130 may include a line that is weighted to weight the line to the bottom of the water body 129.

Some embodiments of the kiosk for resource distribution 10 may not include the source water pump 130. In such embodiments, the source water reservoir 124 may be manually filled by hand. In other embodiments, the source water reservoir 124 may be filled by siphoning water from a water body 129 to the source water reservoir 124 via a hose (not shown) or other fluid pathway. In some embodiments, the kiosk for resource distribution 10 is arranged such that the source water reservoir 124 may optionally be filled by a source water pump 130 or by an alternative means, such as, but not limited to, those described above.

The source water reservoir 124 may include a liquid level sensor (not shown). The liquid level sensor may be any of a number of different liquid level sensors. In some embodiments, the liquid level sensor may be external to the source water reservoir 124. In various embodiments, the liquid level sensor may be comprised of an armature coupled to a limit switch which is tripped as the water level in the source water reservoir 124 rises to a predefined level. In some embodiments, the limit switch, when tripped, signals to the system to turn off/cut power to the source water pump 130. In other embodiments, the liquid level sensor may be an acoustic sensor, laser range finder, etc. In some embodiments, the liquid level sensor may include a tilt sensor disposed in a float which changes its orientation as water level in the source water reservoir 124 changes.

The source water liquid level sensor may be in communication with the source water pump 130 such that the source water pump 130 will only pump when the source water reservoir 124 is not full. In some embodiments, the liquid level sensor may be in communication with a display 135 which provides a visual signal when the source water reservoir 124 is full. As discussed above, in some embodiments, the liquid level sensor 134 trips a switch which turns off the source water pump 130.

Still referring to FIGS. 1-5, the source water reservoir 124 may additionally include a source-to-still intake conduit 142 which couples the source water reservoir 124 into fluid communication with the intake of the water distillation device 122. The source-to-still intake conduit 142 may be disposed such that it runs under the flooring 17 of the kiosk for resource distribution 10. In an exemplary embodiment, the source-to-still intake conduit 142 may be disposed about an out of the way and exposed path. This minimizes the possibility of the source-to-still intake conduit 142 being damaged and maximizes serviceability of the source-to-still intake conduit 142. Having the source-to-still intake conduit 142 exposed and clearly visible helps to ensure that the source-to-still intake conduit 142 will not be drilled/nailed through during user customization of the housing 12. The source-to-still intake conduit 142 may also include a pressurization or metering pump between the source water reservoir 124 and the water distillation device 122.

Still referring to FIGS. 1-5, in some embodiments, the middle compartment 120 of the kiosk for resource distribution 10 also includes at least one product water reservoir 144. The product water reservoir 144 in the example embodiment stores the distilled, contaminant free, drinkable, product of the water distillation device 122. The product water reservoir 144 may be a rigid structure. The product water reservoir 144 may also be a bulge in the floor, wall, or ceiling of the housing 12 or in the either the first partitioning wall 101 or second partitioning wall 121. In various embodiments, the product water reservoir 144 may be a deformable structure, such as a bladder. In the exemplary embodiment, the product water reservoir 144 is a rigid tank which is capable of storing 250 gallons of clean product water. In various other embodiments, the product water reservoir 144 may be larger or smaller than 250 gallons. In some embodiments there may be one or more product water reservoirs 144.

The product water reservoir 144 may additionally include a still-to-product reservoir conduit 145 which couples the water distillation device 122 into fluid communication with the product water reservoir 144. The still-to-product reservoir conduit 145 allows distilled product water to travel from the water distillation device 122 to the product water reservoir 144. In various embodiments, the still-to-product reservoir conduit 145 may be disposed such that it runs under the flooring 17 of the kiosk for resource distribution 10. In an exemplary embodiment, the still-to-product reservoir conduit 145 is disposed about an out of the way and exposed path. This minimizes the possibility of the still-to-product reservoir conduit 145 being damaged and maximizes serviceability of the still-to-product reservoir conduit 145. Having the still-to-product reservoir conduit 145 exposed and clearly visible may be beneficial for many reasons, including, but not limited to, contributing to ensure that the still-to-product reservoir conduit 145 will not be drilled/nailed through during user customization of the housing 12.

Still referring to FIGS. 1-5, the product water reservoir 144 may be disposed on top of the source water reservoir case 126. Elevating the product water reservoir 144 may be desirable for a number of reasons, including although not limited to, facilitating the dispensing of product water by a gravity feed.

Still referring to FIGS. 1-5, the product water may be dispensed from the product water reservoir 144 via one or more gravity fed product water spigots 146. Some embodiments may feed the water to the one or more product water spigots 146 via a pump which may help in metering of the product water. The product water spigot 146 may be accessible from the exterior of the housing 12 in some embodiments. In other embodiments, the product water spigot 146 may only be accessed from the interior of the kiosk for resource distribution 10. In embodiments where the product water spigot 146 is accessible from the exterior of the housing 12, the product water spigot 146 may be recessed into the housing 12. In other embodiments where the product water spigot 146 is accessible from the exterior of the housing 12 the product water spigot 146 may be removable or otherwise rendered inoperative. This may be advantageous for many reasons, including, but not limited to, one or more of the following: ability to remove the product water spigot 146 during shipping of the kiosk for resource distribution 10, the ability to remove or disable the product water spigot 146 when the kiosk for resource distribution 10 is "closed for business", and the ability to remove the product water spigot 146 during cleaning, service, or maintenance.

The product water reservoir 144, product water spigot 146 and the conduit connecting the product water reservoir 144 and product water spigot 146 (if any) may be periodically sanitized. This may be done to ensure that the product water remains safe upon delivery. Any suitable known or obvious sanitization method may be used. The quality of the product water being delivered out of the product water spigot 146 may also be periodically tested by any suitable known or obvious method.

The product water reservoir 144 may also include a product liquid level sensor (not shown). The product water liquid level sensor may be any of a number of different product water liquid level sensors. In some embodiments, the product water liquid level sensor may be external to the product water reservoir 144. In various embodiments, the product water liquid level sensor may include an armature coupled to a limit switch which is tripped as the water level in the product water reservoir 144 rises to a predefined level. In other embodiments, the product water liquid level sensor may be an acoustic sensor, laser range finder, etc. In some embodiments, the product water liquid level sensor may include a tilt sensor disposed in a float which changes its orientation as water level in the product water reservoir 144 changes. In some embodiments, the product water liquid level sensor may be a float level sensor.

Some embodiments may include a product water overflow reservoir (not shown). In some embodiments, the product water overflow reservoir may be a separate reservoir which is not attached to the product water reservoir 144. In some embodiments, the source water reservoir 124 may double as the product water overflow reservoir. The product water overflow reservoir may be desirable in the event the product liquid level sensor fails.

In embodiments where the kiosk for resource distribution 10 is being employed as an entrepreneurial business, the entrepreneur(s) or their employees may use the data from the product water liquid level sensor to determine sales. Among other uses, this data may be helpful in determining when and how long to run the water distillation device 122. It may also be helpful in determining how many units of product a customer has purchased and the corresponding amount a customer should be charged. In some embodiments, data from, for example, the product water liquid level sensor may be used from a remote location to aid in the scheduling of maintenance for the water distillation device 122 or other water device.

In some embodiments, the kiosk for resource distribution 10 may include a blowdown conduit (not shown). One end of the blowdown conduit may be coupled to the blowdown outlet on the water distillation device 122. The other end of the blowdown conduit may run back to the water body 129. In other embodiments, the blowdown conduit may be coupled to a blowdown reservoir (not shown). The blowdown conduit may also include a soaker hose type arrangement through which the blowdown is emitted underground. In other embodiments, the blowdown may be handled in any number of other ways which would be apparent to one skilled in the art.

Still to referring to FIGS. 1-5, in some embodiments, the middle compartment 120 of the kiosk for resource distribution 10 may also include at least one refrigerator 160 or other refrigeration apparatus. In an exemplary embodiment, the refrigeration apparatus is a refrigerator 160 with a 15 cubic foot capacity. Other embodiments may include larger or smaller refrigerators 160. The refrigerator 160 may be disposed on top of the source water reservoir case 126. In other embodiments the placement of the refrigerator 160 may vary.

The refrigerator 160 may have a variety of uses. In some embodiments, the refrigerator 160 may be used to store one or more of the following: cooled product water, medical supplies/vaccines, food, commercial beverages, other commodities, etc. In an exemplary embodiment, the refrigerator 160 is thermally coupled to a 20 gallon, auxiliary product water reservoir 162. In other embodiments the size of the auxiliary product water reservoir 162 may vary. The auxiliary product water reservoir 162 may be plumbed into the product water reservoir 144.

In some embodiments, the refrigerator 160 may be coupled to a cooled product water spigot (not shown) for dispensing cooled product water. In some embodiments, the cooled product water spigot is gravity fed and the auxiliary product water reservoir 162 is elevated in relation to the cooled product water spigot thus facilitating the gravity feed. The cooled product water spigot may be accessible from the exterior of the housing 12 in some embodiments. In other embodiments, the cooled product water spigot may only be accessed from the interior of the kiosk for resource distribution 10. In embodiments where the cooled product water spigot is accessible from the exterior of the housing 12, the cooled product water spigot may be recessed into the housing 12. In other embodiments where the cooled product water spigot is accessible from the exterior of the housing 12 the cooled product water spigot may be removable or otherwise rendered inoperative. This may be advantageous for a variety of reasons, including, but not limited to one or more of the following: ability to remove the cooled product water spigot during shipping of the kiosk for resource distribution 10, the ability to remove or disable the cooled product water spigot when the kiosk for resource distribution 10 is "closed for business", and the ability to remove the cooled product water spigot during cleaning, service, or maintenance.

In some embodiments, the refrigerator 160 may include a compartment which helps keep the refrigerator 160 cool in the event of a power failure. For example, such a compartment may be filled at least partially with water which is cooled and frozen whenever the refrigerator 160 is on. If the refrigerator 160 loses power, the compartment of frozen water in the refrigerator 160 may serve as a backup refrigeration means for a period of time. In some embodiments, such a compartment may be included so that power to the refrigerator 160 may purposefully be periodically shut off to increase efficiency.

Still referring to FIGS. 1-5, in an exemplary embodiment, the refrigerator 160 has a medical refrigeration section 168 (for example, shown in FIG. 22) for storing medical supplies/vaccines. The medical refrigeration section 168 may have its own separate compartment within the refrigerator 160 or may be a shelf within the interior of the main refrigerator 160. In some embodiments, the medical refrigeration section 168 may include its own separate refrigerator 160. In some embodiments the medical refrigeration section 168 may be completely segregated and isolated from the rest of the refrigerator 160. For example, in some embodiments, the medical refrigeration section 168 may be segregated from the rest of the refrigerator 160 such that the medical refrigeration section 168 may be the only section of the refrigerator 160 accessible from one side of either the first partitioning wall 101 or second partitioning wall 121. The rest of the refrigerator 160 may only be accessed from the other side of the first partitioning wall 101 or second partitioning wall 121. This may help to prevent any cross contamination.

The medical refrigeration section 168 of the refrigerator 160 may be beneficial for many reasons, including, but not limited to, the ability to render aid in emergency relief and military applications, storage of vaccines, etc. Additionally, in entrepreneurial applications of the kiosk for resource distribution 10, refrigerated medical supplies may contribute to making the kiosk for resource distribution 10 a community center. By making the kiosk for resource distribution 10 into a community center, the entrepreneurial micro-business is afforded more exposure to potential customers.

As discussed above, in various embodiments, the refrigerator 160 may also be used to refrigerate food or other commercial beverages, such as, but not limited to, soda, juice, sports drinks, bottled water etc. Such a capability may be attractive for a variety of reasons including, but not limited to, one or more of the following: expanding relief potential in emergency/disaster situations, increasing utility in military applications, and increasing the number of products offered by an entrepreneurial micro-business.

Still referring to FIGS. 1-5, the middle compartment 120 of the kiosk for resource distribution 10 may include a number of other components. In some embodiments, the middle compartment 120 may also include at least one oven

190. The oven 190 is discussed in more detail below. Additionally, in some embodiments, the interior walls defining the middle compartment 120 may include shelving/displays 198 (see FIG. 18) such as baskets or the like for various commodities or supplies. The doors 16 may also include shelving/displays 198. As discussed above, the interior walls of the housing 12 may be covered with a wall material 15, for example, plywood. This allows the user of the kiosk for resource distribution 10 to modify the amount, location, etc. of shelving/displays 198 as desired or needed.

Some embodiments may include one or more doors 16 that are expandable. For example, the doors 16 may include fold out panels hingedly coupled to the door 16. In other embodiments, one or more doors 16 may include a slide out portion. This may be desirable because it creates more surface area to which shelving/displays 198 may be coupled.

Still referring to FIGS. 1-5, a third section of the housing 12, may be the power compartment 200 of the kiosk for resource distribution 10. In the embodiments shown, the power compartment 200 is defined by the right end barn type doors 16a of the housing 12 and the second partitioning wall 121.

In some embodiments, the power compartment 200 may include at least one fuel requiring element 102. In some embodiments, the term "power generating device" may be used interchangeably with fuel requiring element 102. In some embodiments, the device may be a power generating device and in some embodiments, the power generating device may also be a fuel requiring element 102. In an exemplary embodiment the fuel requiring element 102 is a Stirling engine which is capable of generating 10 kW of power. In other embodiments, the fuel requiring element 102 may differ or there may be multiple fuel requiring elements 102 and/or power generating devices. For example, other generators or other varieties of Stirling generators may be used. Examples of some embodiments of Stirling engines that may be included are described in U.S. patent application Ser. No. 13/836,946, filed Mar. 15, 2013 and entitled Stirling Cycle Machine, which is hereby incorporated herein by reference in its entirety. As described above, the fuel requiring element 102 is in communication with one or more of the one or more fuel storage tanks 104 via a connector (not shown). The connector provides the fuel to the fuel requiring element 102. In some embodiments, the kiosk for resource distribution 10 may, for example, be grid tied to a land power source (not shown) which may be considered the power generating device. In some embodiments, access to a land power source may be supplemental to the fuel requiring element 102 or may replace the fuel requiring element 102. In some embodiments, a fuel requiring element 102 or power generating device may be used as a back-up generator in areas where grid power is unreliable. In some embodiments, the power generating device or at least one of the power generating devices may be solar powered, wind powered, etc. The fuel requiring element 102 may provide power to the kiosk for resource distribution 10 which may allow the kiosk 10 to provide any number of functions, services, etc.

In some embodiments, there may be at least one exhaust vent (not shown) which vents the exhaust from the fuel requiring element 102. In other embodiments, the fuel requiring element 102 may be moved external to the housing 12 when in use so that exhaust venting is not an issue. When the fuel requiring element 102 is not in use, it may be moved back into the housing 12 where it may be locked away when the kiosk for resource distribution 10 is "closed for business". This prevents an individual from stealing or tampering with the fuel requiring element 102.

In some embodiments, the waste heat of the fuel requiring element 102 may utilized as a resource for another application or process. This may improve the capabilities, functionality, and efficiency of the kiosk for resource distribution 10. One application for the waste heat may be preventing the source water from freezing or the pre-heating of source water as it sits in the source water reservoir 124. In some embodiments, the waste heat may be used to heat or aid in heating a water reservoir or sump in a water distillation device.

In another possible application, the waste heat may be directed to at least one oven 190 or similar heating element. The oven 190 may be used for a wide variety of applications. In some embodiments, the oven 190 may be used in one or more of a medical, culinary, or pottery application. The oven 190 may also be employed for other applications. In some embodiments, the oven 190 may include three shells: an outside shell, a middle shell and an inner shell. The inner shell may be the oven 190 and may include a variety of fixtures and be dimensioned so as to be configured for the intended use. In some embodiments, the outer shell may be an insulator shell and the middle shell may include a space where the exhaust input releases the exhaust and where the exhaust exits the space. Thus, the exhaust provides indirect heat to the oven 190 or inner shell, but does not allow direct exposure of the inner shell/oven 190 to the exhaust. In various embodiments, the one or more compartments of the housing 12 may include one or more carbon monoxide sensors.

In some embodiments, the oven 190 may be encased by an air tight compartment surrounding the exterior of the oven 190. The oven temperature may be controlled by a lever or baffle (not shown) which has the ability to regulate the amount of exhaust gas flowing to the air tight compartment surrounding the exterior of the oven 190. In some embodiments, the lever or baffle is a bi-metallic lever. In some embodiments, the oven temperature may be computer controlled with an electronic temperature sensor. The oven 190 may also include one or more access doors 193 which allow a user to access the cooking cavity within the oven 190. In various embodiments, the oven 190 has at least one access door 193 which can be opened from the interior of the housing 12 and at least one access door 193 which may be opened from the exterior of the housing 12. In some embodiments, specifically embodiments where the kiosk for resource distribution 10 is being used in an entrepreneurial application, the oven 190 may include a coin, token, or otherwise monetarily operated mechanism (not shown). The monetarily operated mechanism 195 allows an entrepreneur to use the oven 190 as a revenue source. In other embodiments, the oven 190 may be converted to an autoclave for medical purposes. In some embodiments, the oven 190 may also include a thermometer 196 (not shown).

Figure 5:
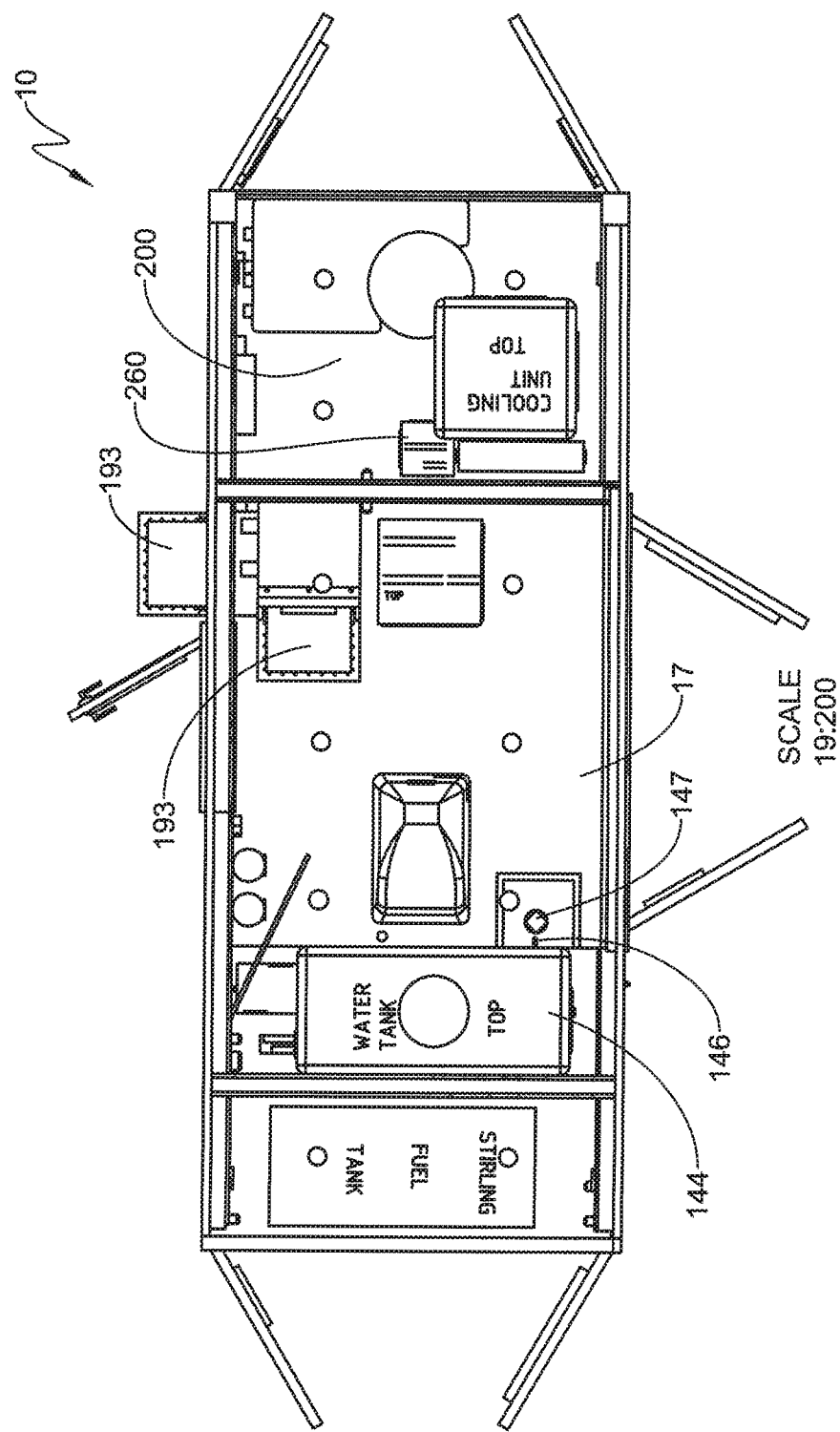
FIG. 5 is a view of a kiosk for resource distribution in accordance with one embodiment of the present disclosure.

In some embodiments, for example, in the embodiment shown in FIG. 5, two ovens 190 may be included. One of the ovens 190 may be accessible only from exterior of the housing 12 and the second oven 190 may be accessible from only the interior of the housing 12. Arranged as such, an oven 190 may be accessible at all times, i.e., the exterior oven 190 may be accessible at all times and the interior oven 190 may only be accessible when the middle compartment 120 is "open for business". Additionally, the arrangement may also be beneficial for it obviates the possibility of an individual easily gaining access to the interior of the housing 12 via the oven 190 during hours where the kiosk for resource distribution 10 is "closed for business". In an example embodiment in FIG. 5, the two ovens 190 are created by a partition of the cooking cavity into to segregated sections. An access door 193 to one half of the partitioned cooking cavity may be opened from the exterior of the housing 12. The other half of the partitioned cooking cavity may be accessed via an access door 193 which is only accessible from the interior of the housing 12.

Referring still to FIGS. 1-5, the waste heat of the fuel requiring element 102 may also be utilized to a number of other ends. For example, the waste heat may be used to run a smoker, grill, hot plate, or for any other baking or culinary application. In some embodiments, the waste heat may be used to perform various value added processes. The waste heat may be used to roast coffee or dry tea, for example, which would allow the kiosk for resource distribution 10 to make more money with the raw materials available to it. Additionally, the kiosk for resource distribution 10 would be able to function as a café. The waste heat may also be used to dry food or powder food (e.g. milk) so that it lasts longer and is easier to transport for trade purposes. In some embodiments, the waste heat may be used in hot process saponification to aid in the production of soap. The waste heat may be used to pasteurize various foods. In some embodiments, the waste heat may also be used in the production of cheese.

In various embodiments, thermal energy from the waste heat may be transferred to another fluid by a heat exchanger. The fluid heated through the heat exchanger may act as an intermediate fluid for various applications such as those described above and below. The intermediate fluid may be pumped such that it may heat a reservoir. In some embodiments, the intermediate fluid may be used to heat a reservoir or sump in a water distillation device.

The waste heat may be used for sanitizations processes as well. For example, the waste heat may be used to create steam to clean containers such as the product water containers 940 described below with respect to FIG. 11. Steam may also be created for use to clean of clothes or other objects. The waste heat may also be used to evaporate the blowdown from a water distillation device 122. In some embodiments, the waste heat may be used to evaporate human urine for the production of fertilizer. In some embodiments, the waste heat may be used by one or more biodigesters or gasification units.

In some embodiments where waste heat may be used to create steam for sanitization purposes, waste heat from the exhaust may exchange heat with a reservoir at a pressure greater than atmospheric pressure via a heat exchanger. The reservoir may be filled with water. When the water is sufficiently up to temperature, a valve may be opened to allow a portion of the heated water in the reservoir to flash to steam. The resulting steam may then be directed to the object which is to be sanitized. If the object is, for example, a water container, the steam may be directed to the interior volume of the container. In some embodiments, the valve may not be opened unless the object is isolated from a user in order to ensure the user is not exposed to any steam. In some embodiments, the heating fluid may not be exhaust, but rather an intermediate fluid which has been heated by the exhaust. In some embodiments, for example, a lever may be included to shut off exhaust flow across the heat exchanger.

Still referring to FIGS. 1-5, in some embodiments, the power compartment 200 may additionally include a radiator 224 (not shown). In various embodiments, the radiator 224 may be removably coupled to the roof of the housing 12 such that the radiator 224 may be removed and placed inside the housing 12. This may be desirable in many situations, including, but not limited to, shipping, inclement weather, and/or when the kiosk for resource distribution 10 is "closed for business". The radiator 224 may be coupled into communication with the fuel requiring element 102 by a coolant conduit (not shown) so that the radiator 224 may cool the fuel requiring element 102.

The power compartment 200 may also include a battery bank 230 or other power storage device such as but not limited to a flywheel, compressed gas energy storage device, thermal energy storage device, capacitive energy storage device, chemical energy storage device, etc. The power compartment 200 may also include charge control electronics for a battery bank 230. The battery bank 230 may be useful for a variety of reasons and applications, including but not limited to, start up of the fuel requiring element 102, load balancing for allowing peak power loads higher than that which the fuel requiring element 102 can satiate on its own, etc. The battery bank 230 may be charged by the fuel requiring element 102 or other power generating device such as a solar panel and/or a wind turbine. In an exemplary embodiment, the battery bank 230 may be a bank of sealed, lead acid, deep draw batteries. Other embodiments may include different battery bank 230 arrangements, for example, the battery bank 230 may be a bank of lithium ion or traction batteries. In the some embodiments, the battery bank 230 may be located inside the housing 12 such that it may be protected and secure.

In various embodiments, the power compartment 200 may also include an electrical distribution box 236. The electrical distribution box 236 may distribute the power generated by the fuel requiring element 102 or other power generating device. In some embodiments, wiring to and from the electrical distribution box 236 may follow an exposed, out of the way path. Such an arrangement may be desirable for many reasons, including, but not limited to, because it helps to ensure that a user does not drill, nail, cut, etc. into the wiring during customization of the housing 12. Additionally, such a configuration may increase serviceability. In some embodiments, one or more portions of the wiring in the kiosk for resource distribution 10 may be enclosed in a conduit to provide added protection and increase safety. In some embodiments, all of the wiring in the kiosk for resource distribution 10 may be enclosed in a conduit to provide added protection and increase safety.

In some embodiments, the electrical distribution box 236 distributes power to at least one outlet 238 and/or at least one light 240. Various embodiments may include outlets 238 and/or lights 240 on both the interior and the exterior of the housing 12. In some embodiments, outlets 238 and/or lights 240 may be disposed only on either the exterior or interior of the housing 12. The electrical distribution box 236 may also distribute power to any number of other power requiring elements which may be included the kiosk for resource distribution 10.

Referring still to FIGS. 1-5, in some embodiments, the exterior of the housing 12 has two, 120V AC outlets 238 on each corner of the housing 12. In some embodiments, the interior of the housing 12 has eight, 120V AC outlets 238 and one 208V AC outlet 238. In various embodiments, the housing 12 may have one or more outlets of one or more voltages. In some embodiments, the electrical system of a kiosk for resource distribution 10 may be configured for country specific voltages, and/or have country specific outlets 238, and/or one or more provisions specific for the geographic region in which the kiosk for resource distribution 10 may be intended to be used. Additionally, in some embodiments the interior of the housing 12 includes 11 LED lights 240 each being a 60 watt incandescent equivalent. However, in various embodiments, the location and the number of outlets 238 may vary. Some embodiments may not include outlets 238. In some embodiments, the housing 12 may also include four LED flood lights 240 with 120 watt incandescent equivalence coupled to the top corners of the housing 12 to illuminate the area around the kiosk for resource distribution 10. The four LED flood lights 240 may be useful to provide security, a study space, a community space, or to extend the business hours of an entrepreneur. LED lights 240 may be desirable/beneficial for a number of reasons. For example, LED lights 240 are efficient and their long life minimizes the amount of consumables necessary to maintain the kiosk for resource distribution 10. In other embodiments, the quantity, voltages, locations, etc. of the outlets 238 may vary. Similarly, in other embodiments, the quantity, wattage, locations, etc. of the lights 240 may vary. Some alternate embodiments may use incandescent, fluorescent, compact fluorescent, neon, or other varieties of lights 240.

In some embodiments, the interior lights 240 may be spread across a number of different segments of the housing 12. In some embodiments the lights 240 may be arranged, such that the middle compartment 120 is subjected to approximately 50 candles per square foot, the equivalent to standard office lighting. In some embodiments, the power compartment 200 may be illuminated to a comparatively higher number of candles per square foot. In some embodiments, there may only be one light 240 in the storage area 100.

In some embodiments, the exterior lights 240 may be coupled to the inside of the housing 12. In such embodiments, the lights 240 may be placed behind one or more windows 242 through which they may illuminate an area. In some embodiments, the window(s) 242 may be impact resistant ½" thick, transparent polycarbonate or any other suitable material with any suitable thickness. However, in various other embodiments, the thickness and the material of the one or more windows may vary. In various embodiments, it may be desirable to dispose the exterior lights 240 on the interior of the housing 12 behind a window 242 to prevent damage, theft, etc. of the lights 240.

In some embodiments, the lights 240 may be controlled by manual switches 244. The manual switches 244 may be located on at least one of the interior or exterior of the housing 12. Depending on the embodiment, each individual light 240 may be controlled by its own manual switch 244, or more than one light 240 may be controlled by the same manual switch 244. In some embodiments, at least one of the lights 240 may include a sensor 246 which turns at least one light 240 on or off. In an exemplary embodiment, the exterior lights 240 may include a dawn/dusk sensor 246 which shuts off the lights 240 during daylight hours. In other embodiments at least one of the lights 240 may include other types of sensors 246, such as a motion sensor etc. In embodiments where at least one of the lights 240 includes a sensor 246, the sensor 246 may be manually overridden by one or more manual switch 244. In some embodiments, the at least one manual switch 244 may control other components of the kiosk for resource distribution 10.

In some embodiments, the housing 12 may include at least one ambient air monitor 248. The ambient air monitor 248 may, for example, be a carbon monoxide ("CO") detector. In other embodiments, the housing 12 may also include a smoke detector, etc. in place of or in addition to a CO detector. Such ambient air monitors 248 may help to increase safety of the kiosk for resource distribution 10. In some embodiments, the kiosk for resource distribution 10 may also include at least one fire extinguisher.

Some embodiments of the kiosk for resource distribution 10 may include a safety hatch (not shown) disposed on the housing 12. The safety hatch may be desirable in a variety of situations, including, but not limited to the following: a user accidentally locking themselves in the housing 12, a fire, etc.

Figure 3:
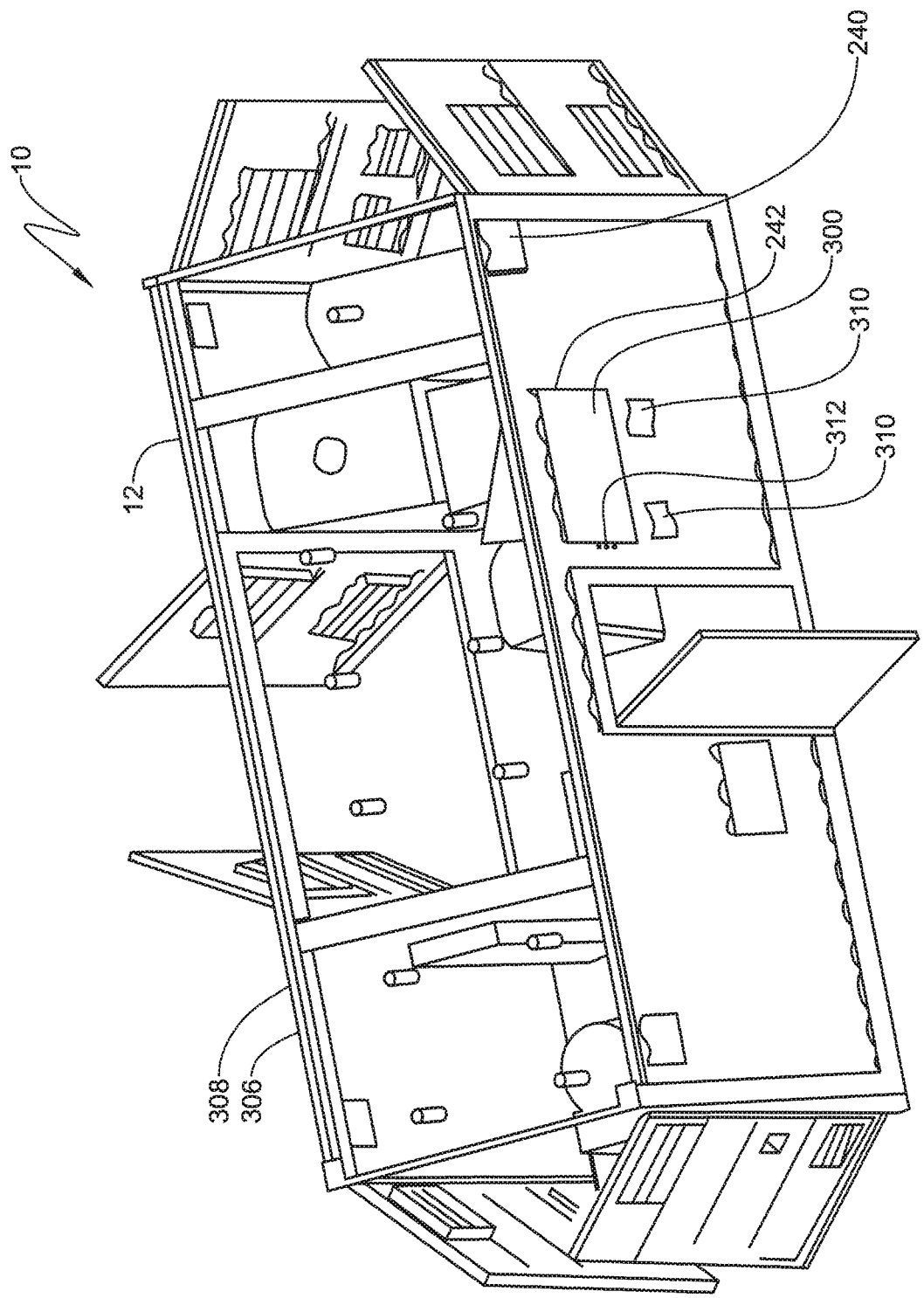
FIG. 3 is a view of a kiosk for resource distribution in accordance with one embodiment of the present disclosure.

Still referring to FIGS. 1-5, in some embodiments, the kiosk for resource distribution 10 may include a TV 300. The TV 300 may be viewable from the exterior of the housing 12. In an exemplary embodiment, the TV 300 is of the flat screen variety which may be desirable/beneficial because a flat screen TV 300 requires less space than other TV 300 varieties. In some specific embodiments, the TV 300 may be a 42" flat screen TV 300. In various embodiments, the TV 300 need not be a flat screen TV 300. As shown in FIG. 3, the TV 300 may be disposed on the interior of the housing 12 such that the screen of the TV 300 is viewable through a window 242. This prevents the TV 300 from being stolen, damaged, etc. In some embodiments, the TV 300 may be on a swing arm, such as the swing arm 2008 described in relation to FIG. 28. This may also help to prevent theft or damage of the TV 300. Some embodiments may include any number of other windows 242 in addition to the windows 242 for the TV 300 and flood lights 240. In an exemplary embodiment the window (s) 242 are made from highly impact resistant, ½" transparent polycarbonate plastic as mentioned above. In various embodiments, the thickness and type of material may vary. In some embodiments, the window (s) 242 may be unobstructed opening in the side of the housing 12 and not include panes. In such embodiments, a security cover (not shown) for the window (s) 242 may be included. In various embodiments, the TV 300 is in communication with a recorded media player (not shown). This enables the kiosk for resource distribution 10 to screen movies, etc. on the TV 300. In some embodiments, the TV 300 may be coupled to at least one of a satellite dish 306 or antenna 308 (see FIG. 7) for its signal. In some embodiments, a projector for projecting the output of the TV 300 may be included in the kiosk for resource distribution 10.

In some embodiments, the TV 300 may be shaded by at least one of the one or more awnings 19 described above. This may be desirable for many reasons, including, but not limited to, its ability to allow the TV 300 to be seen much more easily in highly sunny conditions.

Still referring to FIGS. 1-5, additionally, in some embodiments, the kiosk for resource distribution 10 may also include one or more speakers 310 which may serve as an audio output of the TV 300. In an exemplary embodiment, the one or more speakers 310 are all-weather speakers which are resistant to water, sand, debris, etc. However, in various other embodiments, the speakers 310 may vary. Additionally, in an exemplary embodiment, the one or more speakers 310 are fixedly coupled to the housing 12 from the interior of the housing 12. This may be desirable/beneficial for many reasons including, but not limited to, contribution to prevent damage, theft, etc. of the one or more speakers 310. In some embodiments, the speakers 310 may also be configured such that they may serve as the audio output for a radio (not shown).

In some embodiments, the TV 300 may be controlled manually via an interface panel 312 which is easily accessible. Through the interface panel 312, a user may, for example, be able to adjust the volume, channel, etc. of the TV 300. In other embodiments control of the TV 300 may be accomplished by means of a remote control (not shown) for the TV 300. In some embodiments, the TV 300 may be controlled via both an interface panel 312 and a remote control.

In various embodiments, the TV 300 may be used in a variety of ways, some of which are described below. These examples, however, are merely illustrative and not limiting. For example, in an emergency situation, the TV 300 may be used to provide victims news or other important information. The TV 300 may, moreover, be used as a video link with doctors located offsite. This may be useful for training of medical staff, offsite diagnosis, other tele-medicine applications, etc. In a military application, the TV 300 may be used to provide a video link with other service members, commanders, military hardware, etc. The TV 300 may also be useful in a "hearts and minds" campaign. In embodiments where the kiosk for resource distribution 10 is an entrepreneurial venture, the TV 300 may help make the kiosk for resource distribution 10 a community center. As a microbusiness and community center, the kiosk for resource distribution 10 has more exposure to potential customers. Additionally, an entrepreneur may use the TV 300, recorded media player, and/or projector to make the kiosk for resource distribution 10 function as a theater for which they may charge admission. In some embodiments, at least one of the TV 300, recorded media player, and projector may also be used for educational purposes. In various embodiments, the kiosk for resource distribution 10 may include additional educational components.

Figure 4:
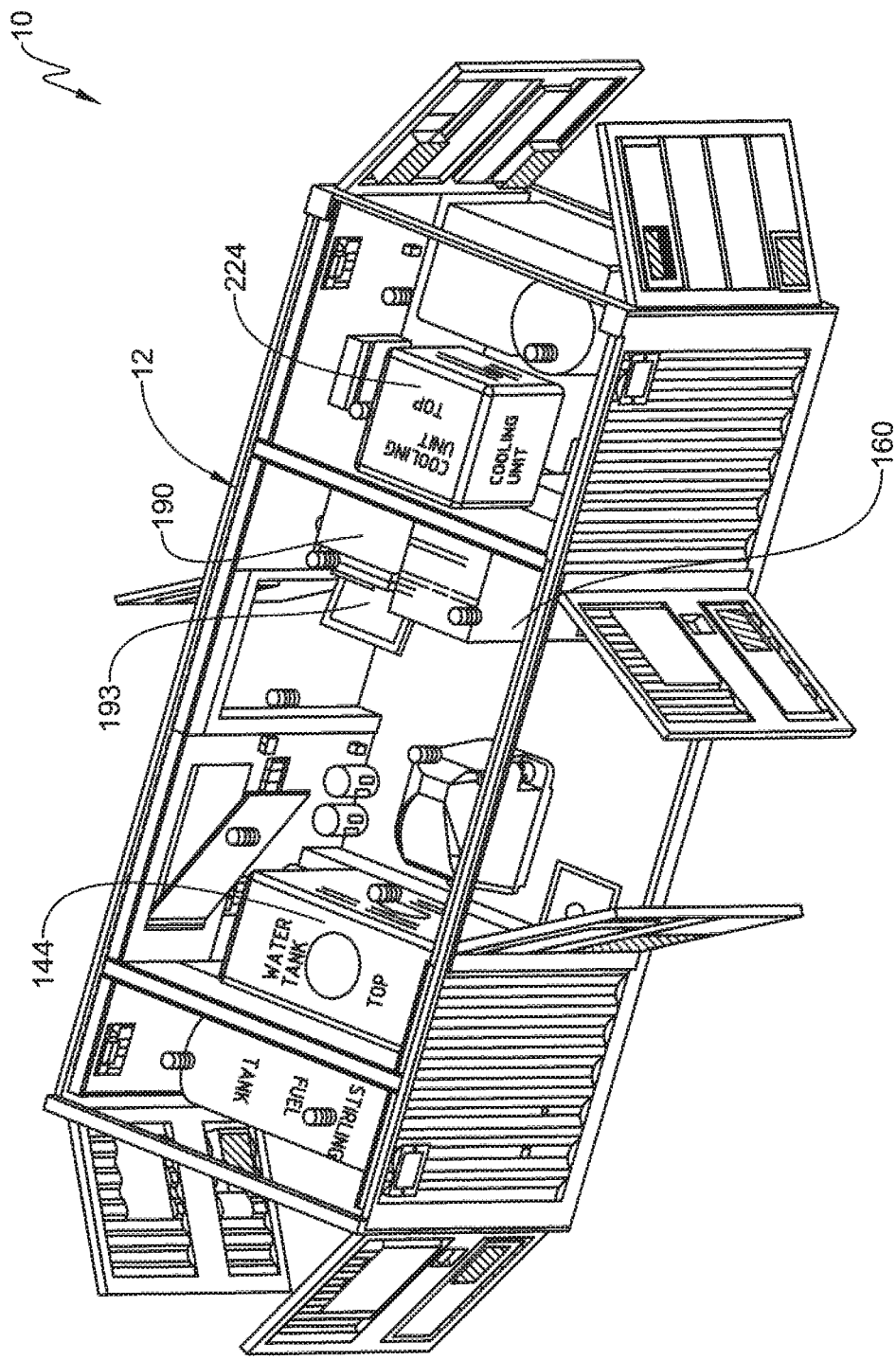
FIG. 4 is a view of a kiosk for resource distribution in accordance with one embodiment of the present disclosure.

Still referring to FIGS. 1-5, in some embodiments, for example FIG. 4, the housing 12 for the kiosk for resource distribution 10 is a storage container. The kiosk for resource distribution 10 in FIG. 4 is arranged similarly to the embodiment depicted in FIGS. 1-3. As shown, the kiosk for resource distribution shown in FIG. 4 only includes a single oven 190. The oven 190 in FIG. 4 has two access doors 193. One of the access doors 193 of the oven 190 allows access to the oven 190 from the exterior of the container. The other access door 193 of the oven 190 allows access to the oven from the interior of the container. The refrigerator 160 is not located next to the product water reservoir 144 as it is in FIGS. 1-3. In some embodiments, the product water reservoir 144 opposite the refrigerator 160, as for example, shown in FIG. 2. As in the embodiment shown in FIG. 4, some embodiments may not include the auxiliary product water reservoir 162 or cooled product water spigot. A radiator 224 is also shown in FIG. 4. The radiator 224 is disposed on the roof (not shown) of the housing 12. As mentioned above, the radiator 224 may be removably coupled to the housing 12 so that it may be removed and stored inside the housing 12 when the kiosk for resource distribution 10 is "closed for business", during inclement weather, when the kiosk for resource distribution is shipped 10, or other instances.

Still referring to FIGS. 1-5, some embodiments of the kiosk for resource distribution 10 include a product water spigot 146 for the product water tank 144 which is only accessible from the interior of the container. As shown, a drain 147 may be placed under the product water spigot 146 so that any spilling or overflow does not pool inside the kiosk for resource distribution 10. In some embodiments, the drain 147 may be cut into the flooring 17 of the kiosk for resource distribution 10. In some embodiments, the drain 147 may be at the lowest point of a basin which is recessed into the floor or flooring 17 of the kiosk for resource distribution 10. Some embodiments may include multiple drains 147. For example, in embodiments where an auxiliary product water reservoir 162 and cooled product water spigot are included, a drain 147 may be disposed under the cooled product water spigot. As is also shown in FIG. 5 the kiosk for resource distribution 10 may also include an ACDC inverter 260. In the example embodiment shown, the ACDC inverter 260 is disposed inside the power compartment 200.

Figure 6:
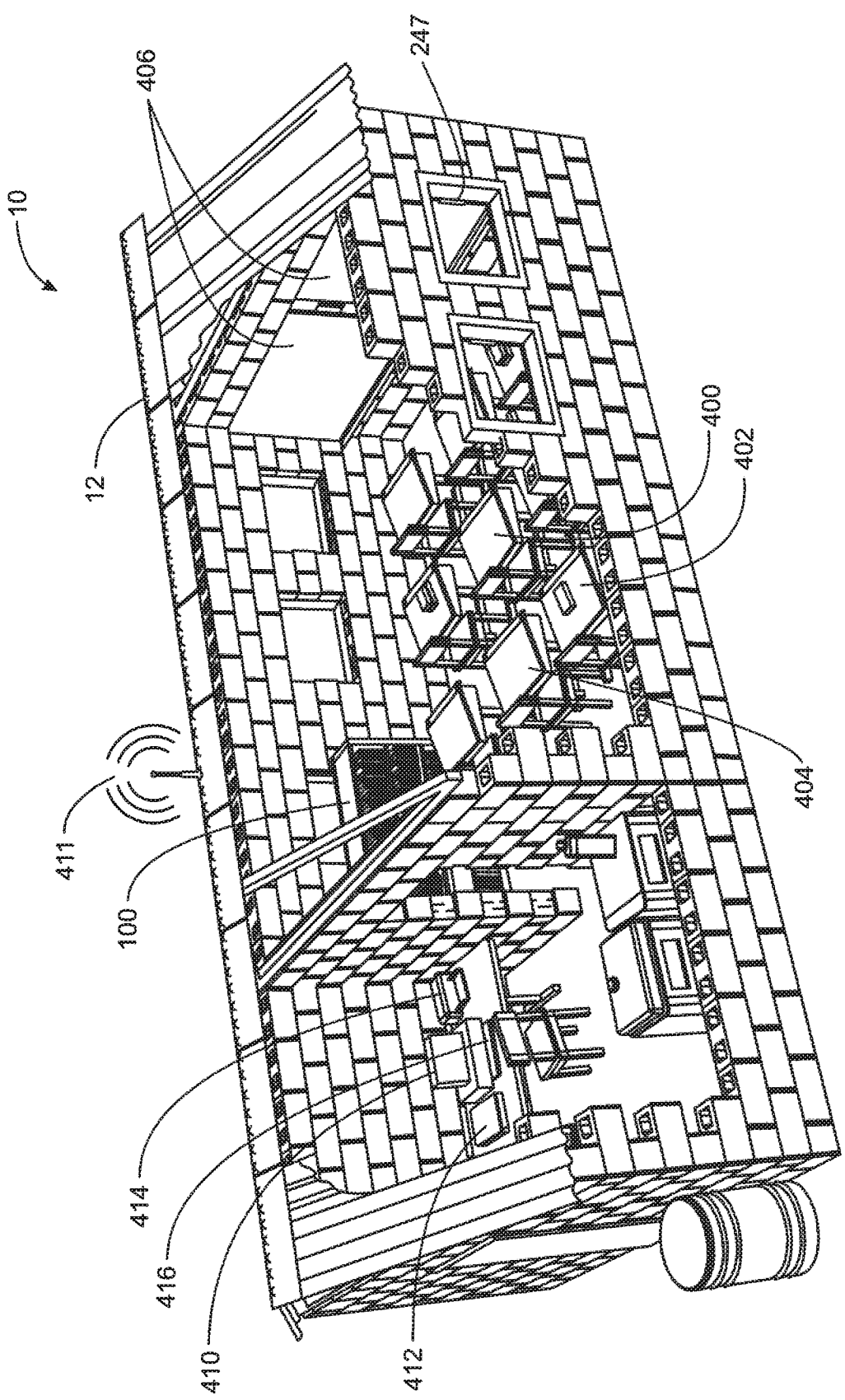
FIG. 6 is a view of a kiosk for resource distribution in accordance with one embodiment of the present disclosure.

Referring to FIG. 6, an embodiment of the kiosk for resource distribution 10 is shown where the housing 12 is a building. At least one part of the housing 12 building is a classroom 400. Though the classroom 400 in FIG. 6 is on the interior of the housing 12, other embodiments with a classroom 400 may locate the classroom 400 elsewhere. In some embodiments, for example, the classroom 400 may be exterior to the housing 12 and/or under an awning 19 (see, for example, FIG. 11). Some embodiments may include other educational spaces in addition to or instead of the classroom 400. For example, a lighted area for studying may be included in the kiosk for resource distribution 10 or around the kiosk for resource distribution 10.

In the non-limiting embodiment depicted in FIG. 6, the classroom 400 may, in some embodiments, include a number of desks 402 and chairs 404. A storage area 100 for books and other learning materials may also be among the elements comprising the kiosk for resource distribution 10. Additionally, as shown in FIG. 6, embodiments including a classroom 400 may further include one or more educational board (s) 406. The educational board (s) 406 may be any of a variety of different educational boards 406 including, but not limited to, chalkboards, whiteboards, blackboards, dry erase boards, smartboards, bulletin boards, and/or cork boards.

In some embodiments, the kiosk for resource distribution 10 may include at least one computer 410. In some embodiments, at least one of the at least one computers 410 may be included as an element of the classroom 400 as shown in FIG. 6. In other embodiments, and referring also to FIG. 7, the at least one computer 410 may not be a part of a classroom 400 as shown in FIG. 6. The at least one computer 410 may be loaded with educational software. In some embodiments, the at least one computer 410 may have an internet connection 411. In various embodiments, the at least one computer 410 may also be in communication with various accessories. In the embodiment depicted in FIG. 6, at least one computer 410 is in communication with a scanner 412, printer 414, and a keyboard 416. Alternate embodiments may include any number of other accessories or combination of accessories such as, but not limited to, one or more of the following: speakers, computer connected weather instruments, and/or a camera for two way video communication to allow remote instruction.

The at least one computer 410 may be used for any number of purposes, such as, but not limited to those described in the following paragraphs. The at least one computer 410 may be used as an online classroom. For example, a student may use the at least one computer 410 to remotely take classes. The at least one computer 410 may also be used to download learning materials, e-books, media, etc. The at least one computer 410 may be used to access news or weather data. In some embodiments, such as the embodiment shown in FIG. 7, the at least one computer 410 may included as part of a cyber café. The local population may use the at least one computer 410 to e-mail or surf the web. In some embodiments, the at least one computer 410 may be used in conjunction with a printer 414 for printed media distribution.

In some embodiments, the at least one computer 410 may be used for online shopping. Items not available directly in the kiosk for resource distribution 10 may be purchased over the internet via the at least one computer 410. The kiosk for resource distribution 10 may be used as a post office or shipping destination where such items may be delivered and picked up. In such embodiments, other mail may also be delivered to the kiosk for resource distribution 10. The at least one computer 410 may also be used to open up local products and crafts to the global market. The at least one computer 410 may also enable an entrepreneur to purchase various parts to run a repair shop. In some embodiments, the at least one computer 410 may be used to solicit micro-loans online or conduct other financial affairs such as banking.

Figure 7:
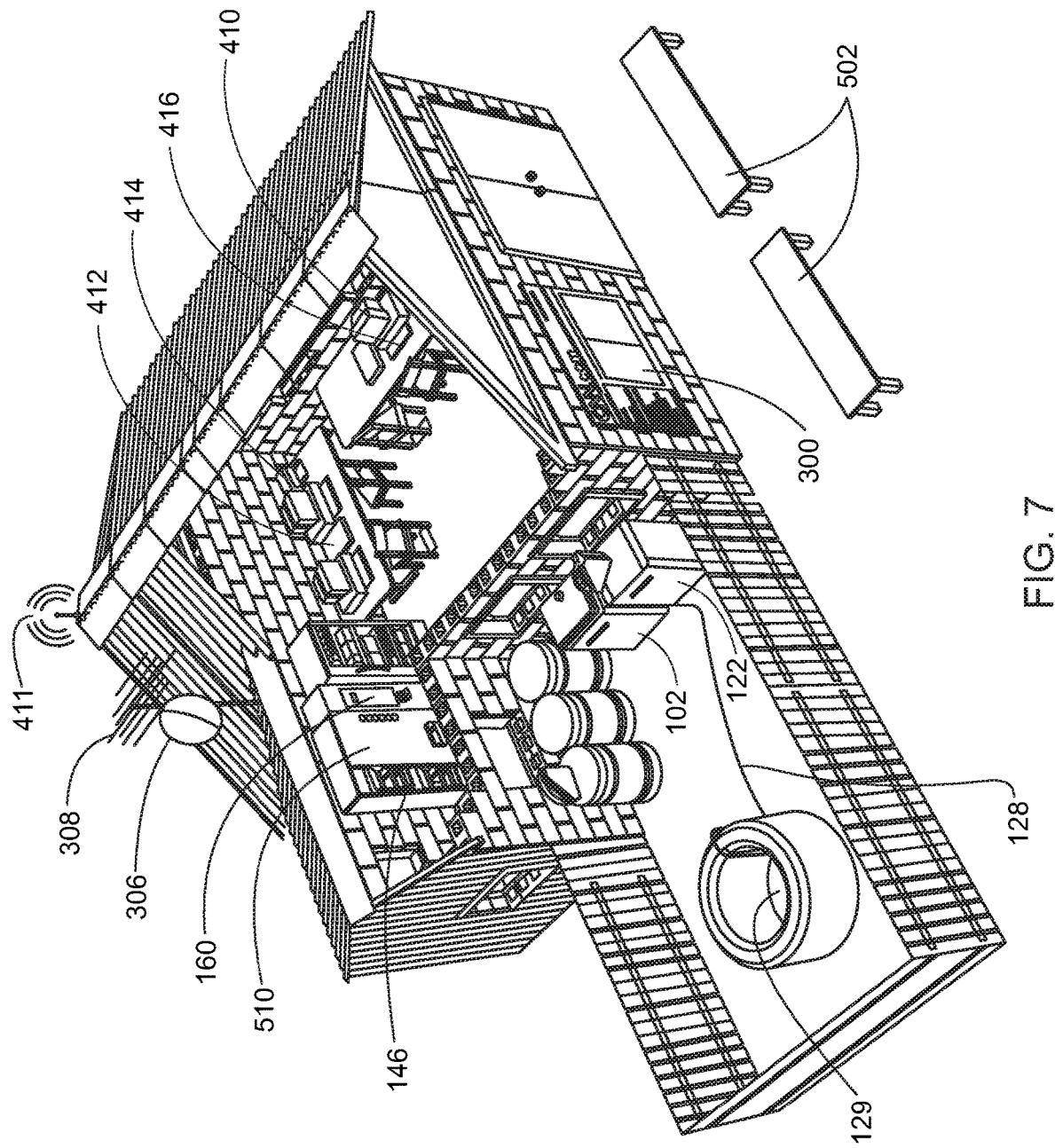
FIG. 7 is a view of a kiosk for resource distribution in accordance with one embodiment of the present disclosure.

Referring now also to FIG. 7, in some embodiments, the kiosk for resource distribution 10 may be surrounded by at least one seat, and in some embodiments, seating 502. In some embodiments, the area surrounding the kiosk for resource distribution 10 may also be prepared such that it is suitable for standing and walking. The seating 502 may encourage the kiosk for resource distribution 10 to be used as a community center where people come to meet and socialize. This helps to ensure a flow of potential customers around the kiosk for resource distribution 10. In some embodiments, the seating 502 may be included in embodiments where the kiosk for resource distribution 10 operates a café, bakery, restaurant, etc. to provide a place to sit while eating.

In various embodiments, such as the one illustrated in FIG. 7, at least one refrigerator 160 may be included as part of a larger vending machine unit 510. The vending machine unit 510 may include a monetarily operated mechanism which controls the dispensing of products from the vending machine 510. In some embodiments, the vending machine 510 may also include the product water spigot 146 and the cooled product water spigot.

Figure 8:
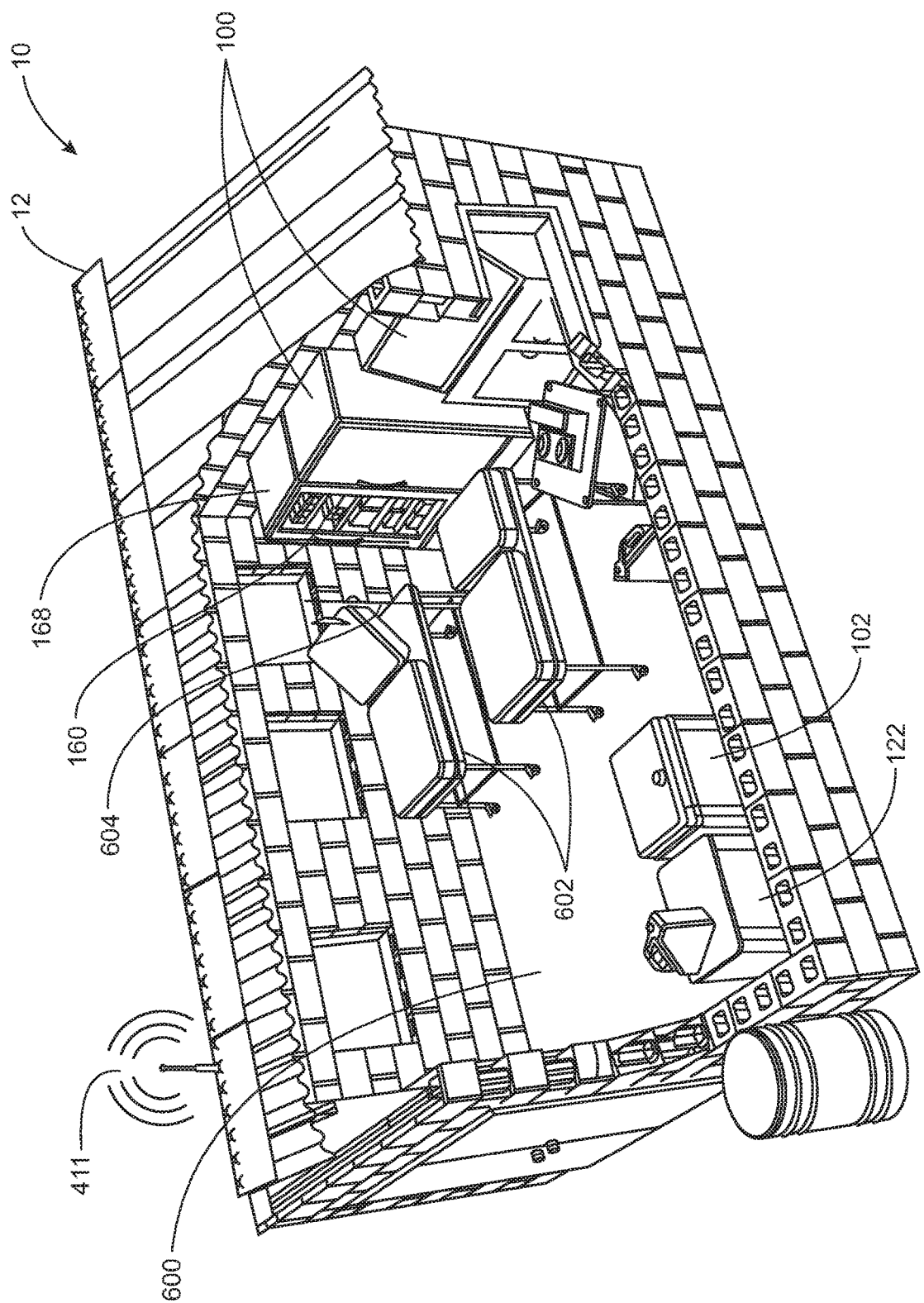
FIG. 8 is a view of a kiosk for resource distribution in accordance with one embodiment of the present disclosure.

Referring now also to FIG. 8, an embodiment of the kiosk for resource distribution 10 where the housing 12 is a building is depicted. As shown in FIG. 8, the kiosk for resource distribution 10 may include a medical clinic 600. In embodiments including a medical clinic 600, the medical clinic 600 may include various medical equipment. In some embodiments, the various medical equipment may include, but is not limited to, beds 602 and/or examination tables for patients of the medical clinic 600. In some embodiments, the various medical equipment may also include one or more medical poles 604 such as, but not limited to IV poles. As shown in FIG. 8, the kiosk for resource distribution 10 may also include one or more refrigerators 160. In the embodiment shown, the medical refrigeration section 168 of the refrigerator 160 includes its own refrigerator 160. Additionally, the medical clinic 600 may have a storage area 100 for storing non-temperature sensitive medical supplies such as, but not limited to, bandages, nutrition packages, vitamins, sexual health supplies, anti-malarial medicine, medical instruments etc. In some embodiments, the medical clinic 600 may include, for example, at least one water distillation device 122 and at least one fuel requiring element 102 to ensure a reliable power supply. The medical clinic, in some embodiments, may also include an internet connection 411. In some embodiments, one or more storage area 100 may additionally be included in various embodiments of the medical clinic 600.

In some embodiments, the medical clinic 600 may be a veterinary clinic for live stock, pets, etc. In some embodiments where the kiosk for resource distribution 10 is an entrepreneurial business, disaster relief installation, or includes a medical clinic 600 the kiosk for resource distribution 10 may function as a medical supply center. In such embodiments, people may come to the kiosk for resource distribution to purchase or be given medical supplies such as bandages, anti-septic, vitamins, sexual health supplies, medicines, etc.

Referring now also to FIG. 9, one of many alternate embodiments of the kiosk for resource distribution 10 where the kiosk for resource distribution 10 may be largely automated is shown. As shown in FIG. 9, the housing 12 may resemble a pavilion. The housing 12 may comprise a central stand/display area 700. The stand/display area 700 may include at least one TV 300. Additionally, the stand/display area 700 may include at least one vending machine 510. In the embodiment shown in FIG. 9, there are two vending machines 510. One of the vending machines 510 may dispense at least one or both product water, and/or cooled product water, via a product water spigot 146 and/or cooled product water spigot. The other vending machine 510 may be used to dispense commercial beverages, snacks, nutrition supplements, etc. The source water reservoir 124, product water reservoir 144, water distillation device 122, fuel requiring element 102, and any other relevant components may be housed inside the stand/display 700. Some embodiments may include at least one door 16 which provides access to the interior of the stand/display 700 to allow for maintenance, service, etc.

As shown in FIG. 9, the kiosk for resource distribution 10 may include one or more solar panels 702. The solar panels 702 may be used to supplement power generated by the at least one fuel requiring element 102 or may be used in place of the fuel requiring element 102 in some embodiments. As shown in FIG. 9, the solar panel 702 may be located on the roof of the housing 12 to maximize sun exposure. In some embodiments, the solar panel 702 may be disposed on the roof of an awning 19 such as one of those described in reference to FIGS. 1-5. In some embodiments, a number of solar panels 702 may be included on the roof of an awning 19. This may be desirable because the awning 19 may be much easier to reposition, if necessary, than the housing 12 of the kiosk for resource distribution 10.

In some embodiments, a wind turbine (not shown) may also be included. The wind turbine may be used in place of the fuel requiring element 102 or the solar panel 702 or may be used in any combination therewith. In some embodiments, the kiosk for resource distribution 10 may be tied to a power grid. In such embodiments, the kiosk for resource distribution 10 may not include a fuel requiring element 102, solar panel 702, or other power generating device. In some other embodiments where the kiosk for resource distribution 10 is grid tied, a fuel requiring element 102, solar panel 702, or other power generating device may be included as a back up or supplement to grid power.

As shown in FIG. 9, the kiosk for resource distribution 10 may also include an internet connection 411 and in these embodiments, the kiosk for resource distribution 10 may function as a WiFi hot spot. In some embodiments, the kiosk for resource distribution may also include a FAX machine (not shown), phone 704, bank of phones 704, etc. The phone 704 or phones 704 may, for example, be pay phones 704 or rentable cell phones 704. In some embodiments, the kiosk for resource distribution 10 may also include at least one laundering element (not shown) to clean and/or dry clothing, linens, etc. In some embodiments, such as the substantially automated embodiment of the kiosk for resource distribution 10 shown in FIG. 9, the laundering element may include a monetarily operated mechanism. In such embodiments, the monetarily operated mechanism may enable a kiosk for resource distribution 10 to charge for laundry services.

In some embodiments, such as the embodiment shown in FIG. 9, various equipment may be rented out from the kiosk for resource distribution 10. Such equipment may be outdoor gear, electronics, batteries, bicycles, etc. The equipment may be lent out by the entrepreneur or, as may be the case in the example embodiment in FIG. 9, an automated process. Especially in the latter scenario, the equipment may include an identifier such as an RFID tag which aids in tracking rental and return of the equipment. In some embodiments, equipment from one kiosk for resource distribution 10 may be returned to another kiosk for resource distribution 10 which shares equipment resources with the kiosk for resource distribution 10 from which the piece of equipment was rented.

Figure 10:
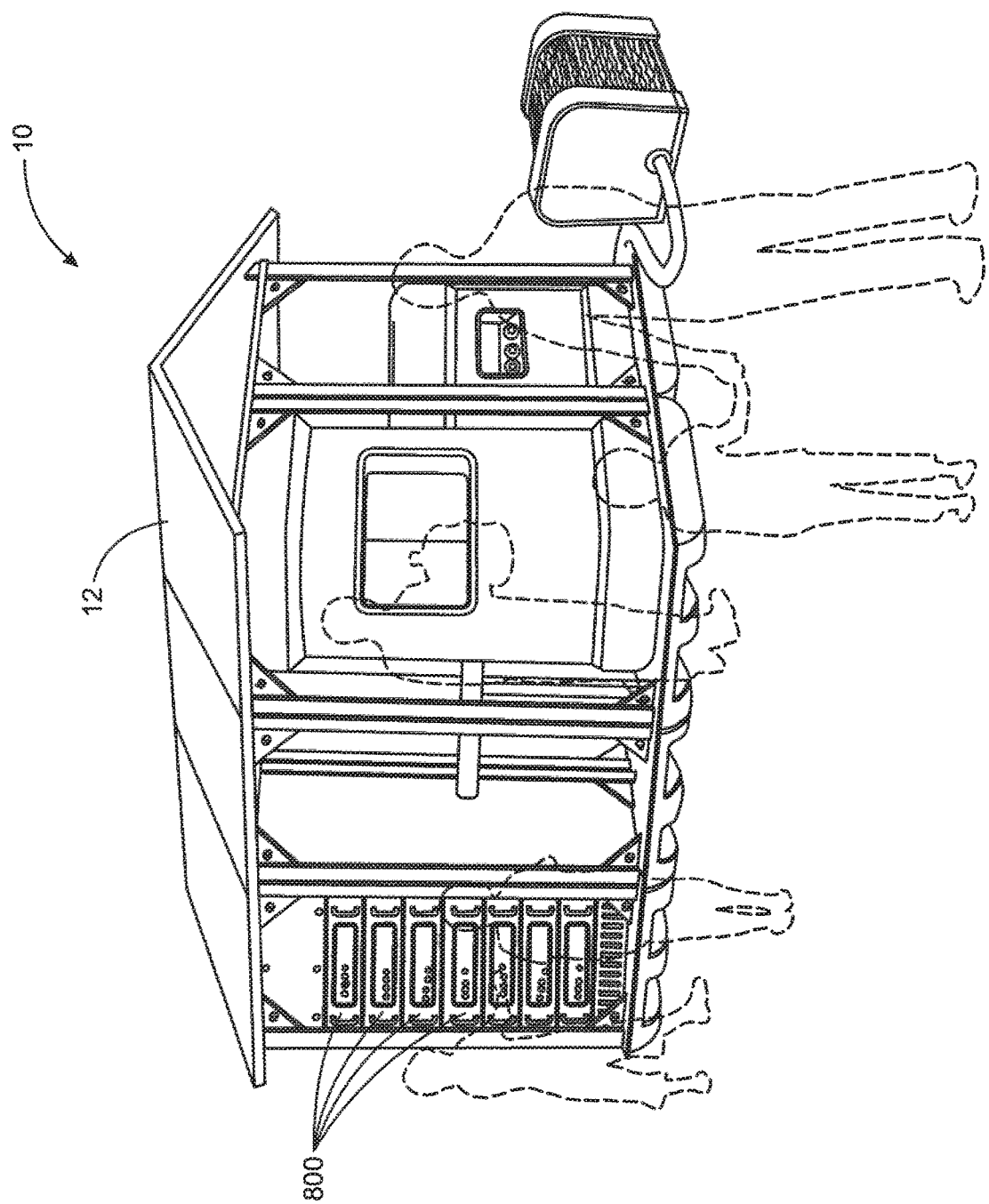
FIG. 10 is a view of a kiosk for resource distribution in accordance with one embodiment of the present disclosure.

Referring now also to FIG. 10, another embodiment of a kiosk for resource distribution 10 is shown. As shown in FIG. 10, the kiosk 10 may include a shed type housing 12 open on all sides. Additionally, as shown in FIG. 10, the kiosk for resource distribution 10 may also include at least one charging station 800 to make the kiosk for resource distribution 10 a source for portable energy. The charging station 800 may allow patrons to use the kiosk for resource distribution 10 to charge any number of items, including, but not limited to, batteries such as portable batteries, cell phones, laptops, flashlights, vehicles, media players, GPS devices, etc. In some embodiments, the charging station 800 may include a number of power strips which a user may plug into and draw power from. Other embodiments may feature USB charging ports, etc. In some embodiments, the kiosk for resource distribution 10 may charge batteries or various other devices which may then be rented out to the local population. Various embodiments of the embodiment shown in FIG. 10 may include one or more features shown and described herein with respect to FIGS. 1-9 or any other embodiments detailed herein.

Figure 11:
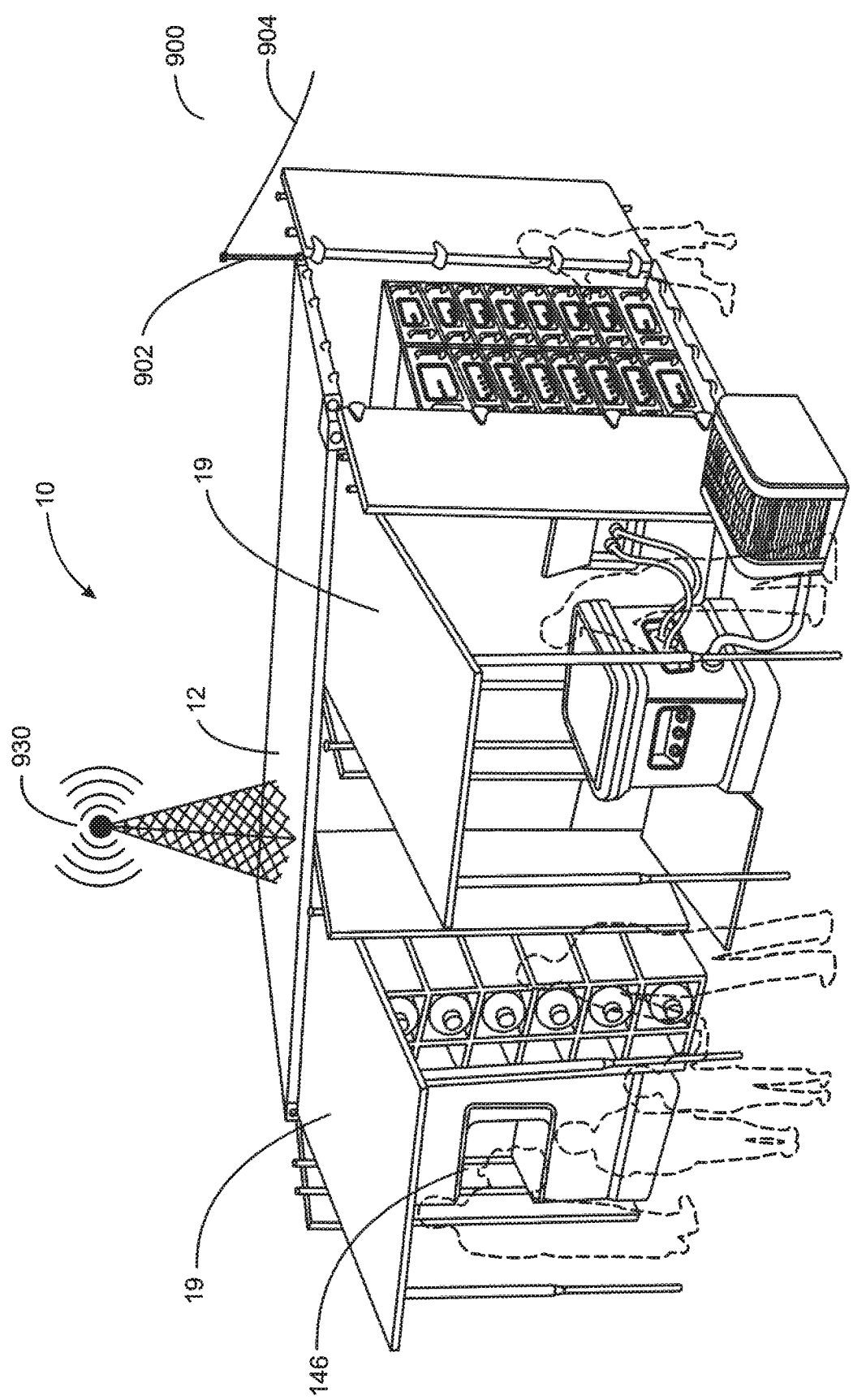
FIG. 11 is a view of a kiosk for resource distribution in accordance with one embodiment of the present disclosure.

Referring now also to FIG. 11, a number of charging stations 800 are shown in one of many possible embodiments where the housing 12 is a shipping container. In addition to charging stations 800, the kiosk for resource distribution 10 may provide power or other services via a mini-grid 900. As shown in FIG. 9, the mini-grid 900 includes at least one or more utility poles 902. The utility poles 902 may support at least one utility cable 904. The mini-grid 900 may, for example, be used to provide power to light surrounding dwellings, street lights, stores, study spaces, etc. In some embodiments, the mini-grid 900 may be used to electrify a small village.

Some embodiments, such as the one shown in FIG. 11, may also include a cellular communications tower 930. The cellular communications tower 930 may be used to provide cell phone service to an area in the vicinity of the kiosk for resource distribution 10. In some embodiments, the cellular communications tower 930 may include a daisy chain link to other cellular stations or other cellular communications towers 930 on other kiosks for resource distribution 10. In some embodiments, the kiosk for resource distribution 10 may include a broadcasting tower (not shown).

In some embodiments, the kiosk for resource distribution 10 or at least one component of the kiosk for resource distribution 10 may communicate information to an external device via the cellular communication tower 930. In other embodiments, communication of information may be accomplished via a satellite link, internet link, short wave radio, ultra high frequency radio, etc. This may also allow the kiosk for resource distribution 10 to be used, for example, as a bush pilot tower. This may allow remote monitoring of the kiosk for resource distribution 10. Remote monitoring may be desirable for a variety of reasons, including, but not limited to, determining if a problem requiring maintenance exists with the kiosk for resource distribution 10, if a vending machine 510 or inventory requires restocking, or determining where a stolen element of the kiosk for resource distribution 10 was taken.

As shown in FIG. 11, the kiosk for resource distribution 10 may include a storage area for a number of consumer product water containers 940. The consumer product water containers 940 may be stored full or may be picked up by the customer and filled from the product water spigot 146 or cooled product water spigot. In some embodiments, the consumer product water containers 940 may be lent out in a deposit-refund system to encourage reuse. In other embodiments the consumer product water containers 940 may be a product sold by a kiosk for resource distribution 10. In some embodiments, the consumer product water containers 940 may be brought to a customer's residence by staff of the kiosk for resource distribution 10 as part of a delivery service. In some embodiments, the consumer product water containers 940 may be designed such that they facilitate being carried over long distances. Additionally, the consumer product water containers 940 may be designed to require a specific filling aid to help ensure they are not filled with gasoline, pesticides, and/or other potentially harmful if ingested liquids, after use and then returned to a kiosk for resource distribution 10. In some embodiments, a consumer product water container 940 may include a dispensing fitting (not shown) which may be used to dispense the contents of a consumer product water container 940. This may be beneficial for many reasons, including, but not limited to, making it easier to pour from the container and may help to keep the container cleaner. In various embodiments, consumer product water containers 940 may be made of a clear plastic material to allow UV to penetrate the container and help to kill any bacteria which may be present in the consumer product water container 940. However, in various other embodiments, the consumer product water containers 940 may be made from any material.

In some embodiments, the kiosk for resource distribution 10 may provide consumer product water container 940 sanitation. In a specific embodiment, waste heat from a fuel requiring element 102 may be used to generate steam to steam clean consumer product water containers 940. In various embodiments, other sanitization methods may also be used, which may include, but are not limited to, chemical sanitization treatments. In some embodiments, a consumer may procure product water using a sanitized consumer product water container 940 provided by the kiosk for resource distribution 10. In some embodiments, using the product water container 940 provided by the kiosk for resource distribution 10 may be required to procure product water. This may help to ensure that the clean product water is not fouled by a contaminated, consumer provided vessel. In some embodiments, consumer product water containers 940 may include labels (not shown). The labels may include various information, including, but not limited to, one or more of instructions for proper use, warnings against misuse, and/or sanitation education information.

Figure 12:
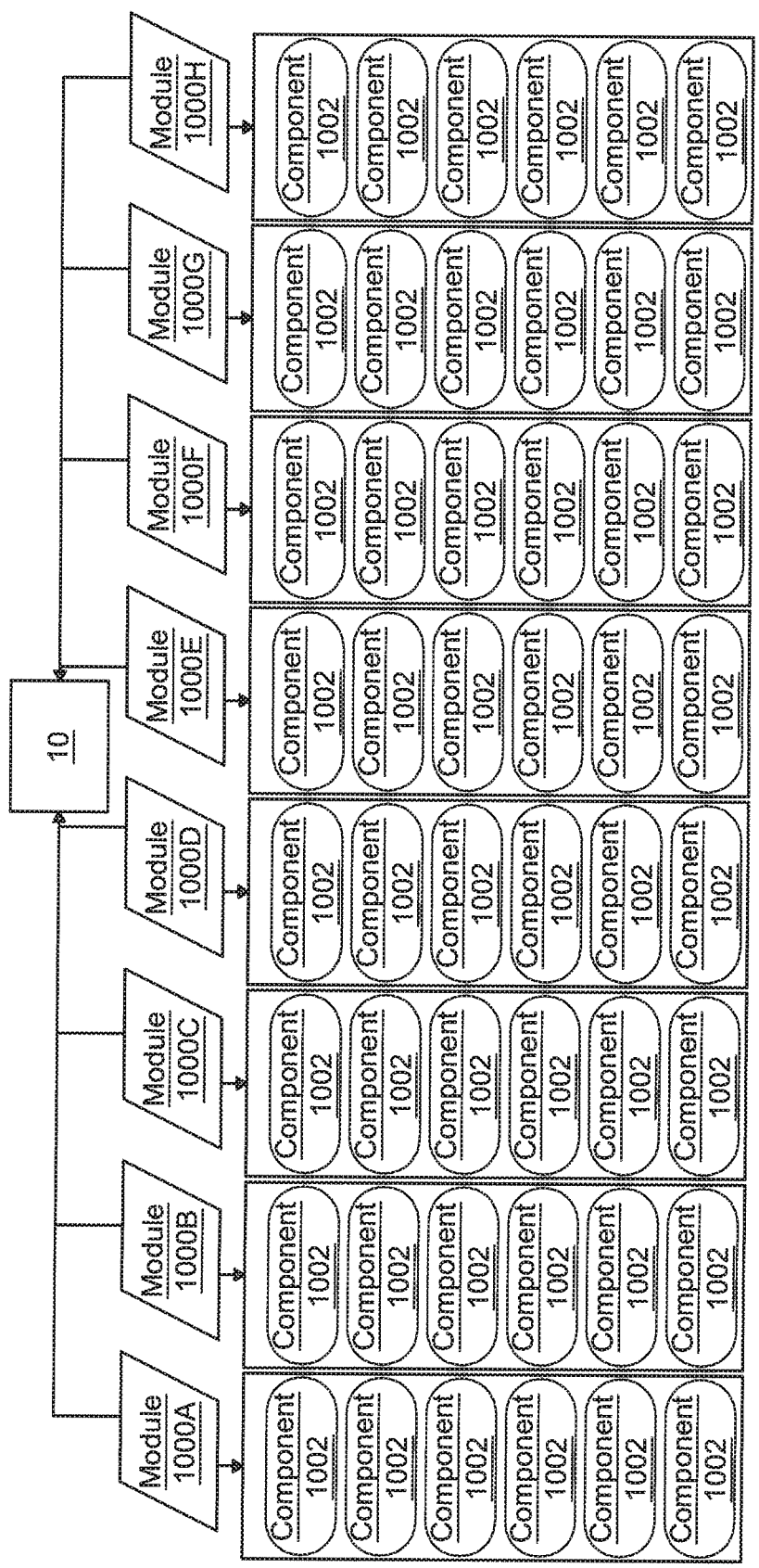
FIG. 12 is a block diagram of a kiosk for resource distribution which includes a number of modules each of which include a number of components in accordance with one embodiment of the present disclosure.

Referring also to FIG. 12, an example block diagram is shown. As shown, the block diagram illustrates a kiosk for resource distribution 10 where the kiosk for resource distribution 10 is built up from one or a number of modules 1000. As shown, the kiosk for resource distribution 10 in FIG. 12 includes eight different modules 1000 (module 1000A-

1000H). Each of the modules 1000 may include of a number of different components 1002. In the example block diagram each module 1000 includes six components 1002. In some embodiments, each module 1000 may not include the same number of components 1002. In some embodiments, at least one module 1000 may include more than six components 1002. In some embodiments, at least one module 1000 may include less than six components 1002. In some embodiments, modules 1000 may include a number of components 1002 and may or may not include a number of additional, optional components 1002. In some embodiments, at least one component 1002 may include one or a number of options (not shown in FIG. 12) which may or may not be included in the component 1002.

The modules 1000 may include all components 1002 necessary to perform or implement a core function or core usage of the kiosk for resource distribution 10. The modules 1000 may be standardized and easily assembled on site without the need for heavy machinery, advanced technology, or skilled workers. The modules 1000 may be sized such that they may easily be transported. In some embodiments, use of modules 1000 may increase deployability of the kiosk for resource distribution 10 because the individual modules 1000 may be made light enough to be carried to location by a helicopter. In some embodiments, the modules 1000 or specific modules 1000 may come pre-assembled. Each module 1000 may be constructed such that it may easily interface or intermix with any other module 1000 when put together in a housing 12. In some embodiments the components 1002 of each module 1000 may not be pre-assembled. In such embodiments, the components 1002 may be arranged on site, for example, in what is determined to be the most spatially efficacious manner. In some embodiments, at least one module 1000 may come as a kit of parts.

The modules 1000 allow the kiosk for resource distribution 10 to be easily customized or adjusted to suit the needs of an intended use, geographical location, etc. or to best use available local resources. Depending on the intended use, geographical location, available resources, etc. one may pick and choose from a number of different possible modules 1000, selecting modules 1000 which are optimally suited. Since any module 1000 may easily interface with any other module 1000, there is no need to completely redesign a kiosk for resource distribution 10 for every different geographical location, use, etc. For a specific example, a kiosk for resource distribution 10 to be used in a disaster relief scenario may include modules 1000 for providing power, clean water, and medical care. Other possible modules 1000 may be used for education, entertainment, retail, culinary, fuel production, scientific purposes, storage, processing/manufacture (e.g. tailoring, welding, butchering, milling, seed preparation, etc.), communication, or any other purpose. The modules 1000 may be mixed and matched to easily build up a kiosk for resource distribution 10 which best serves any specific scenario.

Modules may also, in some cases, be desirable as stand-alone elements. In some embodiments, a water module 1100 (see, for example, FIG. 13) may be used as a stand-alone element in a number of scenarios. In some embodiments, a water module 1100 may be provided as a stand-alone element for a medical clinic or a school which would otherwise not have reliable access to safe water. Similarly, in some embodiments, a power module 1600 (see, for example, FIG. 16) may be desirable as a stand-alone element. In some embodiments, a power module 1600 may be provided to a medical clinic tied to an unreliable power grid.

Figure 13:
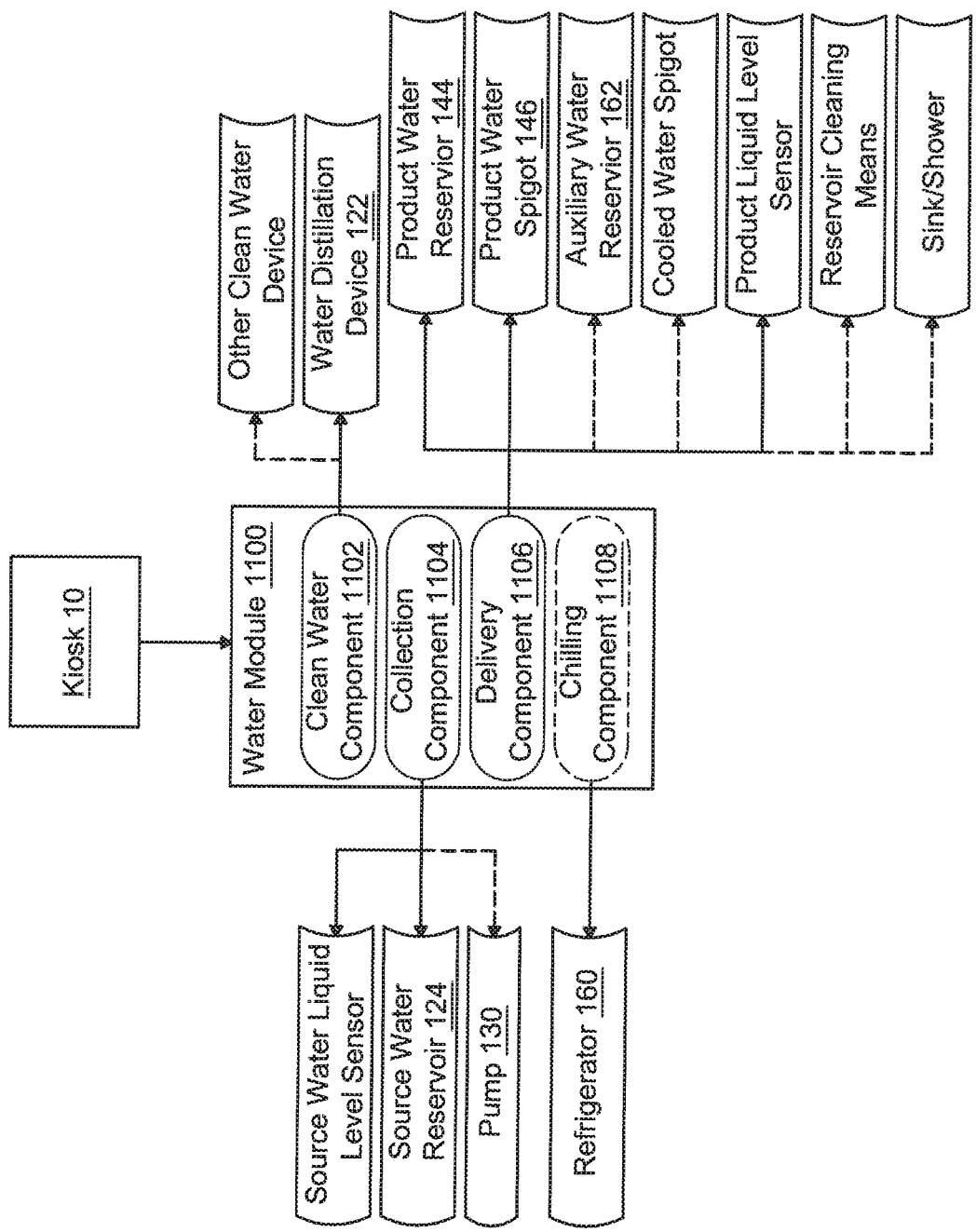
FIG. 13 is a block diagram of a module of a kiosk for resource distribution in accordance with one embodiment of the present disclosure.

Referring also to FIG. 13 an example block diagram of an example water module 1100 for a kiosk for resource distribution 10 is shown. A water module 1100 may be included in a kiosk for resource distribution 10 for example, for use in areas with limited or no access to safe water. In areas with sufficient access to safe water, a water module 1100 may not be included in the kiosk for resource distribution 10. In some embodiments, the water module 1100 may be substituted with another module 1000 which better serves the needs of a specific location.

Still referring to FIG. 13, as shown, the example water module 1100 includes four components 1002 one of which is optional. The example water module 1100 includes a clean water component 1102, collection component 1104, delivery component 1106 and an optional chilling component 1108. As shown in the example embodiment of the water module 1100, the clean water component 1102 includes a water distillation device 122. In some embodiments, the clean water component 1102 may include another clean water device which is not a water distillation device 122. In some embodiments, the other clean water component 1102 may be a second water distillation device 122. In some embodiments, the clean water component 1102 may include a single clean water device which is not a water distillation device 122. In some embodiments, the clean water component 1102 may be made up of other elements in addition to or in place of those shown in FIG. 13.

The water module 1100 may also include a collection component 1104 as shown in the example block diagram in FIG. 13. As shown, the collection component 1104 may include a source water reservoir 124. The source water reservoir 124 may be any type of reservoir, such as, but not limited to those described above. The exemplary collection component 1104 includes a source water liquid level sensor. The collection component 1104 may also optionally include a pump 130. In various embodiments, the collection component 1104 may include other elements in addition to or in place of those shown in FIG. 13.

The example water module 1100 in FIG. 13 also includes a delivery component 1106 to deliver the clean, product water to a consumer. As shown, the example delivery component 1106 includes a product water reservoir 144. The product water reservoir 144 may be any type of reservoir, such as, but not limited to those described above. A product water spigot 146 and product liquid level sensor are also included in the delivery component 1106 of the example water module 1100 shown in FIG. 13. In some embodiments, the delivery component 1106 may optionally include an auxiliary water reservoir 162 which may be any type of reservoir, such as but not limited to those described above. The delivery component 1106 may also include a cooled water spigot and a reservoir cleaning means.

In some embodiments, the water module 1108 may additionally include other options as additional components 1002. For purposes of example, an optional chilling component 1108 is included in the water module 1100 in FIG. 13. The chilling component 1108 in the example block diagram includes a refrigerator 160. In some embodiments, the refrigerator 160 may be included in a separate module 1000. In some embodiments, other components 1002 may be included. Various connectors, conduits, electrical wiring, etc. may also be included in the water module 1100 to couple various components 1002 of the water module 1100 together and to interface with another module 1000 or modules 1000.

Figure 14:
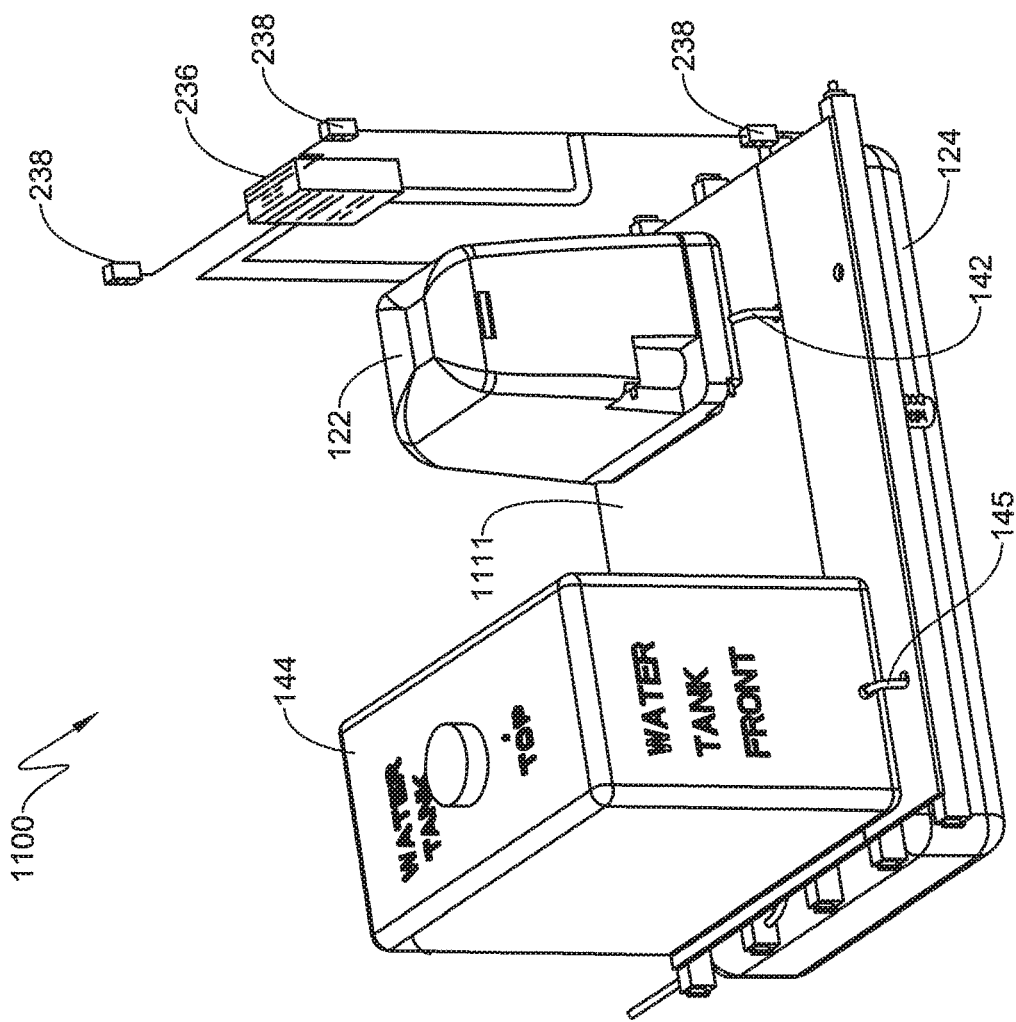
FIG. 14 is a view of a water module in accordance with one embodiment of the present disclosure.

Referring now also to FIG. 14 an isometric view of an example water module 1100 is shown. As shown, the example water module 1100 includes a floor 1111. Under the floor 1111 a source water reservoir 124 is disposed. The water module 1100 also includes a water device which in the example embodiment is a water distillation device 122. The water device may be in communication with the source water reservoir 124 via a source-to-still intake conduit 142. As shown, a product water reservoir 144 may also be included, in some embodiments, for example, in the example water module 1100 in FIG. 14. The product water reservoir 144 may be in communication with water device via a still-to-product reservoir conduit 145. In some embodiments where a large capacity for safe water production is desirable, multiple water modules 1100 such as the water module 1100 shown in FIG. 14 may be included in the kiosk for resource distribution 10. In various embodiments of water modules 1100, a number of other components may be included. In some embodiments, water modules 1100 may include water pumps for collection of source water and distribution of product water.

An electrical distribution box 236 and a number of outlets 238 are also visible in FIG. 14. In some embodiments, the electrical distribution box 236 and outlets 238 may not be included as part of the water module 1100. For example, in some embodiments, they may be included as part of a battery bank module 1200 (see FIG. 15) or power module 1600 (see FIG. 16). In some embodiments, the outlets 238 may be included as part of an interior module (not shown).

Figure 15:
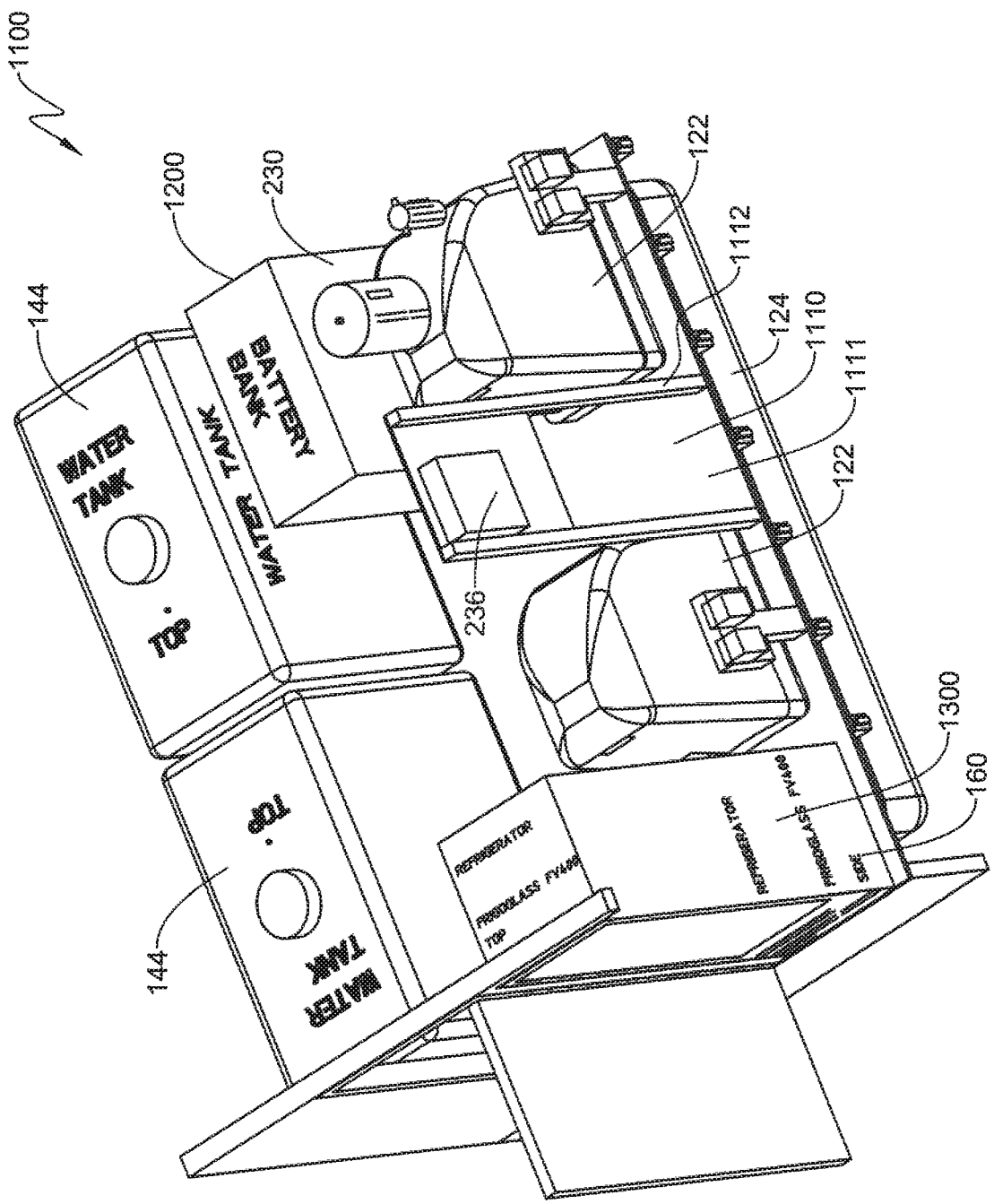
FIG. 15 is a view of a water module in accordance with one embodiment of the present disclosure.

Referring now also to FIG. 15, an isometric view of an example water module 1100, battery module 1200, and refrigeration module 1300 is shown. The example water module 1100 shown includes a frame component 1110. As shown, the example water module 1110 includes a floor 1111, but does not include walls. The frame component 1110 instead includes a stand structure 1112. In some embodiments, walls may be included as part of an interior module (not shown). In some embodiments, the water module 1100 may not include the frame component 1110. In such embodiments, the floor 1111 and stand structure 1112 may be included as part of an interior module and not as part of the water module 1100. In some embodiments, the interior module may include all of the wall materials 15, flooring 17, lights, 240 outlets 238. (see, for example, FIGS. 1-5) of the kiosk for resource distribution 10.

Under the floor 1111 of the example water module 1100 is a source water reservoir 124. As shown, the example water module 1100 includes two water devices which are water distillation devices 122. Some embodiments may only include a single water device (see FIG. 14) or more than two water devices. The example water module 1100 also includes two product water reservoirs 144. The water module 1100 may also include plumbing such as the source-to-still intake conduit 142 (see FIG. 14) and still-to-product reservoir conduit 145 (see FIG. 14). In some embodiments, the plumbing may be integrated into the frame component 1110. In some embodiments, the water module 1100 may include a water output metering system, a sink, a shower, various spigots etc. In some embodiments, a source water pump 130 and hose may also be included as part of the water module 1100.

An embodiment of a battery bank module 1200 is also shown in FIG. 15. In some embodiments, the battery bank module 1200 includes a battery bank 230. The battery bank 230 may be connected to a power source to charge the battery bank 230 of the battery bank module 1200. The power source may include, but is not limited to, one or more of the following: an electrical grid, fuel requiring element 102, or any other suitable power source. The battery bank module 1200, in some embodiments, includes an electrical distribution box 236 which may be coupled to the stand structure 1112 in the example embodiment. In some embodiments, battery bank modules 1200 may also include battery charge and monitoring controllers (not shown). The refrigeration module 1300 shown in FIG. 15 includes a refrigerator 160. In some embodiments, the refrigeration module 1300 may also include a freezer, segregated medical refrigeration section 168 (see, for example, FIG. 26).

Figure 16:
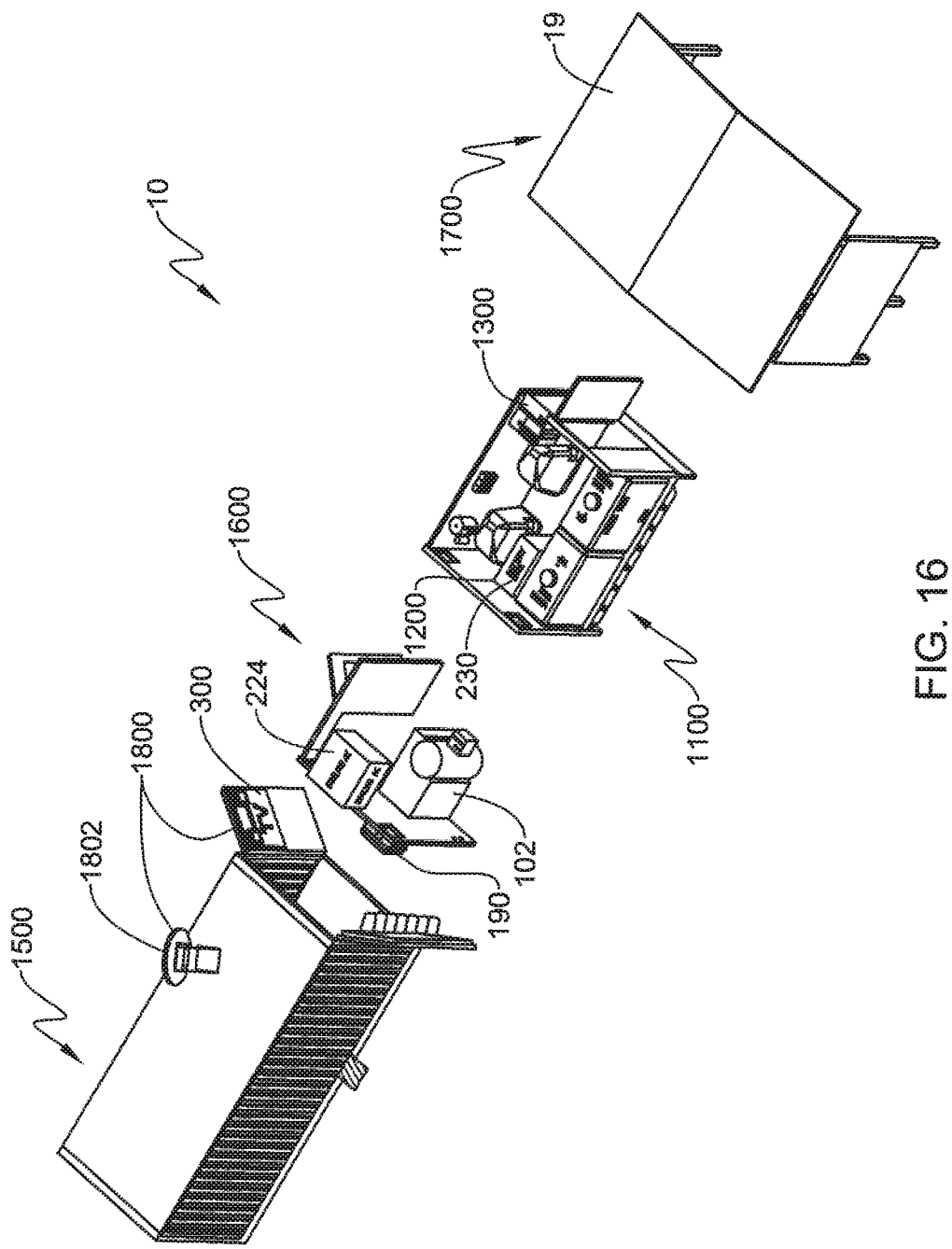
FIG. 16 is an exploded view of a modular kiosk for resource distribution in accordance with one embodiment of the present disclosure.

Referring now also to FIG. 16, an exploded view of an example kiosk for resource distribution 10 which includes a number of different modules is shown. As shown, the kiosk for resource distribution 10 includes a structure module 1500, a power module 1600, a water module 1100, battery bank module 1200, refrigeration module 1300, an awning module 1700, and a communication module 1800. A kiosk for resource distribution 10 assembled from the structure module 1500, power module 1600, water module 1100, battery bank module 1200, refrigeration module 1300, awning module 1700, and communication module 1800 as shown may be best suited for a location with limited or no access to electricity and safe water.

Still referring also to FIG. 16, as shown the structure module 1500 is a housing 12. Specifically, the shown structure module 1500 is a 20×8×8 foot shipping container. In some embodiments, the structure module 1500 may be a structure which is pre-existing on site. In some alternate embodiments, the structure module 1500 may be a structure which is assembled out of materials readily available on site (e.g. concrete masonry units).

As mentioned above, in some embodiments, modules may be provided in a standard size. This may be desirable/ beneficial for many reasons, including, but not limited to, it may allow the modules to be easily placed into the structure module 1500 when the modules are conglomerated into the kiosk for resource distribution 10. This may also allow the kiosk for resource distribution 10 to be quickly constructed. In the example embodiment, modules are sized to be placed/ slid inside the 20×8×8 shipping container.

In various embodiments, the structure module 1500 may be constructed such that minimal modification is needed. In some embodiments, the structure module 1500 may only need to have openings cut into the sides of a housing 12 for electrical, plumbing, natural light, ventilation, and various fittings such as exterior lighting fittings. The various fittings may be pre-assembled such that they need only to be welding or otherwise coupled to the structure module 1500.

Still referring also to FIG. 16, as shown, some embodiments of the power module 1600 include a fuel requiring element 102 which in some embodiments is a Stirling engine power generator. In other embodiments, the power module 1600 may not include a fuel requiring element 102 or may include a fuel requiring element 102 which is not a Stirling engine power generator. In some embodiments, the power module 1600 may include a radiator 224 which, when the kiosk for resource distribution 10 is assembled, may reside on the roof of the structure module 1500. In some embodiments, the power module 1600 may also include at least one oven 190. In some embodiments, the oven 190 may not be included as part of the power module 1600 but as part of its own module. As shown, in some embodiments, the oven 190 may receive heat from waste heat of the fuel requiring element 102. When assembled the oven 190 may project out of a side of the structure module 1500 so that it may be used from the exterior of the kiosk for resource distribution 10. In some embodiments, the power module 1600 or a different module of a kiosk for resource distribution 10 may include other mechanisms or methods of utilizing waste heat (such as, but not limited to those described above) from a fuel requiring element 102.

In some embodiments, the power module 1600 may include any number of additional components 1002. For example, in some embodiments, the power module 1600 may include at least one fuel storage tank 104. In some embodiments, the power module 1600 may include batteries (not shown) for startup of a power generating element. In some embodiments, the battery bank 230 may be included as part of the power module 1600. In some embodiments, the power module 1600 may also include cabling and hardware for a mini-grid. In still other embodiments, the power module 1600 may include, for example, rechargeable lighting units which may be given, rented, sold to the local population. In some embodiments, an ambient air monitor, such as a carbon monoxide monitor, may be included as part of a power module 1600. In some embodiments, the power module 1600 may include a charging station 800 (for example, shown in FIG. 20). In some embodiments, a back-up power generator may be included as an optional component of a power module 1600. In embodiments where the kiosk for resource distribution 10 is grid tied, the power module 1600 may include a back-up power generator or auxiliary power generator if, for example, the local grid is unreliable.

The water module 1100, battery bank module 1200, and refrigeration module 1300 are the same as the embodiment shown in FIG. 15. The frame component 1110 of the water module 1100, however, includes walls instead of the stand structure 1112. The water module 1100, battery bank module 1200, and refrigeration module 1300 may be placed into the structure module 1500 after the power module 1600 has been placed into the structure module 1500. As mentioned above, each module may be constructed such that it may easily interface with other modules. In various embodiments, for example, the power module 1600 may be constructed such that any plumbing, electrical wiring, walls, etc. line up and/or may easily be attached to plumbing, electrical wiring, walls, etc. of the water module 1100, battery bank module 1200 and refrigeration module 1300.

As shown, and referring also to FIG. 16, some embodiments include an awning module 1700. The example awning module 1700 includes an awning 19. In some embodiments, the awning module 1700 may include additional components 1002 such as seating 502, benches, tables, etc. In some embodiments, seating 502, tables, benches, etc. may be included in a separate module.

Figure 17:
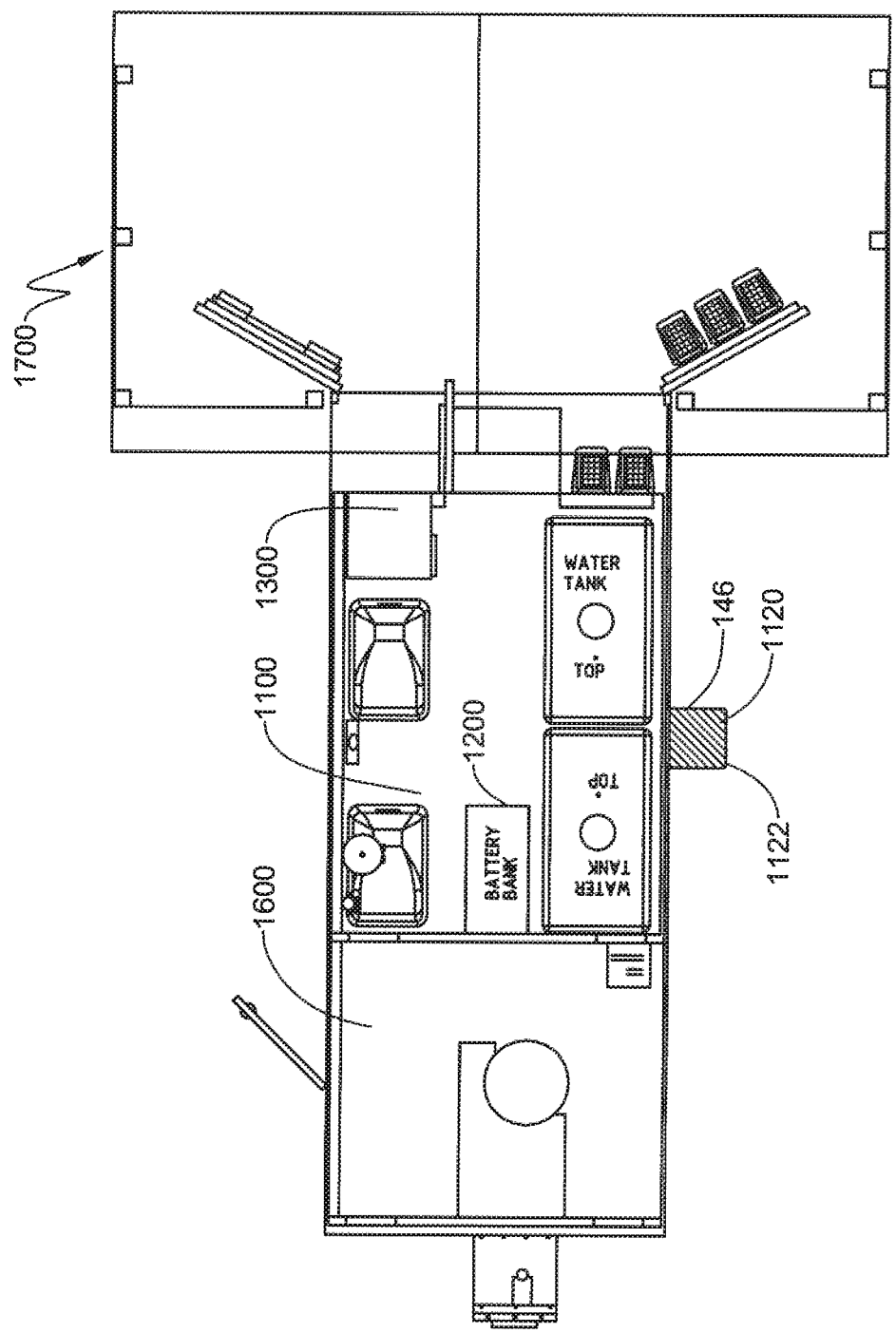
FIG. 17 is a top view of a modular kiosk for resource distribution in accordance with one embodiment of the present disclosure.
Figure 18:
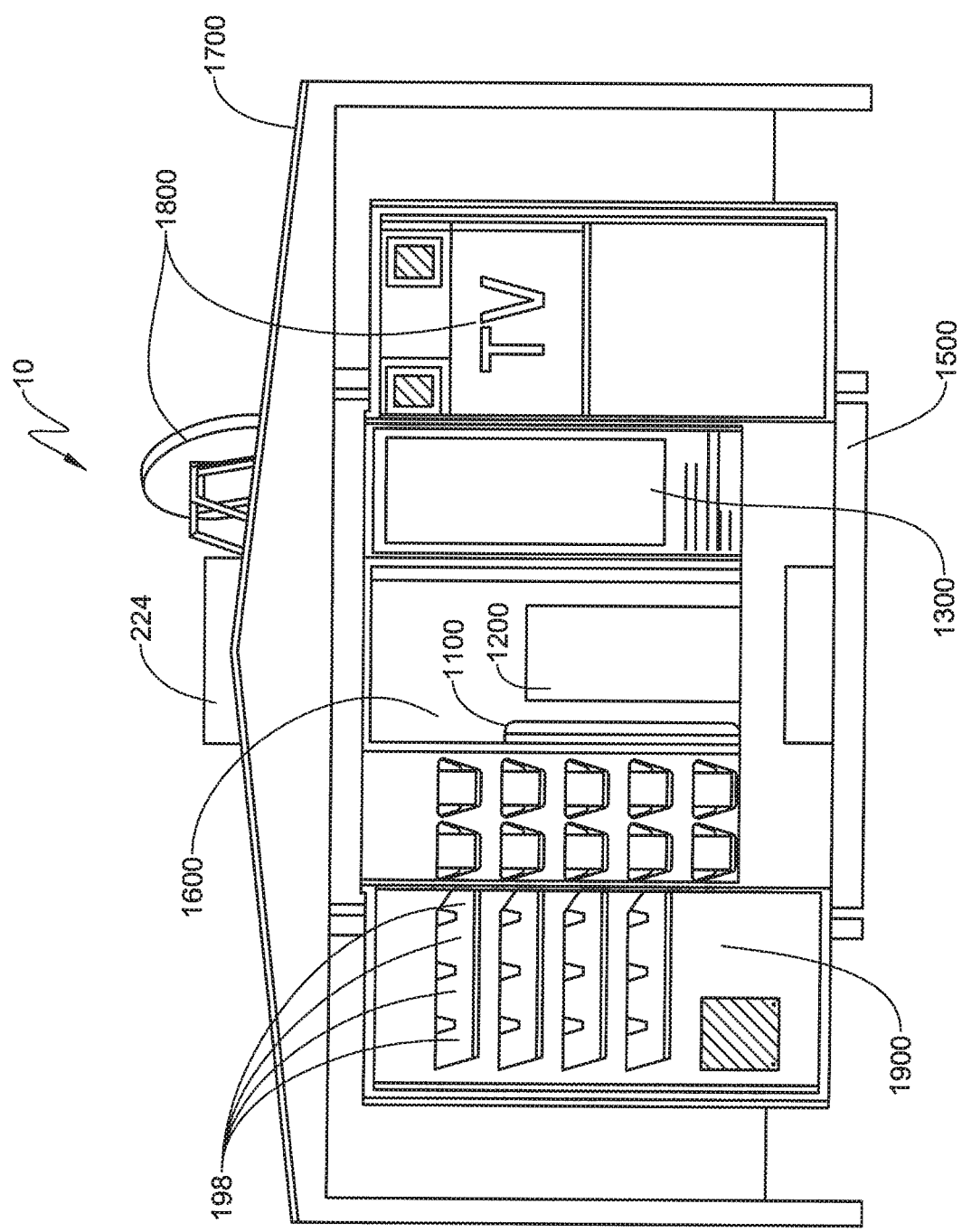
FIG. 18 is a front view of a modular kiosk for resource distribution in accordance with one embodiment of the present disclosure.

Referring also to FIGS. 16-18, the awning module 1700, in some embodiments, may not be disposed on or in the structure module 1500, but may be an auxiliary part of the kiosk for resource distribution 10. In some embodiments, the awning module 1700 may differ from that shown in FIGS. 16-18. For example, the awning module 1700 may be coupled to the structure module 1500 such that it may fold out, slide out, roll out, etc. from the structure module 1500. In some embodiments, the awning module 1700 may perform the function of a structure module 1500. In such embodiments, all of the various modules in a particular kiosk for resource distribution 10 may be enclosed by an awning module 1700. In some embodiments, the awning module 1700 may be easily repositioned or broken down and stored inside the kiosk for resource distribution 10.

In some embodiments, the awning module 1700 may be assembled from a kit of parts on site. The awning module 1700 may be used to provide a shaded or sheltered area around the kiosk for resource distribution 10. Additionally, the awning module 1700 may be used to expand the overall size of the kiosk for resource distribution 10. This may be desirable in entrepreneurial applications for instance because it creates a bigger area to display goods and commodities.

Referring still to FIGS. 16-18, the embodiment depicted additionally includes a communication module 1800. In the example embodiment, the communication module 1800 includes a satellite receiver 1802. The satellite receiver 1802 may provide one way or two way communication. In the example embodiment, the satellite receiver 1802 may be used to provide a wide range of channels for a TV 300 which in the example embodiment is also included in the communication module 1800. The satellite receiver 1802 may be used for a number of other applications, such as but not limited to telephone, radio, internet, etc. In some embodiments, the communications module 1800 may provide other forms of wireless digital connectivity. For example, some embodiments of the communications module 1800 may include a cellular communications tower 930 (see FIG. 11). Other embodiments of the communications module 1800 may be configured to provide WiFi hotspot internet access.

Referring still to FIGS. 16-18 in some embodiments, the roof of the structure module 1500 may be removed. In some embodiments, the power module 1600 is disposed inside the structure module 1500 and at an end of the structure module 1500. As shown for example in FIG. 17, the oven 190 of the power module 1600 extends out of the structure module 1500 through the side of the structure module 1500. The water module 1100, battery bank module 1200, and refrigerator module 1300 are also in their assembled location in the kiosk 10. As shown, for example in FIG. 17, the water module 1100, battery bank module 1200, and refrigerator module 1300 take up much of the remaining interior space of the structure module 1500. The satellite receiver 1802 of the communications module 1800 is also shown in its assembled location, for example in FIG. 18. As shown, the awing module 1700 extends off the right end of the structure module 1700. The roof of the awning module 1700 (for example, shown in FIG. 17) may be transparent. In other embodiments, the roof of the awning module 1700 may be completely opaque or somewhat transparent.

Referring to FIGS. 16-18, some embodiments of the water module 1100, for example, as shown in FIG. 17, include a filling station 1120. As shown, the filling station 1120 includes a product water spigot 146 which is accessible from the exterior of the structure module 1500. The filling station 1120 also includes a wire basket 1122 which may be used to hold a product water container 940 (see FIG. 11) as it is being filled. In some embodiments, the filling station 1120 may include a platform or other holder to hold a product water container 940 while it is being filled. In some embodiments, a wire basket 1122 or other holder may not be included and product water containers 940 may be placed on the ground, a concrete pad, etc. when they are being filled.

Still referring also to FIGS. 16-18, FIG. 18 shows a front assembled view of the example kiosk for resource distribution 10 shown exploded in FIG. 16. As shown, the awning module 1700 covers the entrance to the kiosk for resource distribution 10 in FIG. 18. The refrigeration module 1300, battery bank module 1200, and water module 1100 are in their assembled locations inside of the structure module 1500. The communication module 1800 is also visible in its assembled location on the structure module 1500. The radiator 224 of the power module 1600 is also shown on the roof of the structure module 1500 in FIG. 18.

Still referring to FIGS. 17-18, as shown, an example store module 1900 occupies the extra interior space in the structure module 1500 not taken by the power module 1600, water module 1100, battery bank module 1200, and refrigeration module 1300. As shown, the example store module 1900 includes shelving/displays 198 for displaying various goods. In other embodiments, the store module 1900 may include other elements such as a cash register, menus, racks for newspapers or magazines, etc. In some embodiments, the refrigeration module 1300 includes a refrigerator 160 with a door that is substantially transparent. This may be desirable in embodiments with a store module 1900 because it allows a user or customer to see any commodities which may be for sale in the refrigerator 160.

Figure 19:
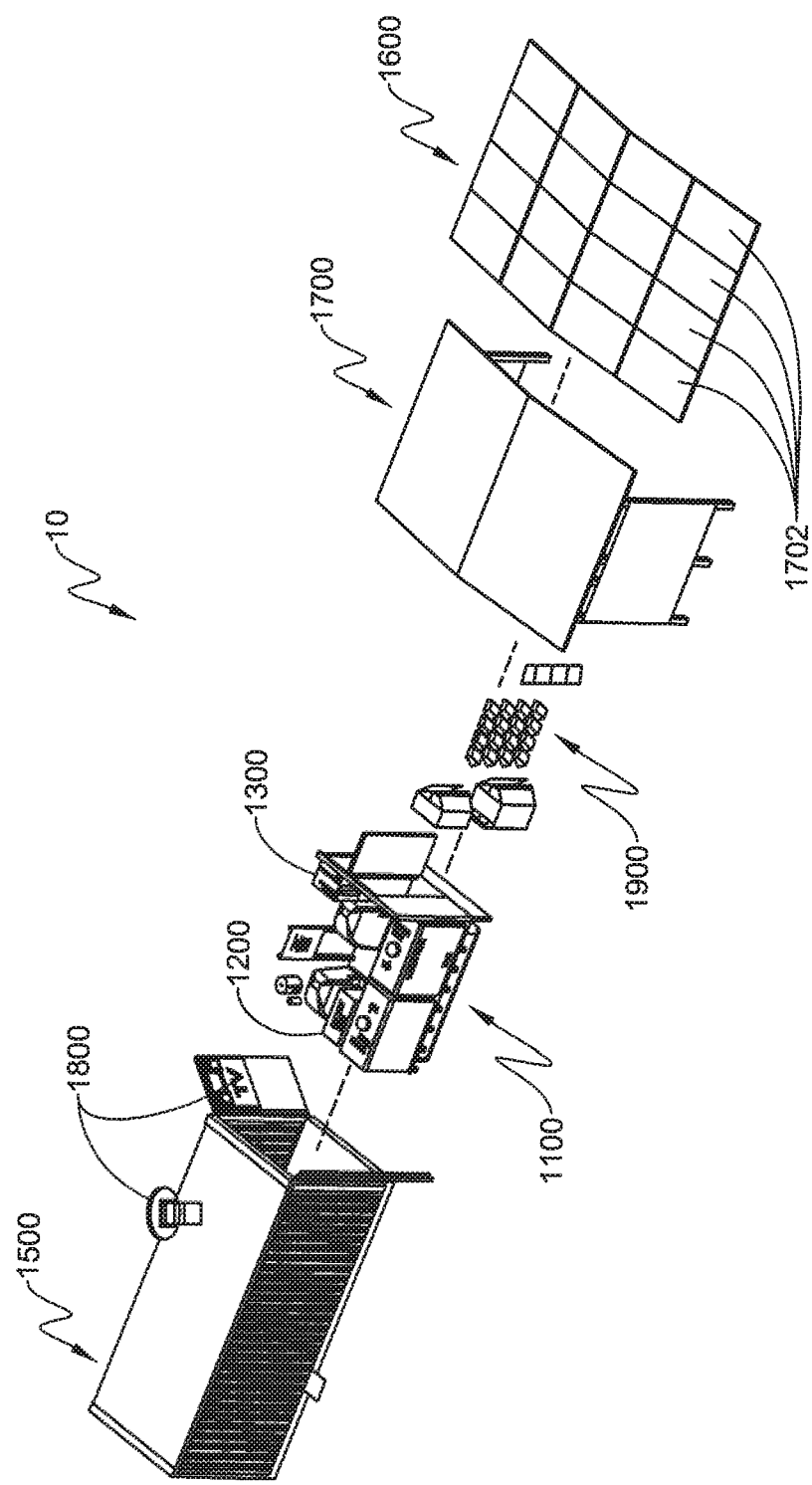
FIG. 19 is an exploded view of a modular kiosk for resource distribution in accordance with one embodiment of the present disclosure.

Referring now also to FIG. 19 another embodiment of a kiosk for resource distribution 10 which is comprised of a number of different modules is shown. In the embodiment shown, the kiosk for resource distribution 10 includes a structure module 1500, a communication module 1800, a water module 1100, a battery bank module 1200, a refrigeration module 1300 a store module 1900, and awning module 1700, and a power module 1600.

As shown, the structure module 1500 in the example embodiment shown in FIG. 19 is a 20×8×8 shipping container similar to the structure module 1500 shown in FIGS. 16-18. The communication module 1800 is shown attached to the structure module 1500 and is the same as the communication module 1800 shown in FIGS. 16-18. The water module 1100, battery bank module 1200, and refrigeration module 1300 used in the example embodiment in FIG. 19 are the same as those used in FIG. 16. The store module 1900 is larger than that shown in FIG. 18. The awning module 1700 may be an embodiment similar to that shown and described with respect to FIGS. 16-18. In the embodiment shown, the power module 1600 may not include a fuel requiring element 102 as it does in FIGS. 16-18. The embodiment of power module 1600 shown in FIG. 19 is solar powered. A solar powered power module 1600 may include at least one solar panel 702, and in some embodiments, a plurality of solar panels 702, which may be placed on the roof of the structure module 1500, roof of the awning module 1700, and/or on the ground surrounding the kiosk for resource distribution 10.

As mentioned above, by constructing the kiosk for resource distribution 10 from a number of modules, it is easily adaptable to different scenarios. Depending on the scenario, one may select modules so that they best leverage available resources or best suit the local area. For example, in a scenario where ample solar energy is available, a power module 1600 which runs off solar power may be easily substituted for a power module 1600 running off a fuel requiring element 102 without needing to redesign the entire kiosk for resource distribution 10. Additionally, as shown in FIG. 19, this helps to optimally utilize the interior space of the structure module 1500. Without requiring redesigning of the entire kiosk for resource distribution 10, the space occupied by the power module 1600 in FIGS. 16-18 may be easily filled by any other suitable module. In the example embodiment in FIG. 19, a larger store module 1900 is used to fill the extra space.

Figure 20:
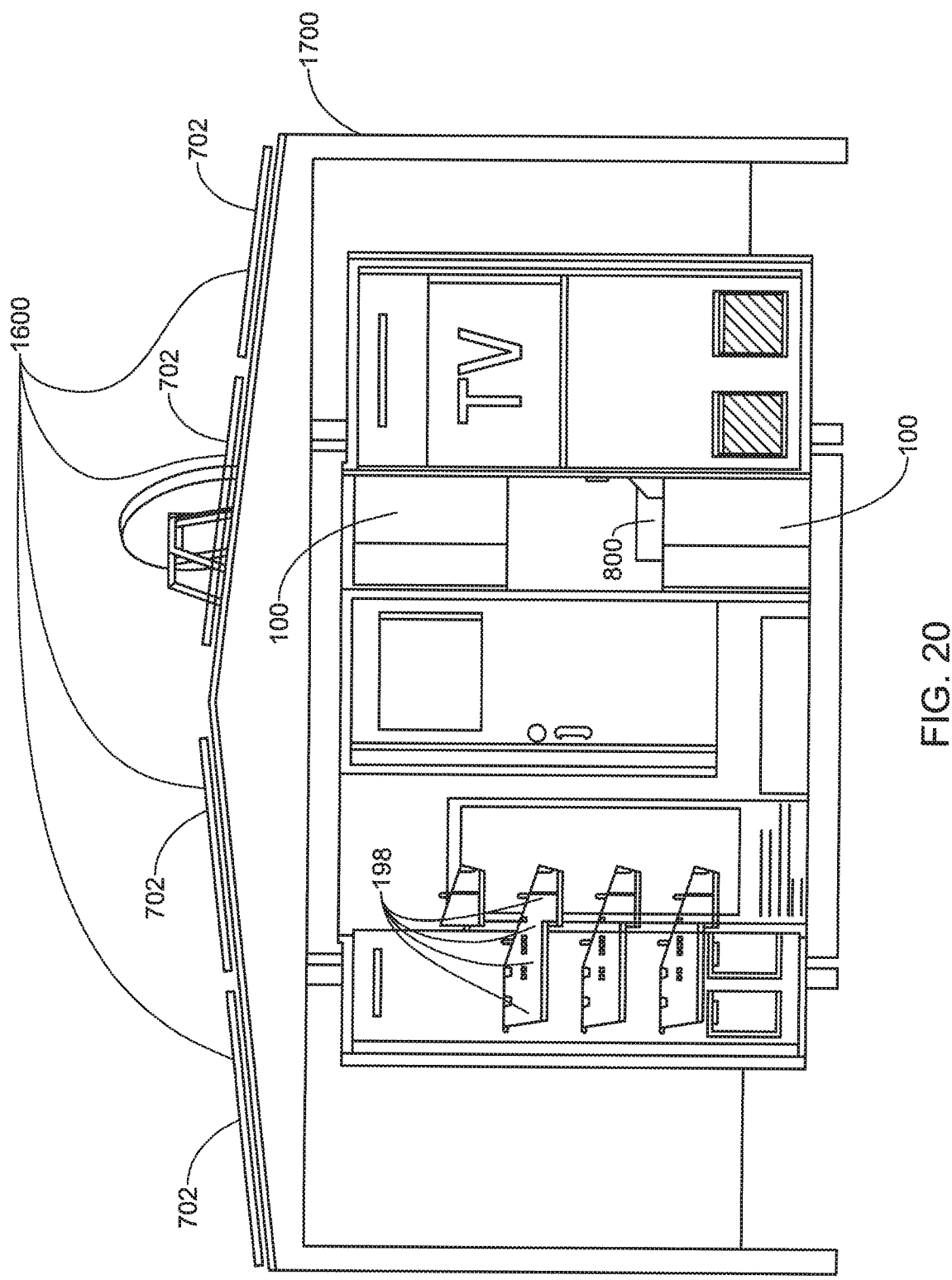
FIG. 20 is a front view of a modular kiosk for resource distribution in accordance with one embodiment of the present disclosure.

Referring now also to FIG. 20, an assembled view of the embodiment of the kiosk for resource distribution 10 shown exploded apart in FIG. 19 is depicted. As shown, in some embodiments, the power module 1600 may include a number of solar panels 702 which are disposed on the roof of the awning module 1700. The space created by swapping the power module 1600 with a fuel requiring element 102 for a power module 1600 which utilizes solar energy may be used by a much larger store module 1900 than the embodiment shown in FIGS. 16-18. As shown, the store module 1900 in FIG. 20 includes extra shelving/displays 198. The store module 1900 in FIG. 20 also includes a number of storage areas 100. Additionally, the store module 1900 includes a charging station 800.

Figure 21:
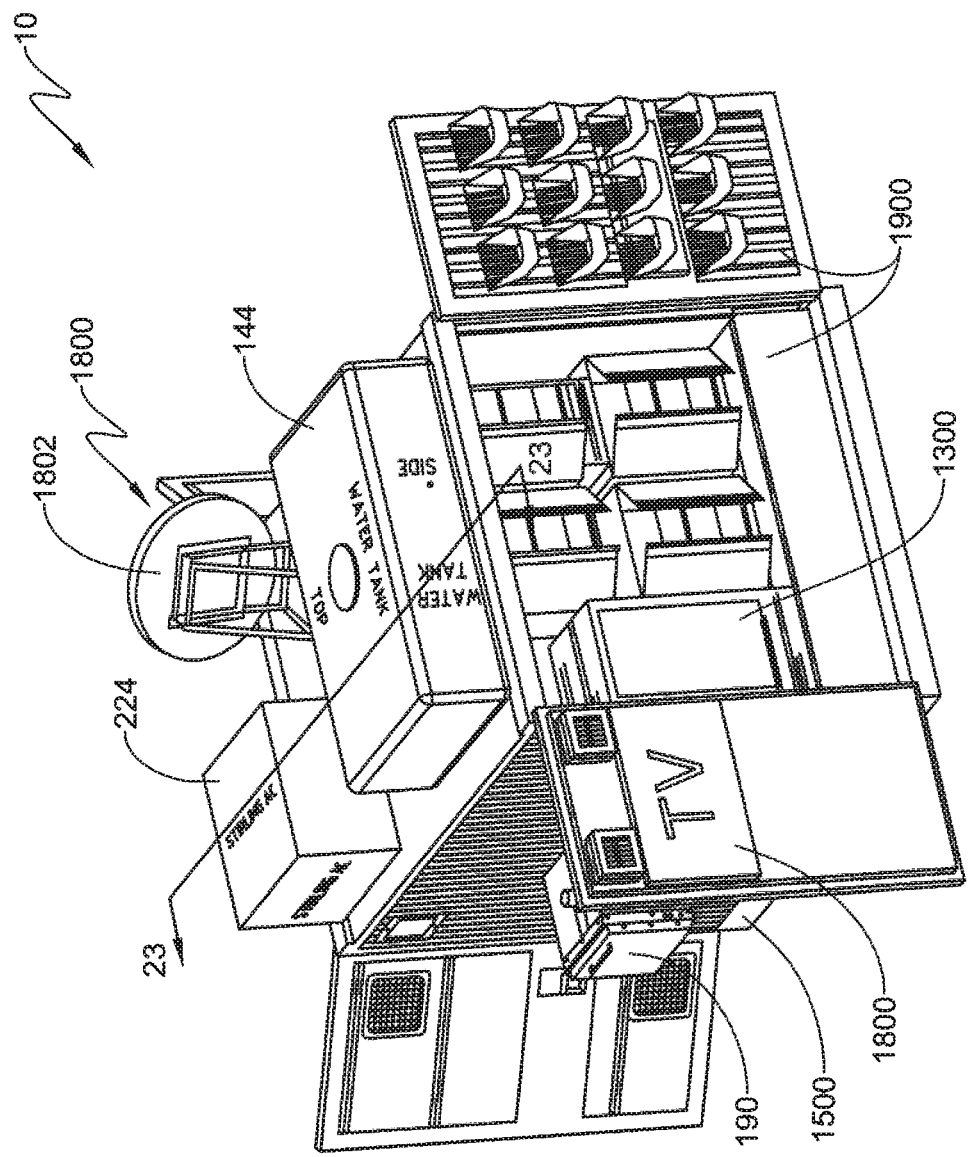
FIG. 21 is an isometric view of yet a modular kiosk for resource distribution in accordance with one embodiment of the present disclosure.

Referring now also to FIG. 21 an example of a kiosk for resource distribution 10 where the structure module 1500 is a 10×8×8 foot shipping container is shown. As shown, some embodiments of the kiosk for resource distribution 10 include a refrigeration module 1300, a store module 1900, and a communication module 1800. Some embodiments may include a radiator 224, and/or at least one oven 190 and/or at least one product water tank 144.

In contrast to the embodiments of water modules 1100 described above, the embodiment in FIG. 21 includes a single product water reservoir 144. Additionally, the product water reservoir 144 is located on the roof of the structure module 1500 to maximize space in the interior of the structure module 1500. Other embodiments of the kiosk for resource distribution 10 may include the product water reservoir 144 and/or product water reservoirs 144 on the roof of the structure module 1500 to maximize space in the interior of the structure module 1500.

Figure 22:
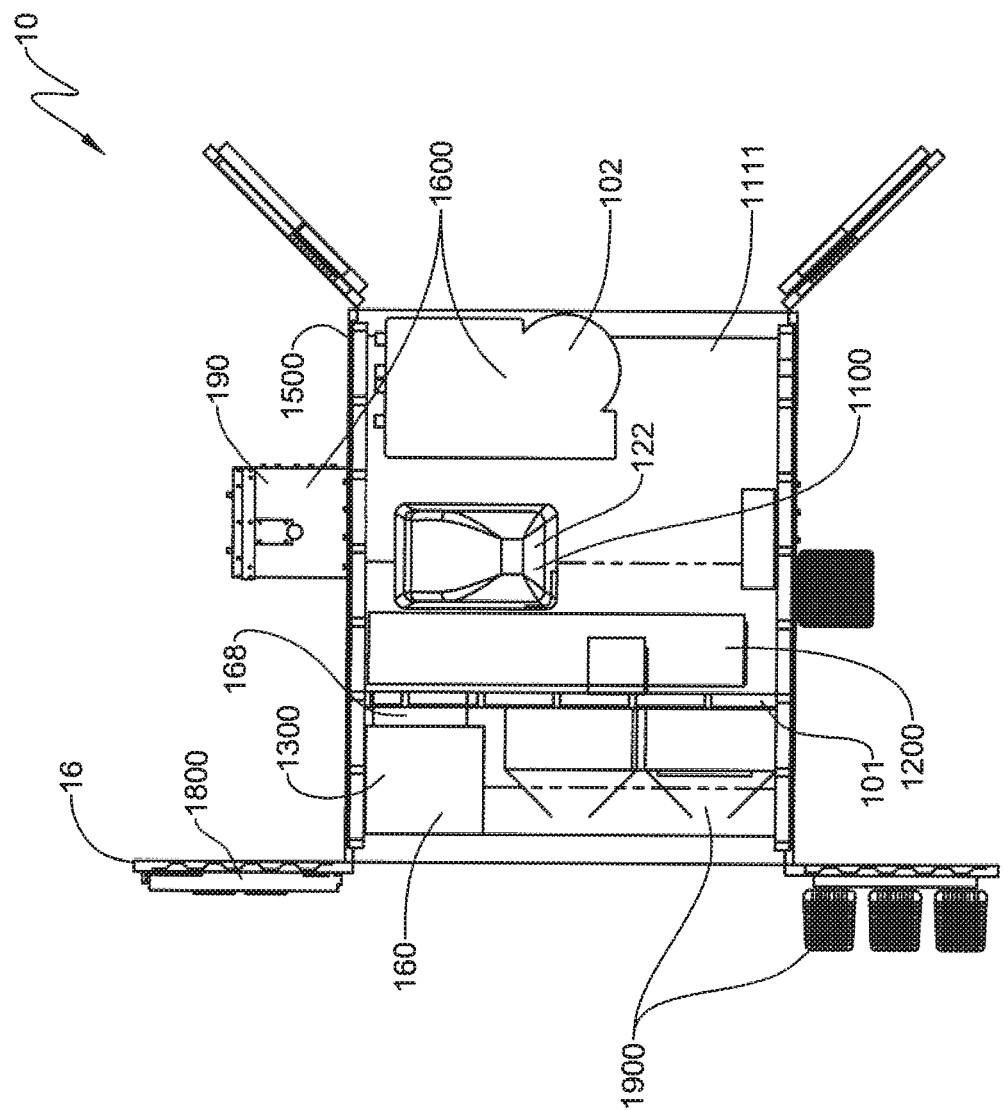
FIG. 22 is a top view of a modular kiosk for resource distribution in accordance with one embodiment of the present disclosure.

Referring now also to FIG. 22, a top view of the embodiment of the kiosk for resource distribution 10 depicted in FIG. 21 is shown. As shown, the top of the structure module 1500, radiator 224, product water reservoir 144, and satellite receiver 1802 of the communications module 1800 shown in FIG. 21 have been removed in FIG. 22 to allow a clear look at the interior of the structure module 1500 in FIG. 22. As shown, the refrigeration module 1300 and store module 1900 are sectioned off from the rest of the interior of the structure module by a first partitioning wall 101. Also as shown, the TV 300 of the communications module 1800 is located on a door 16 of the structure module 1500. The TV 300 is only viewable when the door 16 is swung open. When closed, the TV 300 is protected by the exterior of the structure module 1500, which in the example embodiment is steel.

Also as shown in FIG. 22, in some embodiments, the refrigeration module 1300 includes a medical refrigeration section 168. As shown, the medical refrigeration section 168 extends into the first portioning wall 101 and is completely segregated from the rest of the refrigerator 160. In the embodiment shown in FIG. 22, the medical refrigeration section 168 is only accessible from the right side of the first partitioning wall 101. The rest of the refrigeration module 1300 is only accessible from the left side of the first partitioning wall 101. This helps to ensure that cross contamination may not occur.

In some embodiments, a battery bank module 1200 may also be included in the kiosk for resource distribution 10 shown in FIG. 22. As shown, the battery bank module 1200 may be placed against the right side of the first partitioning wall 101. As shown, the power module 1600 may include a fuel requiring element 102 which, in some embodiments, and as shown in FIG. 22, may be a Stirling engine power generator. In some embodiments, the fuel requiring element 102 may be a different type of power generator. In some embodiments, the power module 1600 may not include a fuel requiring element 102. As shown, the power module 1600 may also include at least one oven 190. The oven 190, in some embodiments, projects out of the side of the structure module 1500 and may be heated by waste heat from the fuel requiring element 102 as shown in the example embodiment. A store module 1900 may also be included.

The embodiment of a kiosk for resource distribution 10 in FIG. 22 also includes a water module 1100 as mentioned above. As shown, the water module 1100 may include a single water device which in the example embodiment is a water distillation device 122. Other embodiments of water modules 1100, such as but not limited to those described above, may include a single water device or two or more water devices. In some embodiments of embodiments where the structure module 1500 is a 10×8×8 shipping container, the water module 1100 may include a single water device because the structure module 1500 is relatively small.

Figure 23:
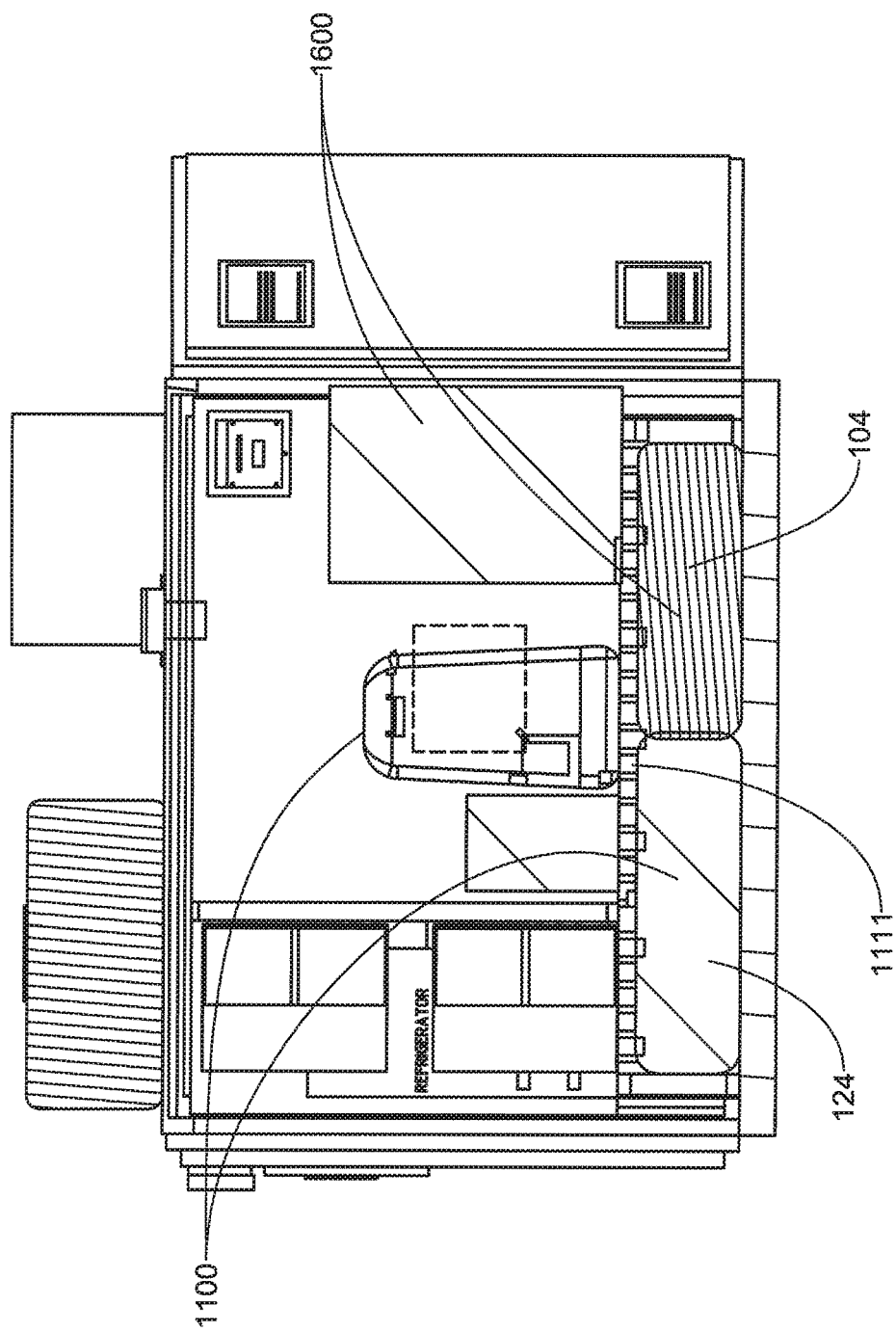
FIG. 23 is cross-sectional view of a modular kiosk for resource distribution taken at line 23-23 of FIG. 21 in accordance with one embodiment of the present disclosure.

Referring now also to FIG. 23, a cross section taken at line 23-23 of the example kiosk for resource distribution 10 shown in FIG. 21 is shown. As shown, the source water reservoir 124 of the water module 1100 may be located under the floor 1111 of the water module 1100. In some embodiments, the floor 1111 of the water module 1100 may extend across the entire length of the kiosk for resource distribution 10. In some embodiments, a fuel storage tank 104 is located under the floor 1111.

Figure 24:
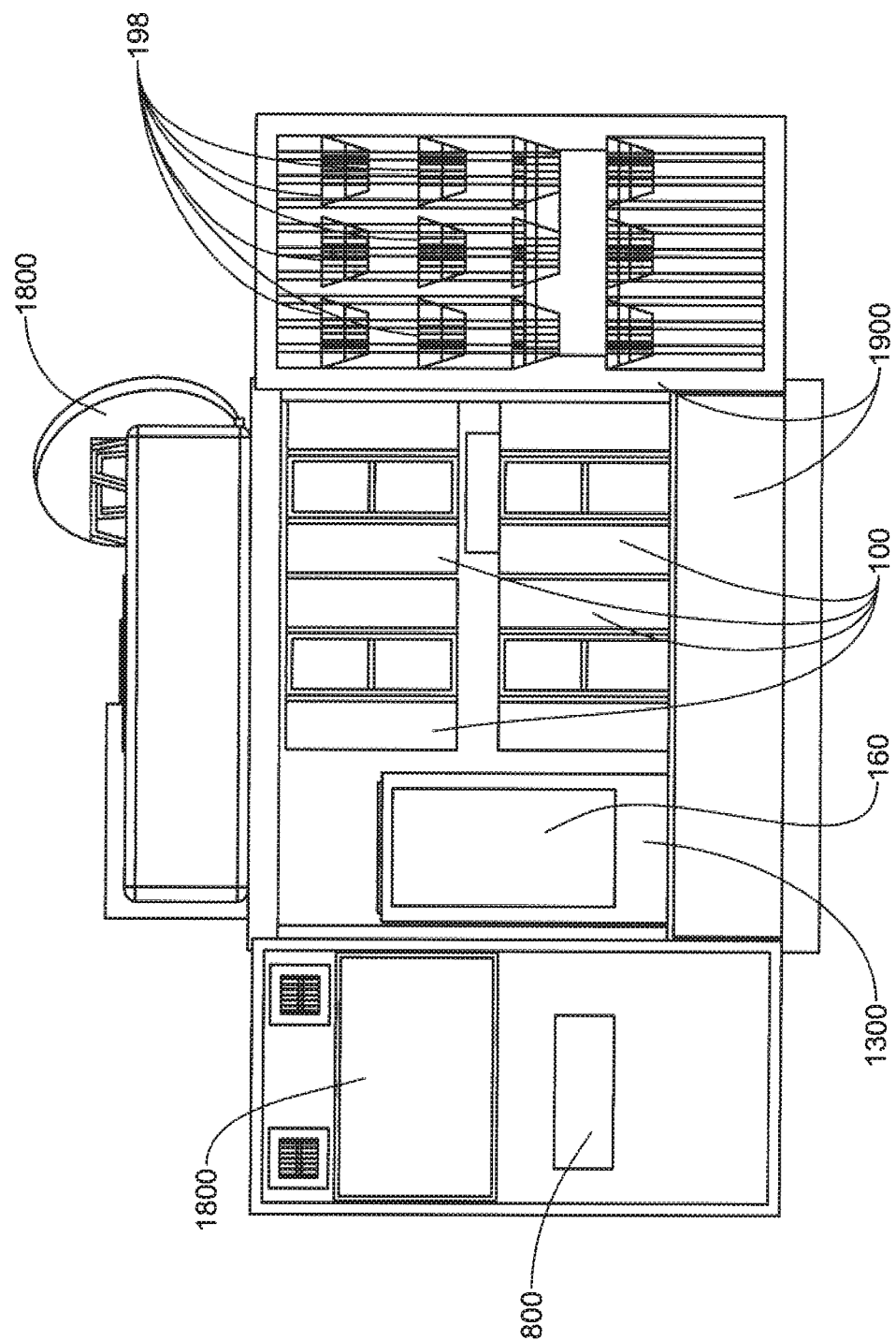
FIG. 24 is a front view of a modular kiosk for resource distribution in accordance with one embodiment of the present disclosure.

Referring now also to FIG. 24, a front view of the embodiment of a kiosk for resource distribution 10 shown in FIG. 21 is depicted. Some embodiments, such as the embodiment shown in FIG. 24, include a store module 1900 including shelving/displays 198 and a number of storage areas 100. In some embodiments, including the embodiment in FIG. 24, the refrigerator 160 of the refrigeration module 1300 may include a transparent front so that products in the refrigerator 160 may be viewed by potential customers. In some embodiments, a charging station 800 may also be included as a part of the store module 1900 as depicted in FIG. 24.

Figure 25:
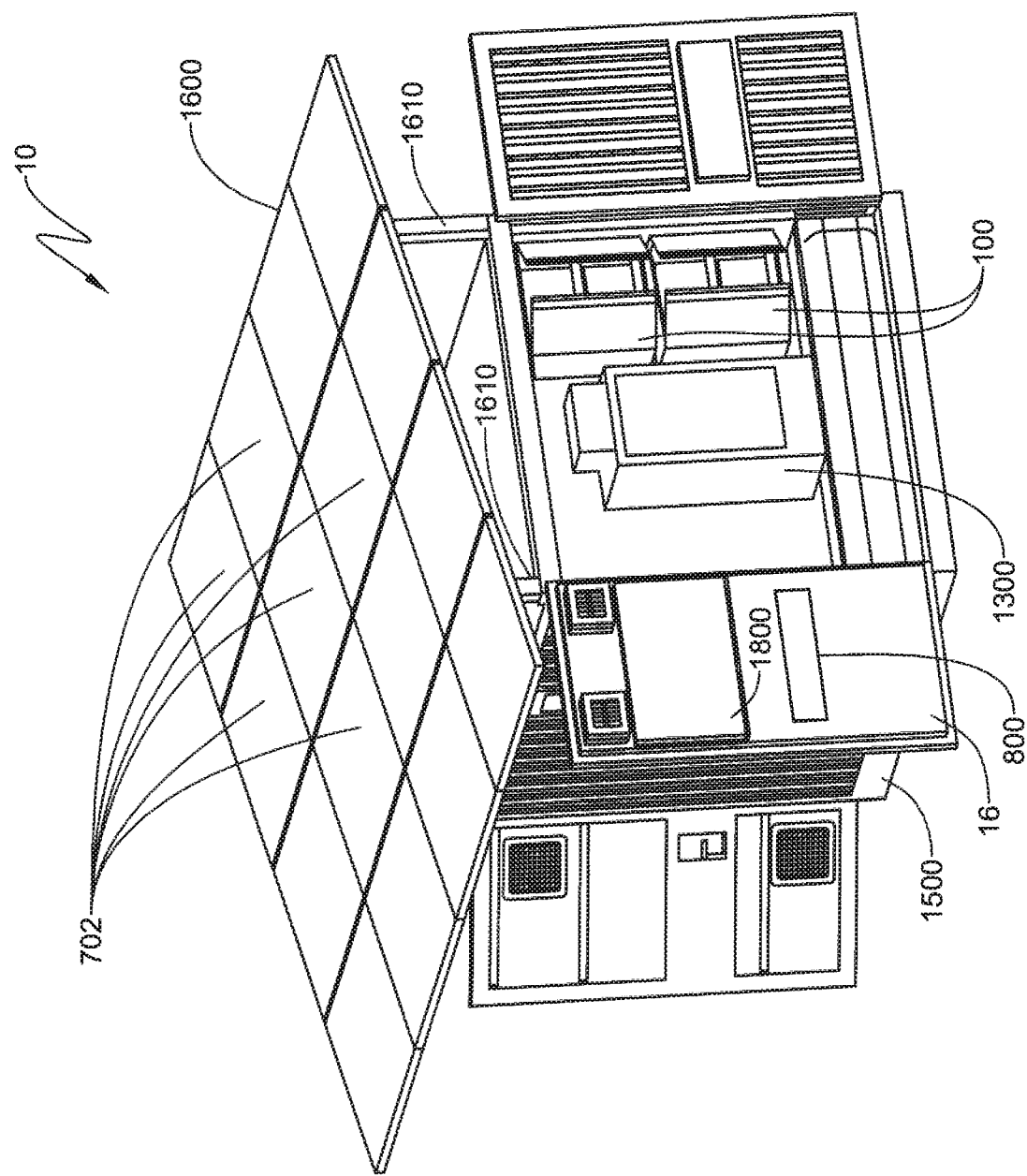
FIG. 25 is an isometric view of a modular kiosk for resource distribution in accordance with one embodiment of the present disclosure.

Referring now also to FIG. 25 another embodiment of a kiosk for resource distribution 10 is shown. Some embodiments of the kiosk for resource distribution 10, such as the embodiment depicted in FIG. 25, include a structure module 1500. In some embodiments, the structure module 1500 may be a 10×8×8 foot shipping container as it is in FIG. 25. A communication module 1800 and refrigeration module 1300 may also be included in some embodiments. The kiosk for resource distribution 10 may also include a power module 1600. The power module 1600 in some embodiments may not include a fuel requiring element 102 but rather may include one or more solar panels 702. The solar panels 702, in some embodiments, for example the embodiment shown in FIG. 25, may be disposed above the roof the structure module 1500 and may be held in place by a number of solar panel support beams 1610. In some embodiments, and as shown in FIG. 25, the power module 1600 may include a charging station 800 which may be located on a door 16 of the structure module 1500. As shown in FIG. 25, one or more storage areas 100 may also be included in some embodiments of the kiosk for resource distribution 10. In some embodiments, the storage areas 100 may be included as an optional component of the power module 1600. In some embodiments, the storage areas 100 may be used to store rechargeable batteries, rechargeable lighting units, etc. which may be given, sold, or rented to the local population.

Figure 26:
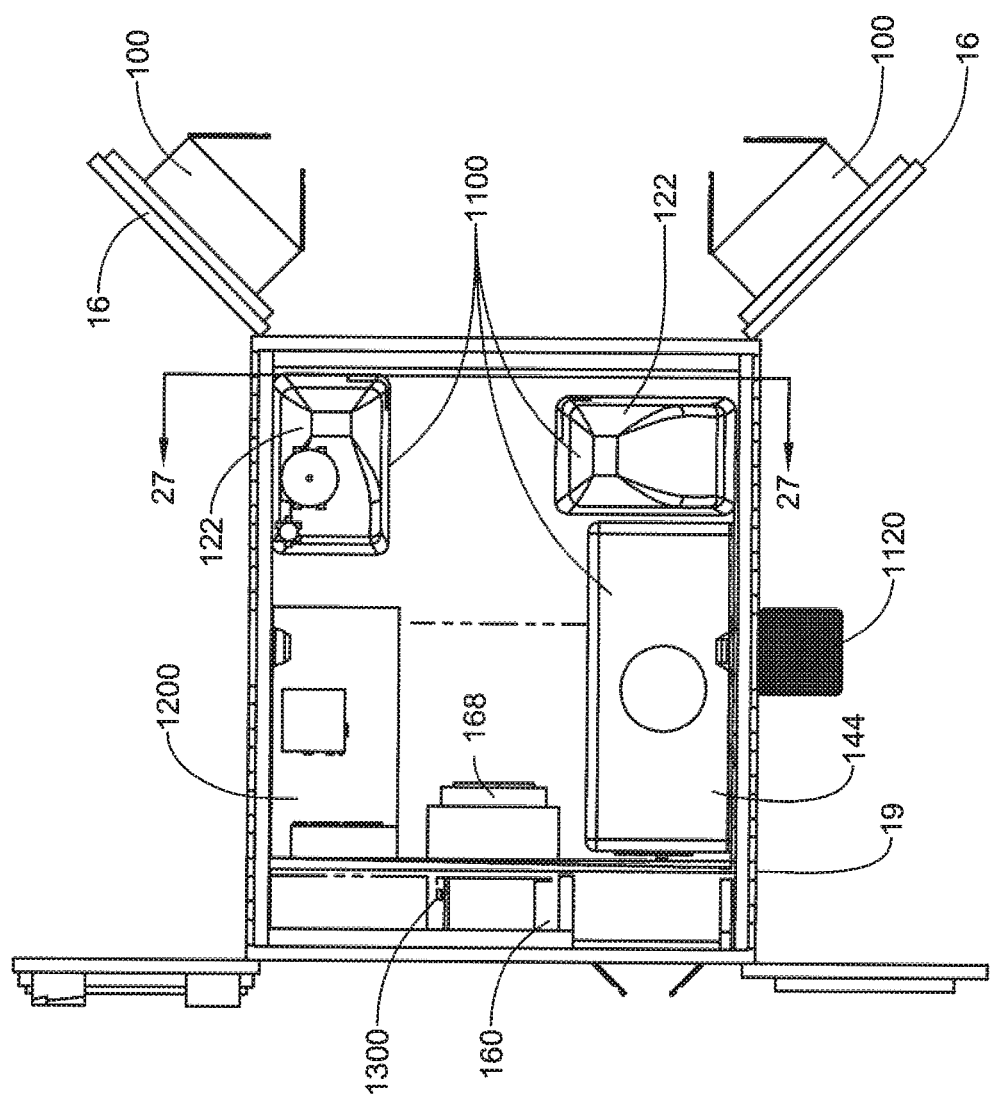
FIG. 26 is a top view of an embodiment of a modular kiosk for resource distribution in accordance with one embodiment of the present disclosure.

Referring now also to FIG. 26 a top view of the embodiment of a kiosk for resource distribution 10 shown in FIG. 25 is shown. The roof of the structure module 1500, satellite receiver 1802 of the communications module 1800, and the solar panels 702 of the power module 1600 have been removed in FIG. 26 so that the interior layout of the kiosk for resource distribution 10 may be easily seen. In some embodiments, including the embodiment shown in FIG. 26, a battery bank module 1200 may be included. In some embodiments, a refrigeration module 1300 extends through a first partitioning wall 101 as it does in FIG. 26. The refrigerator module 1300 may include a refrigerator 160 and a medical refrigeration section 168. In some embodiments, the medical refrigeration section 168 may be completely segregated from the refrigerator 160 as is shown, for example, in FIG. 26. In some embodiments, the medical refrigeration section 168 may be on the opposite side of the first partitioning wall 101 to help prevent cross contamination.

Still referring also to FIG. 26, in some embodiments, the kiosk for resource distribution 10 may also include a water module 1100. In some embodiments, the water module 1100 may include a product water reservoir 144 as it does in FIG. 26. In some embodiments, the water module 1100 may also include two (or more) water devices which, in some embodiments, may be water distillation devices 122. Some embodiments, such as the embodiment shown in FIG. 26, include a filling station 1120 in the water module 1100 which may be accessible from the exterior of the structure module 1500. The water module 1100 may include two water devices in some embodiments, for example, in some embodiments where a fuel requiring element 102 is not included, leaving additional space available in the structure module 1500.

Still referring also to FIG. 26, in some embodiments, two storage areas 100 may be coupled to doors 16 on one part of the of the structure module 1500. Such storage areas 100 may be included as an optional component of a water module 1100 and may be used to store product water containers 940 (see FIG. 11), filters, etc. Some embodiments may include any number of storage areas 100 as part of a storage module.

Figure 27:
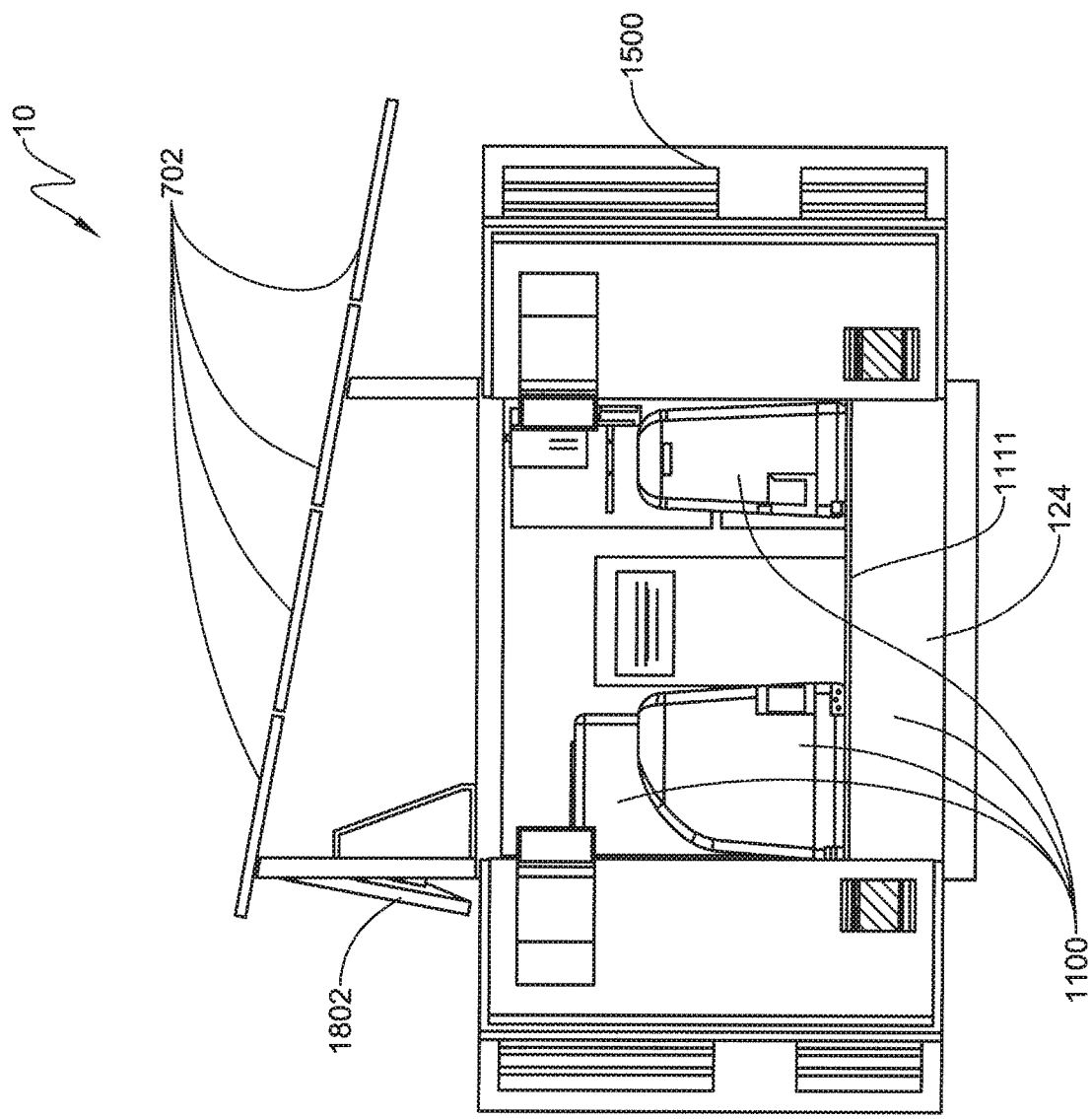
FIG. 27 is a cross-sectional view of a modular kiosk for resource distribution taken at line 27-27 of FIG. 26 in accordance with one embodiment of the present disclosure.

Referring also to FIG. 27, a cross sectional view taken at line 27-27 of the example kiosk for resource distribution 10 shown in FIG. 26 is shown. In some embodiments, including the embodiment depicted in FIG. 27, the water module 1100 includes a source water reservoir 124. As shown, the source water reservoir 124 may be disposed under the floor 1111 of the water module 1100. In some embodiments, the source water reservoir 124 may be disposed on the roof of the structure module 1500 and/or under the solar panels 702.

Referring now also to FIGS. 28-39, another embodiment of a kiosk for resource distribution 10 is shown. The embodiment of the kiosk for resource distribution 10 shown in FIGS. 28-39 may function as an entrepreneurial enterprise. The kiosk for resource distribution 10 in FIGS. 28-39 is configured such that it includes electricity and may provide clean water to the surrounding population. Additionally, the kiosk for resource distribution is arranged such that it may function as a community center. For purposes of illustration, example, and/or clarity, some views in FIG. 28-38 do not include some components depicted in other views of the specific example kiosk for resource distribution 10.

Figure 28:
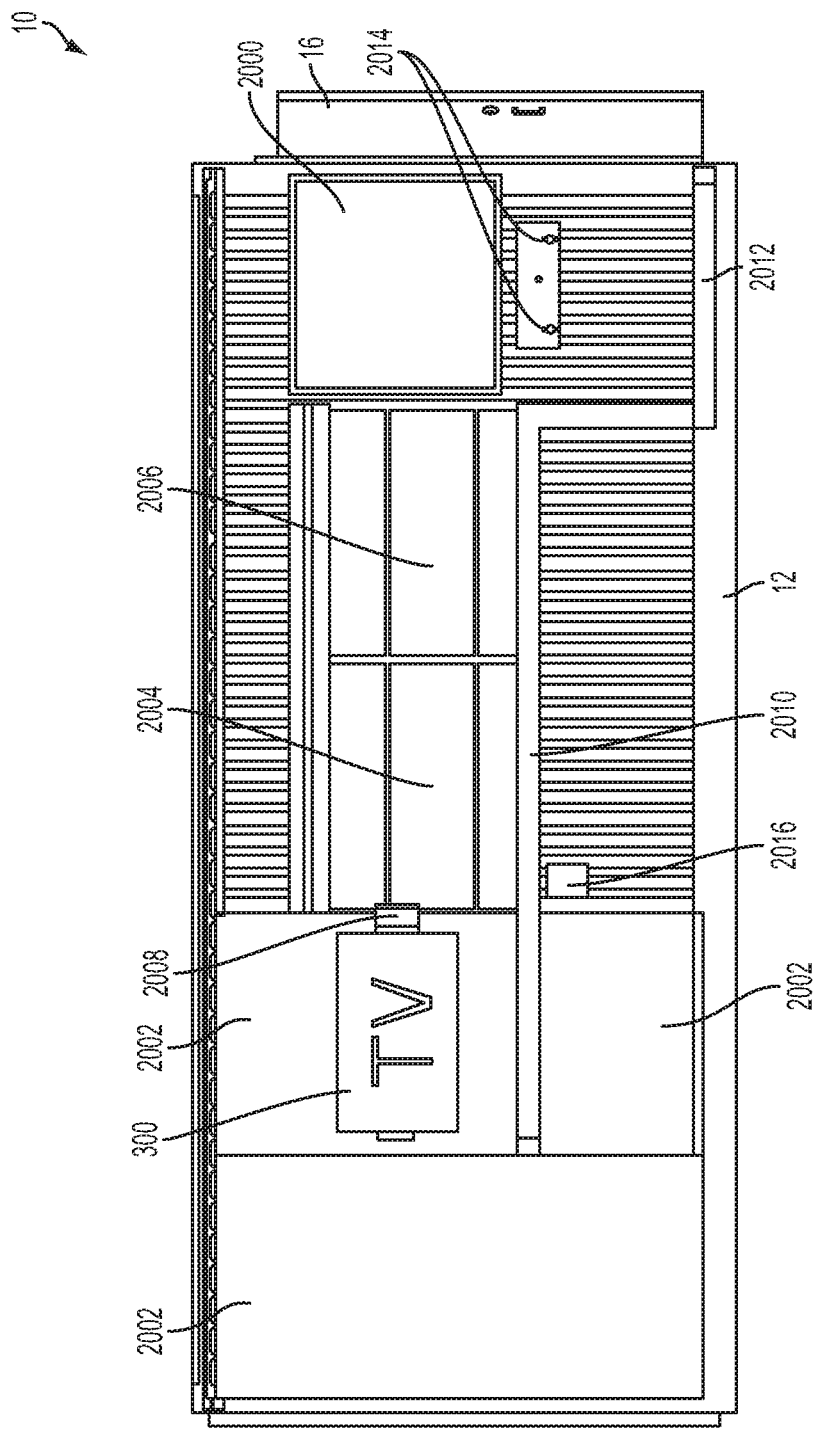
FIG. 28 is a front view of a kiosk for resource distribution in accordance with one embodiment of the present disclosure.

As shown in FIG. 28, the example kiosk for resource distribution 10 includes a housing 12. In some embodiments, the housing 12 may be a 20×8×8 shipping container. The housing 12 may be constructed of COR-TEN steel in some embodiments, however, in various other embodiments; the housing 12 may be constructed of other materials. The shipping container housing 12 may be modified and include one or more of the features described herein.

In various embodiments, the housing 12 may include a door 16 disposed on the right side (with respect to FIG. 28) of the housing 12 and is shown in an open position in FIG.

28. In some embodiments, the door 16 is an insulated steel door which may be 3' wide and 6'8" in height. In some embodiments, the dimensions of and the material which makes up the door 16 may differ. The door 16 may be configured to be opened from the inside unlike standard container doors and thus may provide an important safety feature. In various embodiments, the door 16 may include a handle instead of a knob to increase the robustness of the door 16.

In some embodiments, a chalkboard 2000 and a number of other panels 2002 may be mounted to the housing 12. Among a number of other uses, the chalkboard 2000 may, for example, be used for educational purposes. The entrepreneur may also use the chalkboard 2000 to advertise a sale or to list prices for various goods sold and provided by the kiosk for resource distribution 10.

In various embodiments, the panels 2002 may be made of a material such as Alumicore or Alumalite. In some embodiments, the panels 2002 may be used for advertising and/or branding. In some embodiments, the panels 2002 may be used as billboards which may be rented by locals or others to advertise a product or service. In some embodiments, the entrepreneur may use the panels 2002 to advertise goods sold by the kiosk for resource distribution 10. In some embodiments, at least one panel 2002 may be used as a community board where, in some embodiments, users may post items which may include, but are not limited to, one or more of the following: notices, messages, and/or classified ads. In various embodiments, the panels 2002 and chalkboard 2000 may be attached to the housing 12 with brackets. In some embodiments, tamper proof fasteners may be used to attach the panels 2002 and chalkboard 2000. In various embodiments, the panels 2002 and chalkboard 2000 may provide any number of other suitable functions. In various embodiments, the panels 2002 and chalkboard 2000 may be any suitable size or shape. The number of chalkboards 2000 and panels 2002 may differ in various embodiments. In various embodiments, the chalkboard 2000 or chalkboards 2000 and panels 2002 may be disposed on the housing 12 at any suitable location. In some embodiments, the chalkboard 2000 or chalkboards 2000 and/or panels 2002 may be attached to an auxiliary structure of a kiosk for resource distribution 10.

The kiosk for resource distribution 10 may, in some embodiments, also include a service window 2004. The service window 2004 may allow customers to purchase goods from an entrepreneur/user stationed inside the housing 12. In embodiments, the service window 2004 may be approximately 8' wide and 43" in height. The dimensions of the service window 2004 in other embodiments including a service window 2004 may differ. In some embodiments a steel roller door 2006 may be included. The roller door 2006 may be pulled down, as shown, to cover the service window 2004 and ensure that the housing 12 may not be entered through the service window 2004, for example, when the kiosk for resource distribution 10 is "closed for business". The roller door 2006 may be rolled up when the kiosk for resource distribution 10 is "open for business". In various embodiments, the roller door 2006 may be latched or locked in its rolled down position. In some embodiments, the latch or lock mechanism may only be accessible from the interior of the housing 12, which may be desirable/beneficial for many reasons, including, but not limited to, to inhibit/prevent the possibility of impermissible entry. In other embodiments, the service window 2004 may be covered and secured by any number of other suitable means. Some embodiments may include more than one service window 2004.

Still referring to FIGS. 28-39, in various embodiments, a television 300 may also be included in the kiosk for resource distribution 10 depicted. The television 300 may be any suitable variety of television 300, including, but not limited to, a flat screen television. As shown, the television 300 may be mounted on a swing arm 2008 to allow secure storage within/inside the housing 12 when the kiosk for resource distribution 10 is "closed for business". The swing arm 2008 may allow the television 300 to be swung from the inside of the housing 12 to the outside of the housing 12. In some embodiments, when in place outside of the housing 12, the swing arm 2008 may be designed to latch into position. In various embodiments, the swing arm 2008 may include a number of handles or hand grab areas in order to allow the television 300 to more easily be pivoted to a desired position. In some embodiments, the swing arm 2008 may allow the television 300 to be pivoted to a position viewable from outside of the housing 12 both when the television 300 is inside the housing 12 and when the television is outside of the housing 12. In some embodiments, the kiosk for resource distribution 10 may include at least one recorded media player, which may include, but is not limited to, one or more of a DVD player and/or a VHS player, or other media player, such that media may be played on the television 300.

Still referring to FIGS. 28-39 the kiosk for resource distribution 10 may, in some embodiments, include a service counter 2010. The service counter 2010 may extend across at least a portion of the front of the housing 12. In some embodiments the service counter 2010 may extend from the right edge of the service window 2004 to the right edge of the leftmost panel 2002. The service counter 2010 may also be located along the bottom edge of the service window 2004. In various embodiments, at least a portion of the service counter 2010 may extend into the interior of the housing 12. In various embodiments, the top of the service counter 2010 may be covered in a durable material such as 316 stainless steel, and in various other embodiments, the material may be any durable material or another material. In some embodiments, passivation may be used to remove any undesirable weld marks and increase the lifetime of the material. In various embodiments, the service counter 2010 may be attached to the housing 12 by brackets and/or tamper resistant fasteners, or, in various other embodiments, any type of attachment mechanism may be used. In such embodiments, the brackets may be placed under the service counter 2010 such that they are hidden from view. In some embodiments, the corners of the service counter 2010 may be rounded to help avoid injury.

Still referring to FIGS. 28-39, some embodiments may include a lower service counter 2012. In such embodiments, the lower service counter 2012 may be attached to the service counter 2010 or may be separate from the service counter 2010. In some embodiments, the lower service counter 2012 may be attached to the service counter 2010. In some embodiments, the lower service counter 2012 may be located a few inches from the bottom edge of the housing 12. In some embodiments, the lower service counter 2012 may include holes or perforations to allow for water to drain through the lower service counter 2012.

In various embodiments, at least one, or, in some embodiments, as in the embodiment shown in FIGS. 28-39, two water spigots 2014 may be located above the lower service counter 2012. In various embodiments, the water spigots 2014 may be used by a consumer to fill a container such as the consumer product water containers 940 shown in FIG. 11. A user may place a container on the lower service counter under a spigot 2014 in order to fill it. In various embodiments, spilled water from the water spigots 2014 may be allowed to drain through the holes or perforations in the lower service counter 2012.

In various embodiments, an external outlet 2016 accessible from the exterior of the housing 12 may be included. In some embodiments, the external outlet 2016 may be disposed beneath the service counter 2010. In other embodiments, the external outlet 2016 may be placed in any other suitable location. In various embodiments, the external outlet 2016 may be used for many functions, which may include, but are not limited to, one or more of the following: to provide power to a laptop, to charge a phone, to recharge one or more battery. In various embodiments, the external outlet 2016 may be recessed into the housing 12 such that it is flush with the outer surface of the housing 12. In some embodiments, there may be multiple external outlets 2016. In some embodiments, the external outlet 2016 may be included in a junction box with a cover which may be closed. The cover may include openings to allow any cables plugged into the external outlet 2016 to pass through the cover.

In some embodiments, the kiosk for resource distribution 10 may also include a charging station 800 (see, for example, FIG. 10). The charging station 800 may allow customers/users to charge phones, laptops, batteries, flashlights, and/or any other rechargeable devices. The charging station 800 in some embodiments may be accessible from the exterior of the housing 12. In some embodiments, the charging station 800 may only be accessible from the interior of the housing 12.

In various embodiments, the backside of the housing 12 (see FIG. 29) may include one or more panels 2002. The housing 12 may also include one or more vents 24. The vents 24 may be similar to those described in relation to FIGS. 1-5 or elsewhere within this disclosure. The vents 24 may serve to contribute to the regulation of the interior temperature of the kiosk for resource distribution 10. In various embodiments, the housing 12 may include a number of holes 2018 to allow for various lines, wires, conduits, and other devices, to enter and exit the housing 12. In various embodiments, at least one of the holes 2018 may have a water tight cover.

Figure 30:
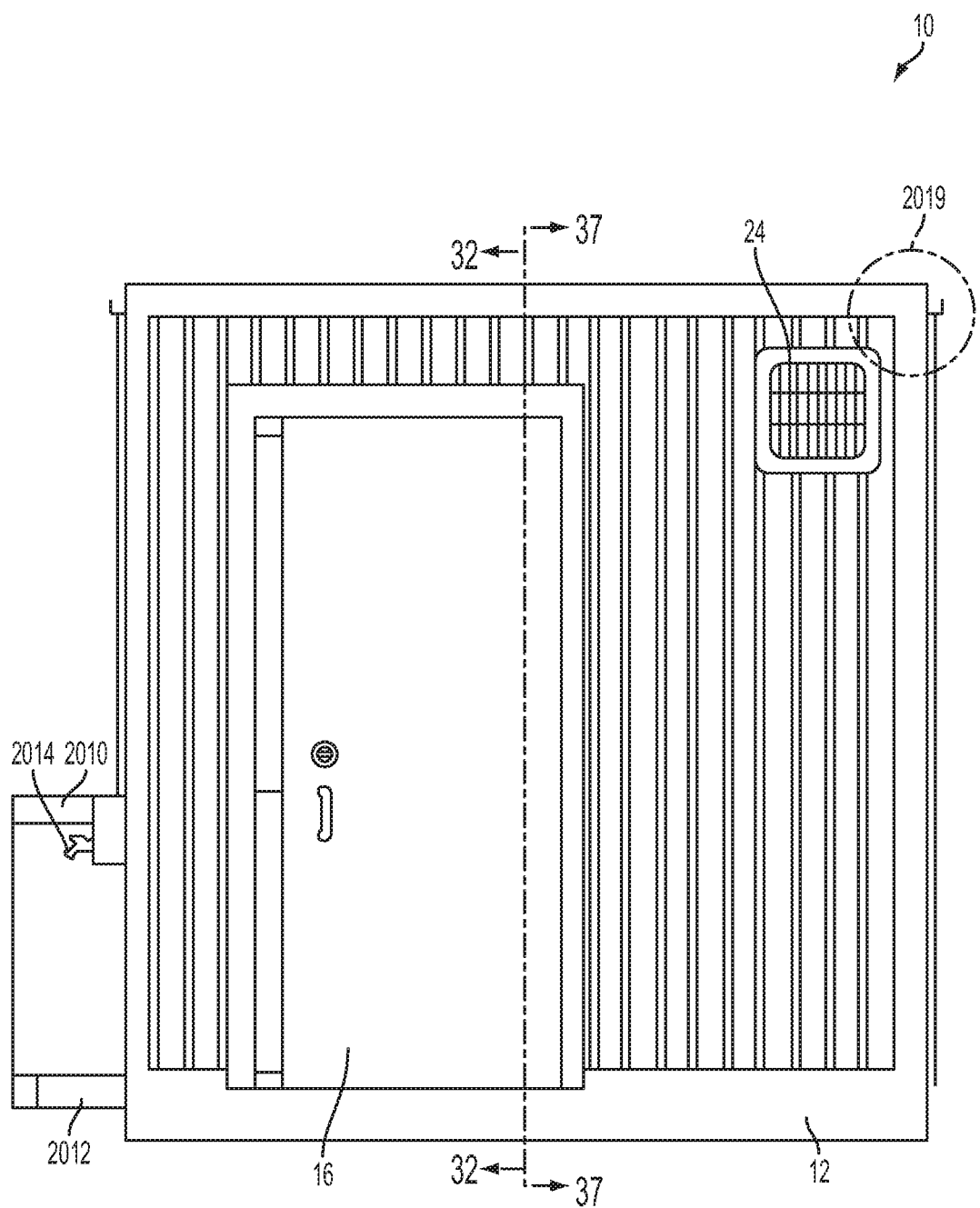
FIG. 30 is a side view of the kiosk for resource distribution shown in FIG. 28 in accordance with one embodiment of the present disclosure.

In various embodiments, the side of the housing 12 (see FIG. 30) includes a door 16. The door 16 in FIG. 30 is shown as slightly open. The service counter 2010, lower service counter 2012 and spigot 2014 are also visible. The side of the housing 12 also includes a vent 24.

Figure 31:
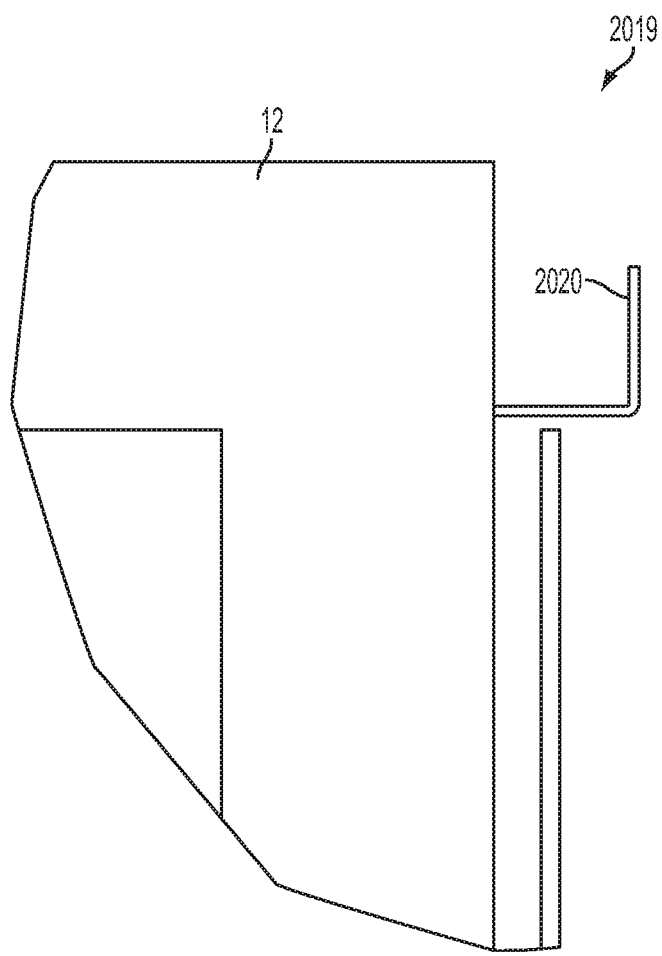
FIG. 31 is a detailed view of an indicated portion of FIG. 30 in accordance with one embodiment of the present disclosure.

FIG. 31 shows a detailed view of portion 2019 of FIG. 30. As shown, a rain gutter 2020 may be attached to the top edge of the housing 12. In some embodiments, rain gutters 2020 may be attached to the top edge of the housing 12 on all sides of the housing 12. In other embodiments, rain gutters 2020 may only be present on the front and back of the housing 12. As shown, in various embodiments, the rain gutter 2020 may be sealed against the top of the housing 12. Any suitable sealant may be used to seal the rain gutters 2020 against the housing 12. In some embodiments, the sealant may be a silicone sealant. In some embodiments, the rain gutters 2020 may be attached to the housing 12 by tamper resistant fasteners. The rain gutters 2020 may be open on both ends as shown. In some embodiments, the rain gutters 2020 may, for example, be made from 16 gauge sheet steel.

In some embodiments, exterior lighting (not shown) may be attached to the rain gutter 2020 or beneath the rain gutter 2020. The exterior lighting may, for example, be 12V DC LED light strings or strips which are affixed to the underside of each rain gutter 2020. Such lighting may allow the area surrounding the kiosk for resource distribution 10 to be illuminated. Additionally, such lighting may be used to illuminate the panels 2002 which are attached to the exterior of the housing 12. In some embodiments, the exterior lighting may run along the entire front and back edge of the housing 12. In some embodiments, the exterior lighting may be weather proof and in some embodiments, may be enclosed in a protective enclosure to prevent damage or theft. In some specific embodiments, the exterior lighting may produce approximately 2400 lumens on the front and back side of the housing 12, sufficient to generate the recommended reading light level of 30 lumens per square foot anywhere within five feet from illuminated sides of the housing 12.

Figure 32:
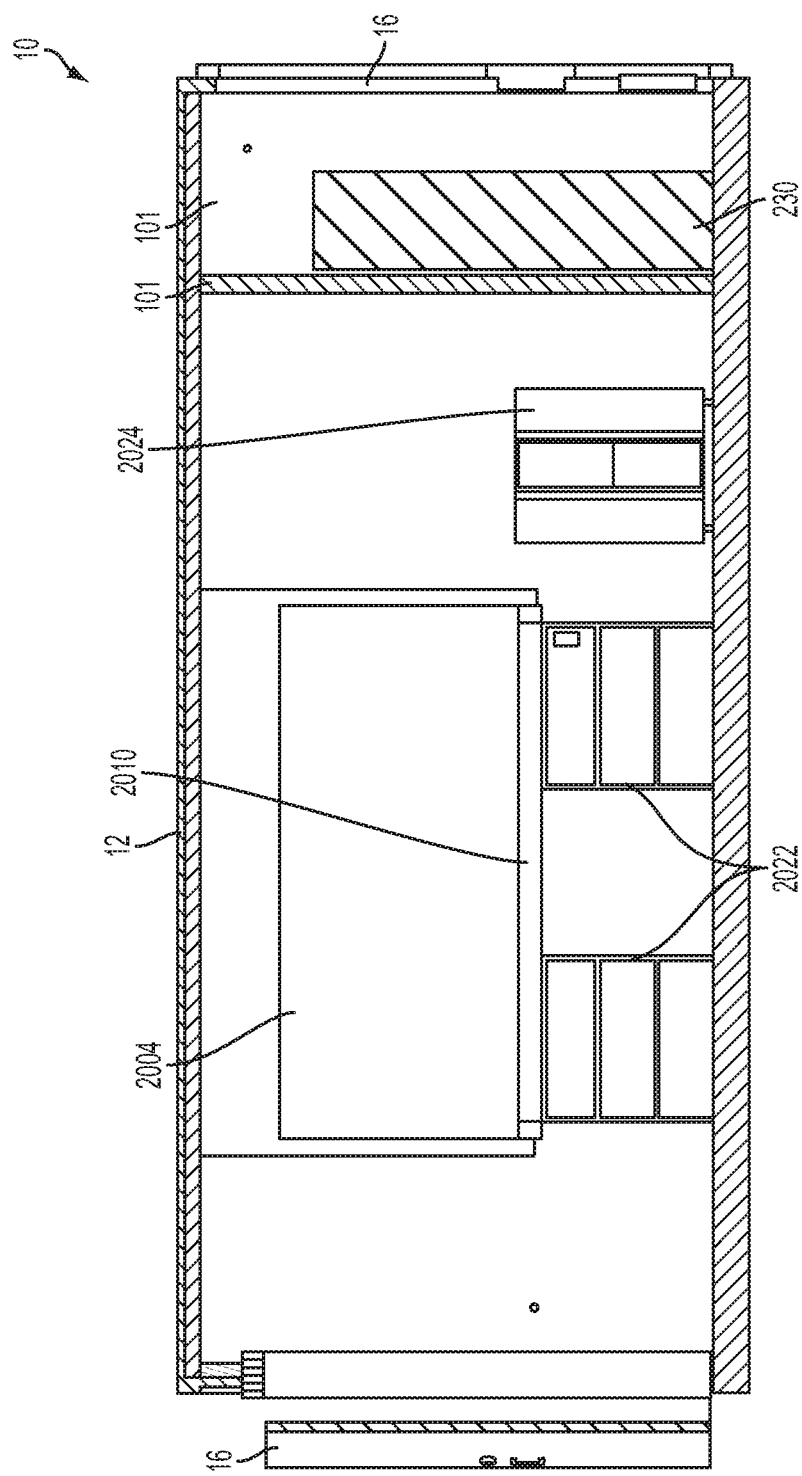
FIG. 32 is a cross-sectional view of the kiosk for resource distribution shown in FIG. 28 taken at line 32-32 of FIG. 30 in accordance with one embodiment of the present disclosure.

Referring now also to FIG. 32, the cross section is taken at line 32-32 of FIG. 30 along the vertical longitudinal center plane of the kiosk for resource distribution 10. The cross-section provides a view of the front interior wall of the housing 12 of the kiosk for resource distribution 10. The service window 2004 may be seen cut through the front wall of the housing 12. The roller door 2006 shown in FIG. 28 is not present in FIG. 32. As shown, the service counter 2010 which is mounted at the bottom of the service window 2004 extends into the interior of the housing 12. The door 16 on the left side of the housing 12 (relative to FIG. 32) is shown in an open position.

Still referring to FIG. 32, in various embodiments, the front interior wall of the housing 12 may include one or more shelves, or in some embodiments, a number of sets of shelves 2022. In the example embodiment shown in FIGS. 28-39 two sets of shelves 2022 are included on the front interior wall of the kiosk for resource distribution 10. These shelves 2022 may be used by the entrepreneur/user to store products, goods, etc. The shelves 2022 may be adjustable in height. In some embodiments, the shelves 2022 may be constructed from polyurethane coated plywood. A storage cabinet 2024 which is positioned against the interior front wall of the housing 12 may also be included in some embodiments of the kiosk for resource distribution 10. In some embodiments, the storage cabinet 2024 may be lockable.

In various embodiments, a first partitioning wall 101 may be included, which is also shown in FIG. 32. The first partitioning wall 101 partitions the interior of the housing 12 into two sections. The first partitioning wall 101 may be constructed of steel framing members and polyurethane finished plywood and may be insulated. In various embodiments, one of the sections may be relatively small while the other is relatively large. The smaller section may function as a storage area 100. In some embodiments, the smaller section may function as a storage area 100 for a number of batteries in a battery bank 230. The larger section of the kiosk for resource distribution 10 may function as a business space for the entrepreneur/user. As shown, the storage area 100 may be accessed through a door 16 on the right side of the housing 12. The door 16 on the right side of the housing 12 may be a standard shipping container barn type door and is depicted as closed in FIG. 32. However, in various embodiments, the door may be any type of door with any design. In various other embodiments, the number or usage of partitioned areas may differ.

Figure 33:
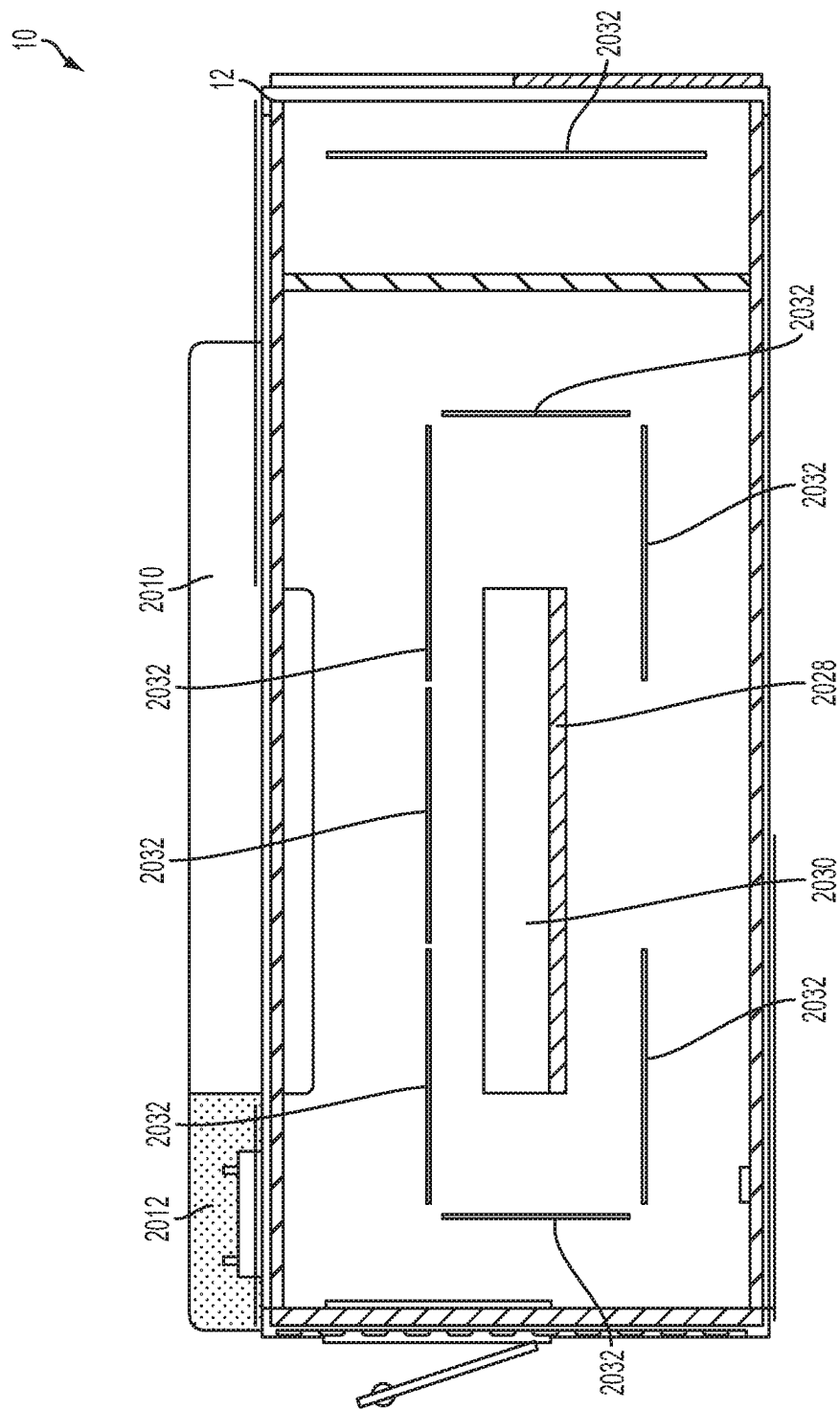
FIG. 33 is a cross-sectional view of the kiosk for resource distribution shown in FIG. 28 taken at line 33-33 of FIG. 29 in accordance with one embodiment of the present disclosure.

Referring now also to FIG. 33 another cross sectional view is shown. The cross sectional view is taken at line 33-33 of FIG. 29 and provides a top down view of the layout of the kiosk for resource distribution 10 shown in FIGS.

28-39. The service counter 2010 is shown extending into the interior of the housing 12 and extending out away from the exterior of the housing 12. The holes and/or perforations in the lower service counter 2012 are also shown in FIG. 33.

In various embodiments, an interior wall 2028 may also be included in the interior of the housing 12. The interior wall 2028 may be constructed from steel framing members and plywood in some specific embodiments. In such embodiments, the plywood may be coated with a finish that provides mold and/or rot protection. The interior wall 2028 may be positioned roughly in the center of the larger, business section of the kiosk for resource distribution 10. The interior wall 2028 may be positioned such that the interior wall 2028 is visible to a customer through the service window 2004 (see FIG. 32). The interior wall 2028 may include any number of shelves, adjustable shelving 2030, racks, hooks, and/or other means of displaying goods and products. In some embodiments, the interior wall 2028 may run parallel to the front and back interior walls of the housing 12.

The lighting 2032 for the interior of the kiosk for resource distribution 10 is also shown in FIG. 33. In various embodiments, the lighting 2032 may include 24V DC LED strip lights of various lengths. In other embodiments, the lighting 2032 may be of any suitable type and of any desired number of light. As shown, in some embodiments, five strips of LED lights may be located on the ceiling of the large, business section of the kiosk for resource distribution 10. One relatively long LED light strip may be located in the smaller storage area 100 of the kiosk for resource distribution 10. In some embodiments, the lighting 2032 may be recessed into the ceiling of the interior of the kiosk for resource distribution 10 which may be beneficial/desirable for many reasons, including, but not limited to, providing protection against damage. In some embodiments, the output of the lighting 2032 may be rated to produce 6400 lumens in the larger, business section and 1200 lumens in the storage area 100. In other embodiments, the lighting on the interior of the housing 12 may be sufficient to produce at least 50 lumens per square foot. In various embodiments, the amount of lighting and the output of the lighting may vary and be more or less than described herein.

Figure 29:
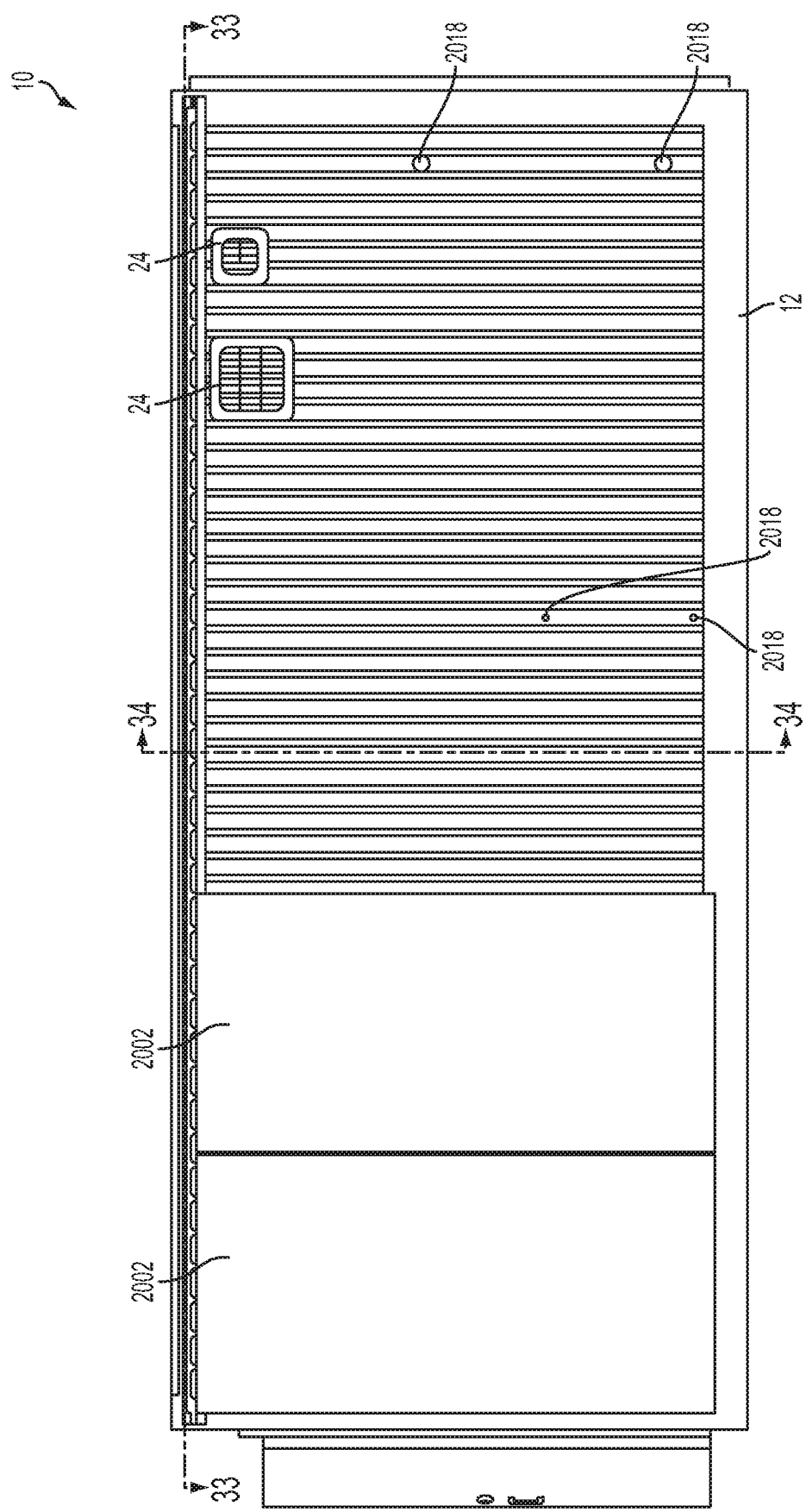
FIG. 29 is a back view of the kiosk for resource distribution shown in FIG. 28 in accordance with one embodiment of the present disclosure.
Figure 34:
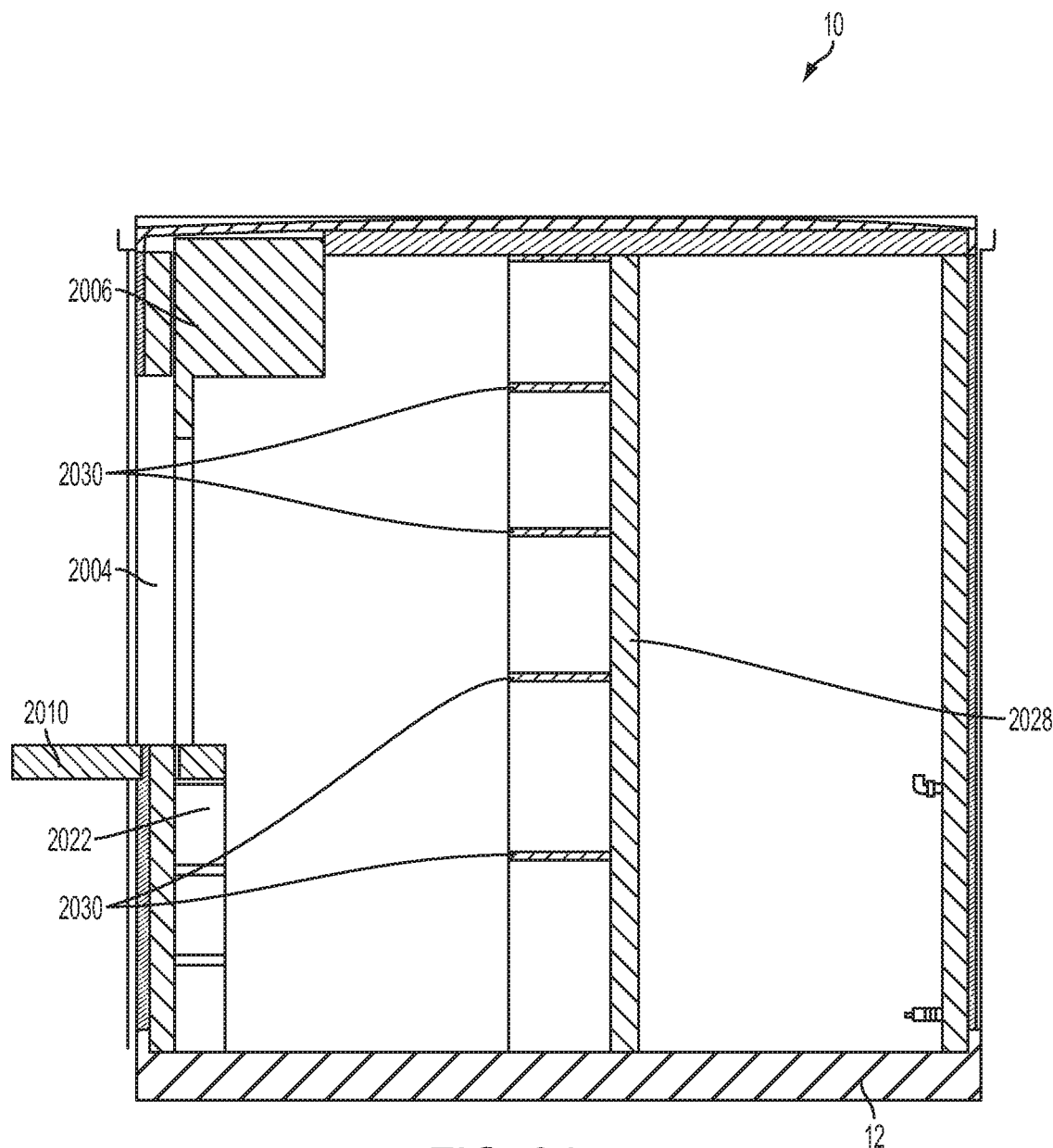
FIG. 34 is a cross-sectional view of the kiosk for resource distribution shown in FIG. 28 taken a line 34-34 of FIG. 29 in accordance with one embodiment of the present disclosure.

Referring now also to FIG. 34 a cross-sectional view of the kiosk for resource distribution 10 shown in FIGS. 28-39 is shown, taken along line 34-34 of FIG. 29. As shown, the service window 2004 and roller door 2006 may be seen in FIG. 34. The roller door 2006 is shown in a rolled up position. A customer/user standing at the service counter 2010 and looking through the service window 2004 may have an unobstructed view of any goods displayed on the adjustable shelving 2030 on the interior wall 2028 of the kiosk for resource distribution 10. The shelves 2022 on the front interior wall of the housing 12 may not be visible to a customer looking through the service window 2004.

Figure 35:
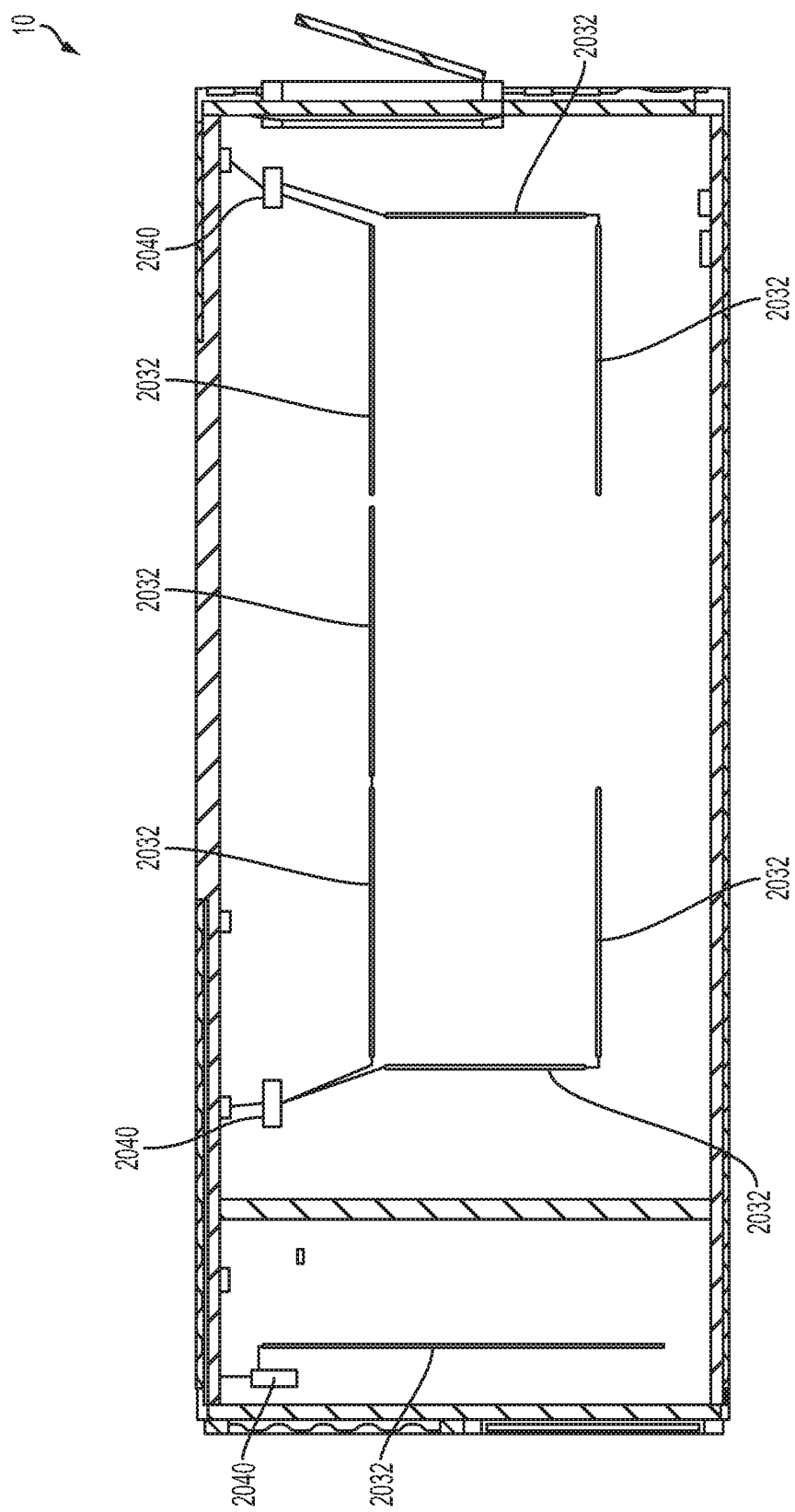
FIG. 35 is another cross-section view of the kiosk for resource distribution shown in FIG. 28 taken at line 33-33 of FIG. 29 in accordance with one embodiment of the present disclosure.

Referring now also to FIG. 35 depicts another cross-sectional view of the example kiosk for resource distribution 10 shown in FIGS. 28-39 taken at line 33-33 of FIG. 29. The electrical layout of the ceiling is shown in FIG. 35. As shown, the lighting 2032 may be driven by an appropriate transformer 2040. For example, if the kiosk for resource distribution 10 were to be deployed in South Africa and draw power from the grid, the transformer may be a 230V AC, 50 Hz transformer capable of producing 24V DC for the lighting 2032. However, depending on the location of the kiosk 10, the transformer may vary.

Figure 36:
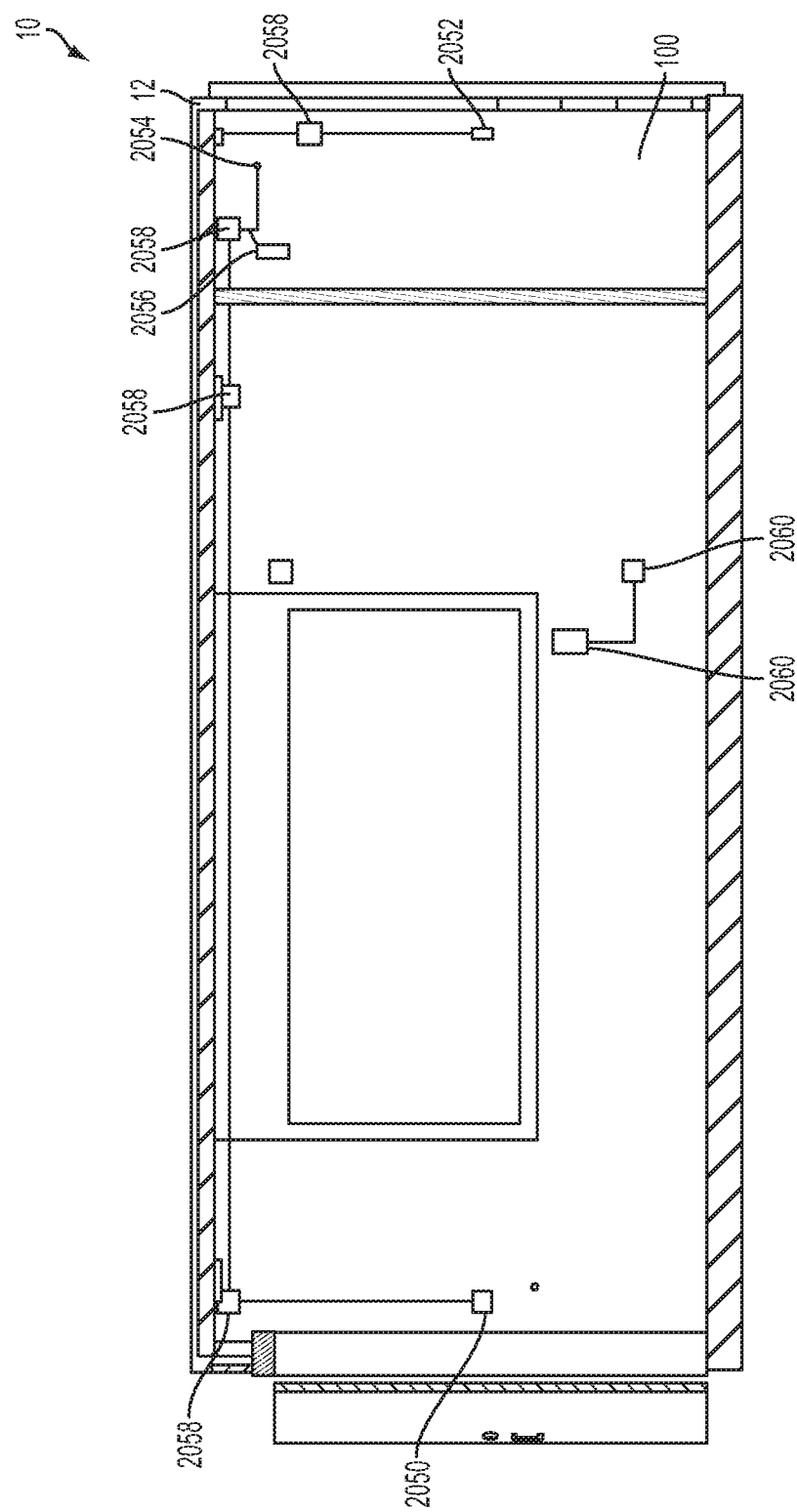
FIG. 36 is another cross-sectional view of the kiosk for resource distribution shown in FIG. 28 taken at line 32-32 of FIG. 30 in accordance with one embodiment of the present disclosure.

Referring now also to FIG. 36 another cross-sectional view of the example kiosk for resource distribution 10 shown in FIGS. 28-39 taken at line 32-32 of FIG. 30. The electrical layout on the front interior wall of the housing 12 is shown in FIG. 36. As shown, a light switch 2050 may be included to control the lighting 2032 described in reference also to FIG. 35. In some embodiments, the light switch 2050 may be wired such that it controls both the interior lighting 2032 and the exterior lighting of the kiosk for resource distribution 10. The light switch 2050 may include two toggles, rockers, push buttons, etc. one controlling the interior lighting 2032 and the other controlling the exterior lighting. The light switch 2050 may be wired differently in other embodiments. In various embodiments, the light switch may vary and/or the wiring of the light switch(es) may vary.

Referring still to FIG. 36, as shown, in various embodiments, a storage area light switch 2052 may also be included in the storage area 100 of the kiosk for resource distribution 10. In such embodiments, the storage area light switch 2052 may control only the lighting 2032 in the storage area 100 of the kiosk for resource distribution 10. The storage area light switch 2052 may be a toggle, rocker, push button, or any other suitable type of switch. The storage area 100 also includes a pass through opening 2054 for wiring to the exterior lighting of the kiosk for resource distribution 10. An appropriate transformer 2056 to drive the exterior lighting is also included in the storage area 100 in the example embodiment. Other various junction boxes 2058 and outlets 2060 may be included as well.

Figure 37:
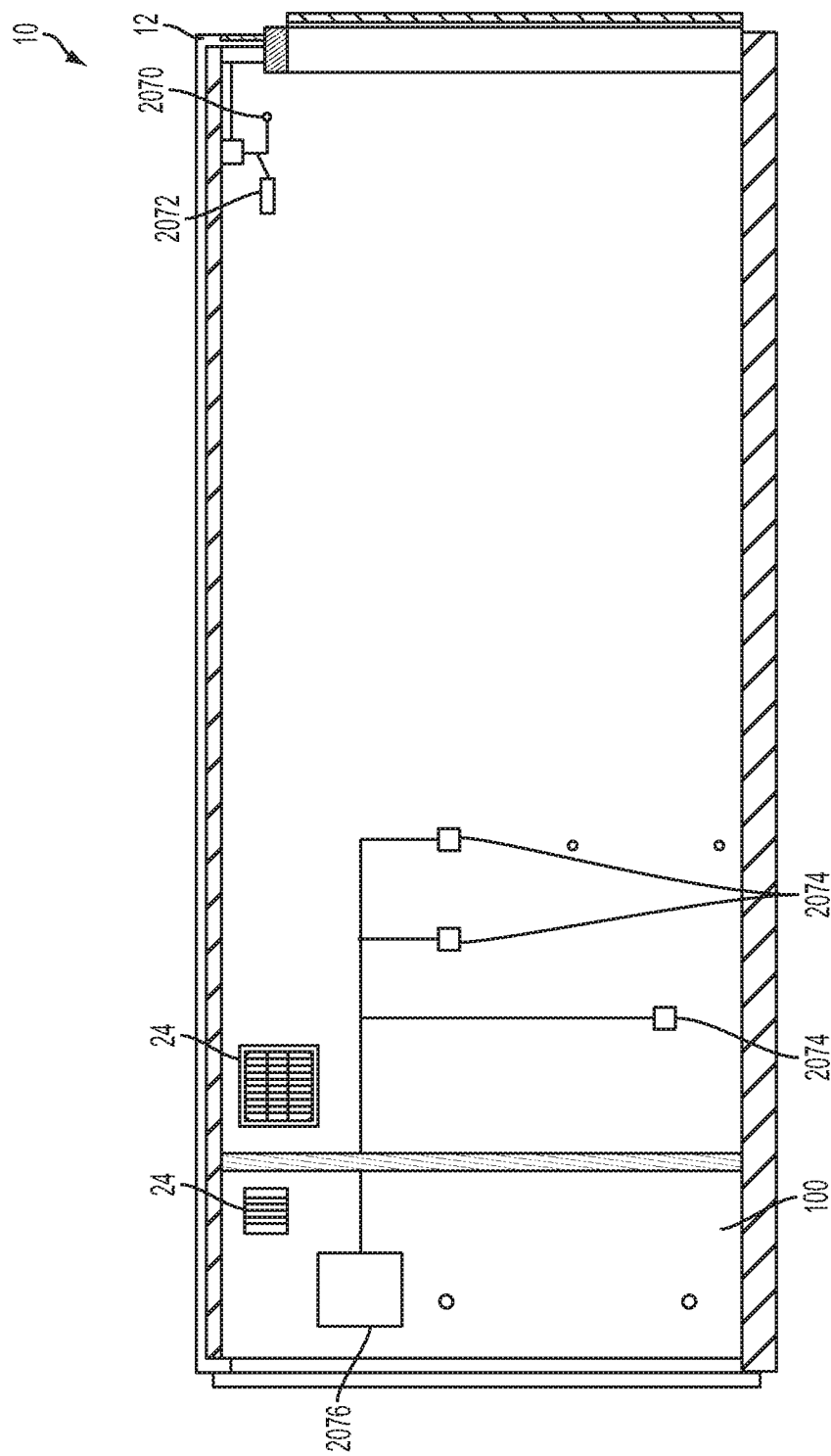
FIG. 37 is another cross-section view of the kiosk for resource distribution shown in FIG. 28 taken at line 37-37 of FIG. 30 in accordance with one embodiment of the present disclosure.

Referring now also to FIG. 37, another cross-sectional view of the kiosk for resource distribution 10 shown in FIGS. 28-39 taken at line 37-37 of FIG. 30 is depicted. As shown, the cross-section shows the electrical layout of the back interior wall of the housing 12. The back interior wall of the housing 12 may, in some embodiments, include a pass through opening 2070 for wiring to exterior lighting similar to the front interior wall shown in FIG. 36. In various embodiments, near the pass through opening 2070, an appropriate transformer 2072 to drive the exterior lighting may also be included.

In various embodiments, a number of junction boxes 2074 may be include on the back interior wall of the housing 12. Each shown junction box 2074 may have its own dedicated electrical feed line, as shown in the embodiment depicted in FIG. 37. One of the junction boxes 2074 may provide the power for a water device such as a vapor compression water distillation device. One or more of the other junction boxes 2074 may provide power for at least one water pump.

In various embodiments, a breaker panel 2076 may also be included in the kiosk for resource distribution 10 depicted in FIGS. 28-39. As shown in FIG. 37, in various embodiments, the breaker panel 2076 may be located in the storage area 100 on the back interior wall of the housing 12. In various embodiments, all of the electrical power for the kiosk for resource distribution 10 may be routed through the breaker panel 2076.

In some embodiments, at least one vent may be included. In some embodiments, two vents 24 may be included, as shown in FIG. 37. As shown, one of the vents 24 may be located in the storage area 100. The vent 24 located in the storage area 100 may include an exhaust fan (not shown) to blow hot air out of the storage area 100. The exhaust fan may help to blow heat generated by a battery bank 230 (see, for example, FIG. 32) out of the housing 12. Some embodiments may also include an air intake vent (not shown) in communication with the storage area 100 to further facilitate ventilation. In some embodiments including an exhaust fan, the exhaust fan may have an average power usage no greater than 65 watts, however, in various embodiments, the watts used by an exhaust fan may vary and in some embodiments, be higher or lower than 65.

Figure 38:
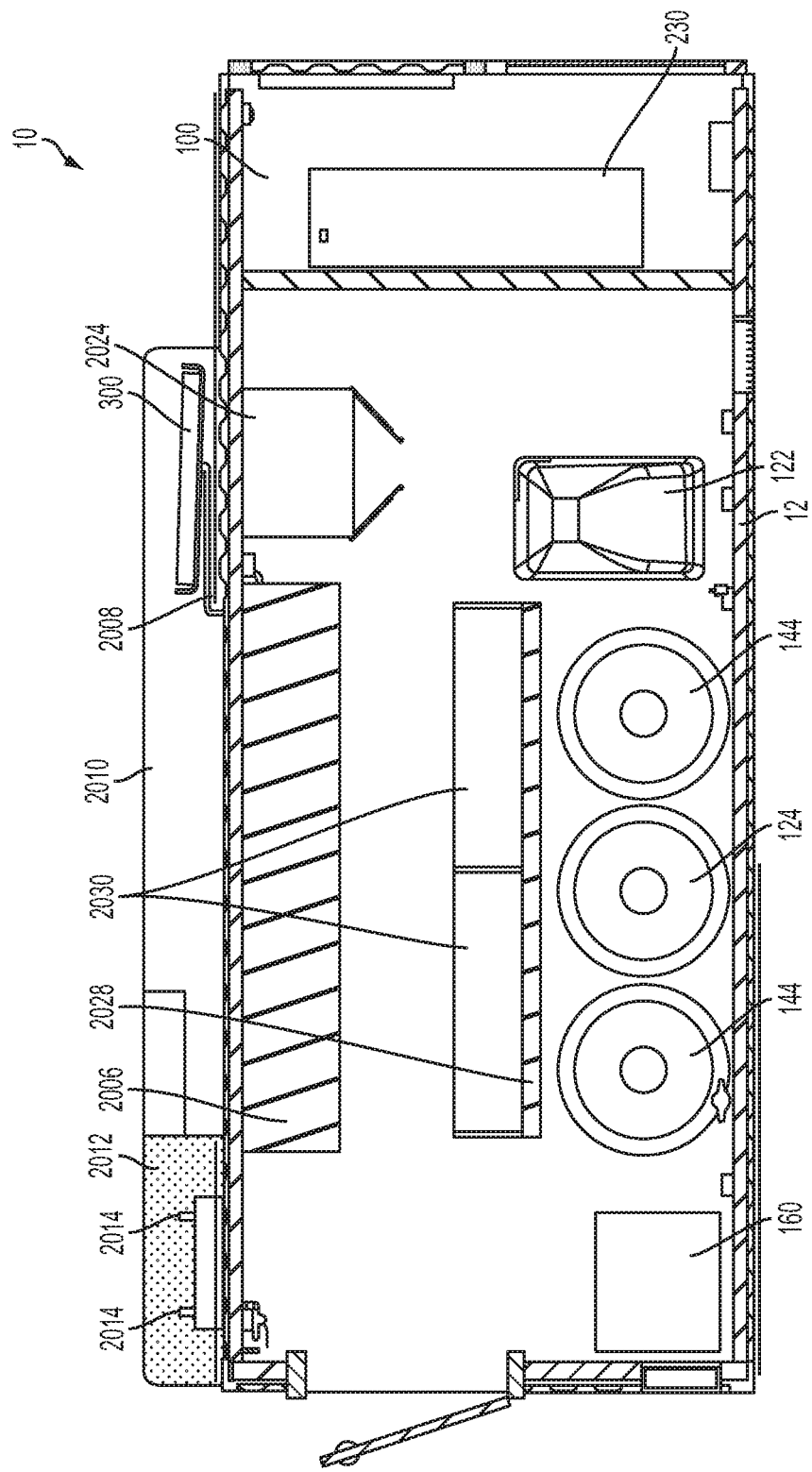
FIG. 38 is another cross-sectional view of the kiosk for resource distribution shown in FIG. 28 taken at line 33-33 of FIG. 29 in accordance with one embodiment of the present disclosure.

Referring now also to FIG. 38, another cross-sectional view of the example kiosk for resource distribution 10 shown in FIGS. 28-39 taken at line 33-33 of FIG. 29 is depicted. The cross-section provides a top down view of the kiosk for resource distribution 10. The kiosk for resource distribution 10 in FIG. 38 is furnished such that it may function as an entrepreneurial business, clean water provider, and community center.

As shown, in some embodiments, the kiosk for resource distribution 10 may include a service counter 2010 and a lower service counter 2012 which has holes or perforations in it. The lower service counter 2012 may be positioned below two spigots 2014. The roller door 2006 for the service window 2004 (shown in FIG. 32) is also shown in FIG. 38. The television 300 is coupled to a swing arm 2008. The swing arm 2008 is positioned such that the television 300 is outside of the housing 12 of the kiosk for resource distribution 10 and is viewable by customers/users around the kiosk for resource distribution 10. A storage cabinet 2024, which may be included in some embodiments, is also shown in the kiosk for resource distribution 10 and is positioned along the front interior wall of the housing 12. Additionally, an interior wall 2028 with adjustable shelving 2030 attached to it is also shown in FIG. 38. A battery bank 230 is also disposed in the storage area 100 of the kiosk for resource distribution 10 in the embodiment shown. In various embodiments, the kiosk for resource distribution 10 may also include a refrigerator 160. The refrigerator 160 may have a transparent door to allow customers to view the contents of the refrigerator 160 when looking into the kiosk for resource distribution 10 from the service counter 2010.

In some embodiments, there may be seating (not shown) included inside the housing 12 of the kiosk for resource distribution 10. The seating may provide a place for the entrepreneur/user to sit while working inside the kiosk for resource distribution 10. In some embodiments, the seating may, for example be a stool which is located between the service counter 2010 and the interior wall and adjustable shelving 2030. In various embodiments, a sitting area may also be included outside of the housing 12 of the kiosk for resource distribution 10.

The embodiments of the kiosk for resource distribution 10 shown in FIGS. 28-399 may also include a water distillation device 122, source water reservoir 124, and two product water reservoirs 144. The water distillation device 122 may treat water coming from the source water reservoir 124 to create clean, safe product water which is then stored in the two product water tanks 144. The source water reservoir 124 and the product water reservoirs 144 may be placed behind the interior wall 2028 such that they are hidden from view by customers at the service counter 2010 looking into the kiosk for resource distribution 10.

Figure 39:
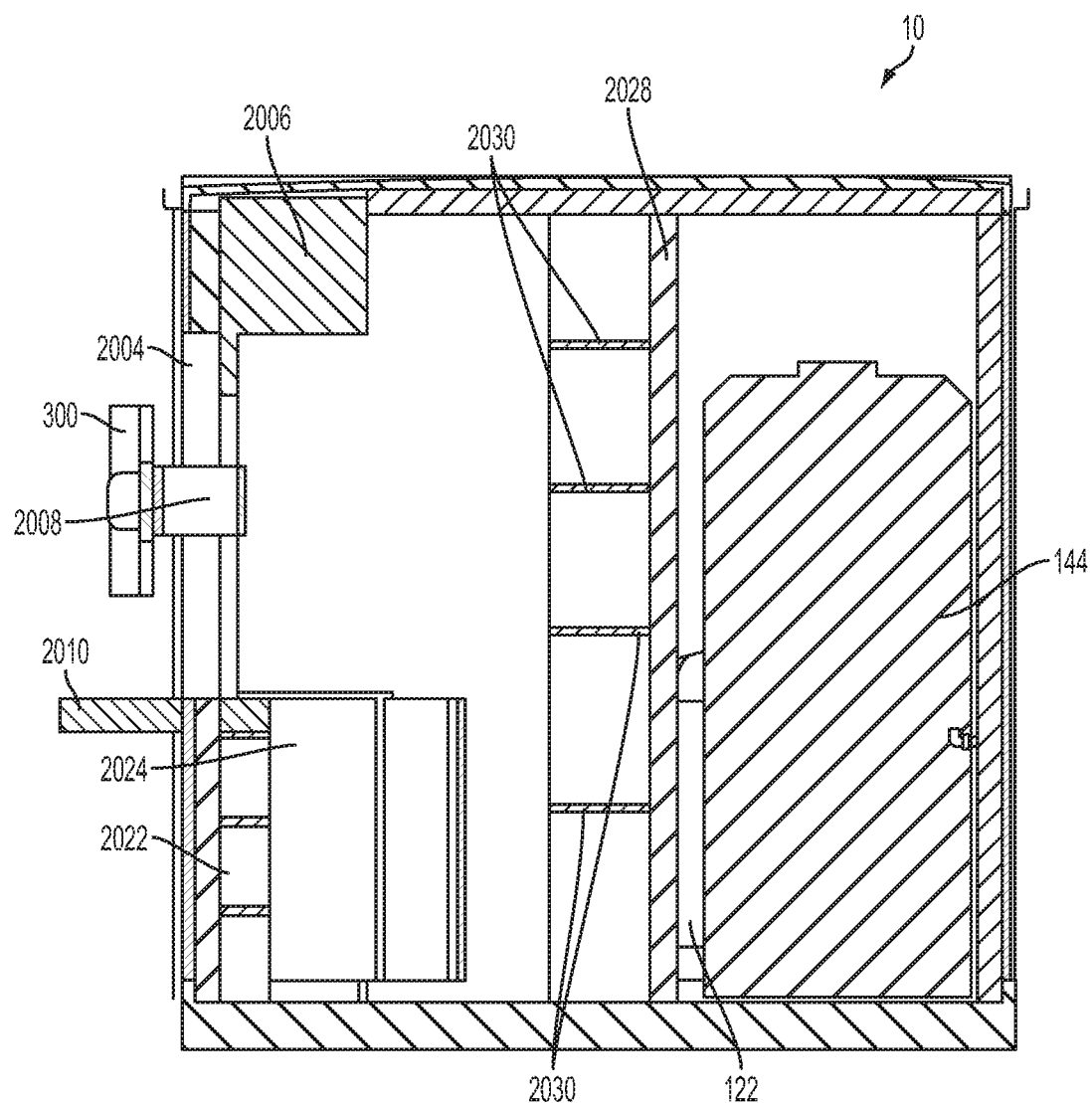
FIG. 39 is another cross-sectional view of the kiosk for resource distribution shown in FIG. 28 taken at line 34-34 of FIG. 29 in accordance with one embodiment of the present disclosure.

Referring now also to FIG. 39 another cross-sectional view of the example kiosk for resource distribution 10 shown in FIGS. 28-39 taken at line 34-34 of FIG. 29. The embodiment of the kiosk for resource distribution 10 in FIG. 39 is furnished in the same manner as in FIG. 38. One of the product water reservoirs 144 is shown in FIG. 39. A portion of the water distillation device 122 is also shown in FIG. 39. An interior wall 2028 with adjustable shelving 2030 is also shown in FIG. 39. A storage cabinet 2024 and shelving 2022 under the service counter 2010 is also included in the example kiosk for resource distribution 10. The roller door 2006 for the service window 2004 is rolled up and the swing arm 2008 is pivoted such that the television 300 is viewable to customers/users outside of the kiosk for resource distribution 10.

In some embodiments, the kiosk for resource distribution 10 shown in FIGS. 28-39 may differ. The kiosk for resource distribution 10 may include a solar panel array 2202 (see, for example, FIG. 41) or other power generator. Some of the components or features of the kiosk for resource distribution 10 shown in FIGS. 28-39 may not be included in some embodiments. Also, some embodiments may include additional features or components, for example, any of those described herein.

Figure 40A:
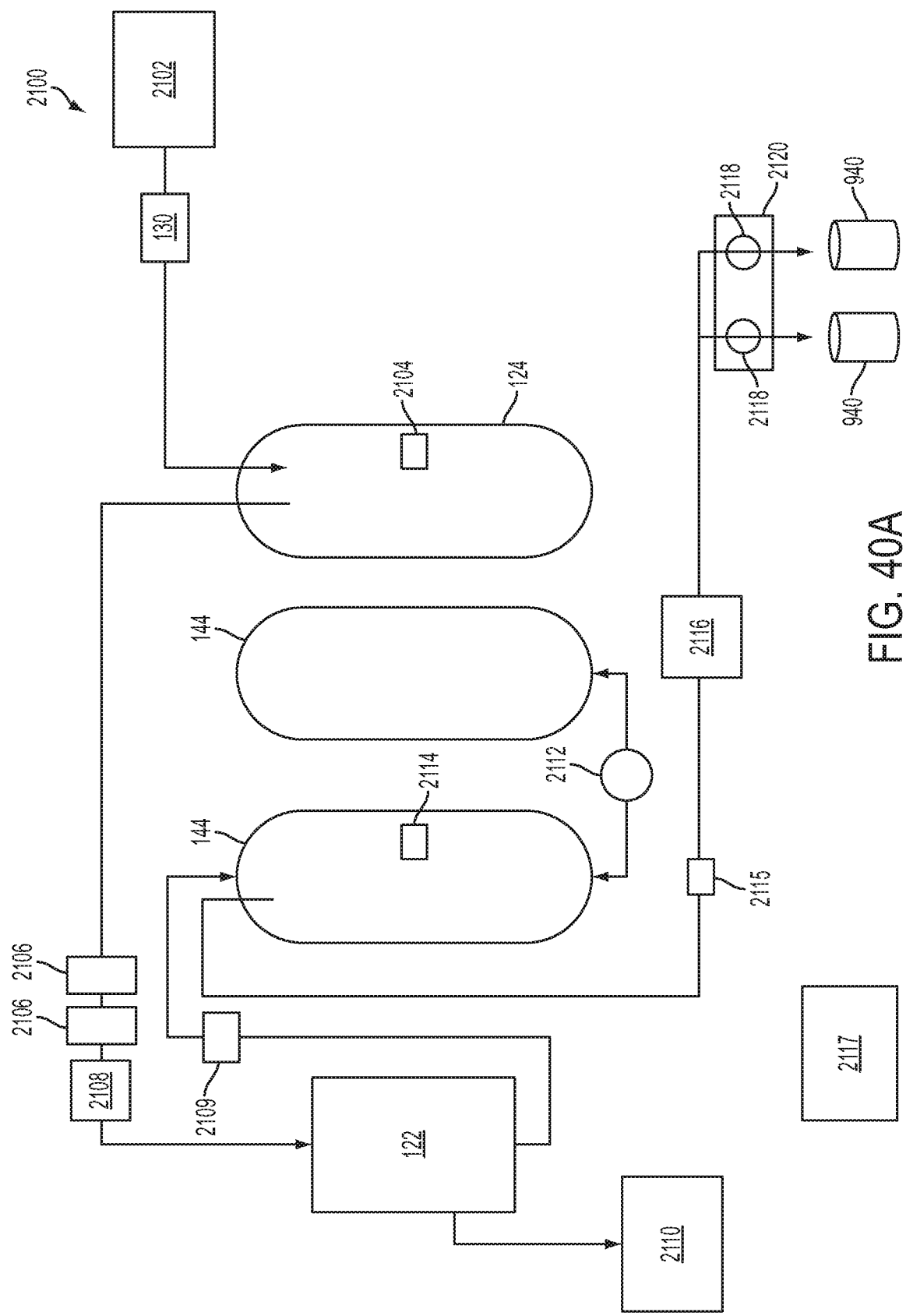
FIG. 40A is an example block diagram of a water purification system in accordance with one embodiment of the present disclosure.
Figure 40B:
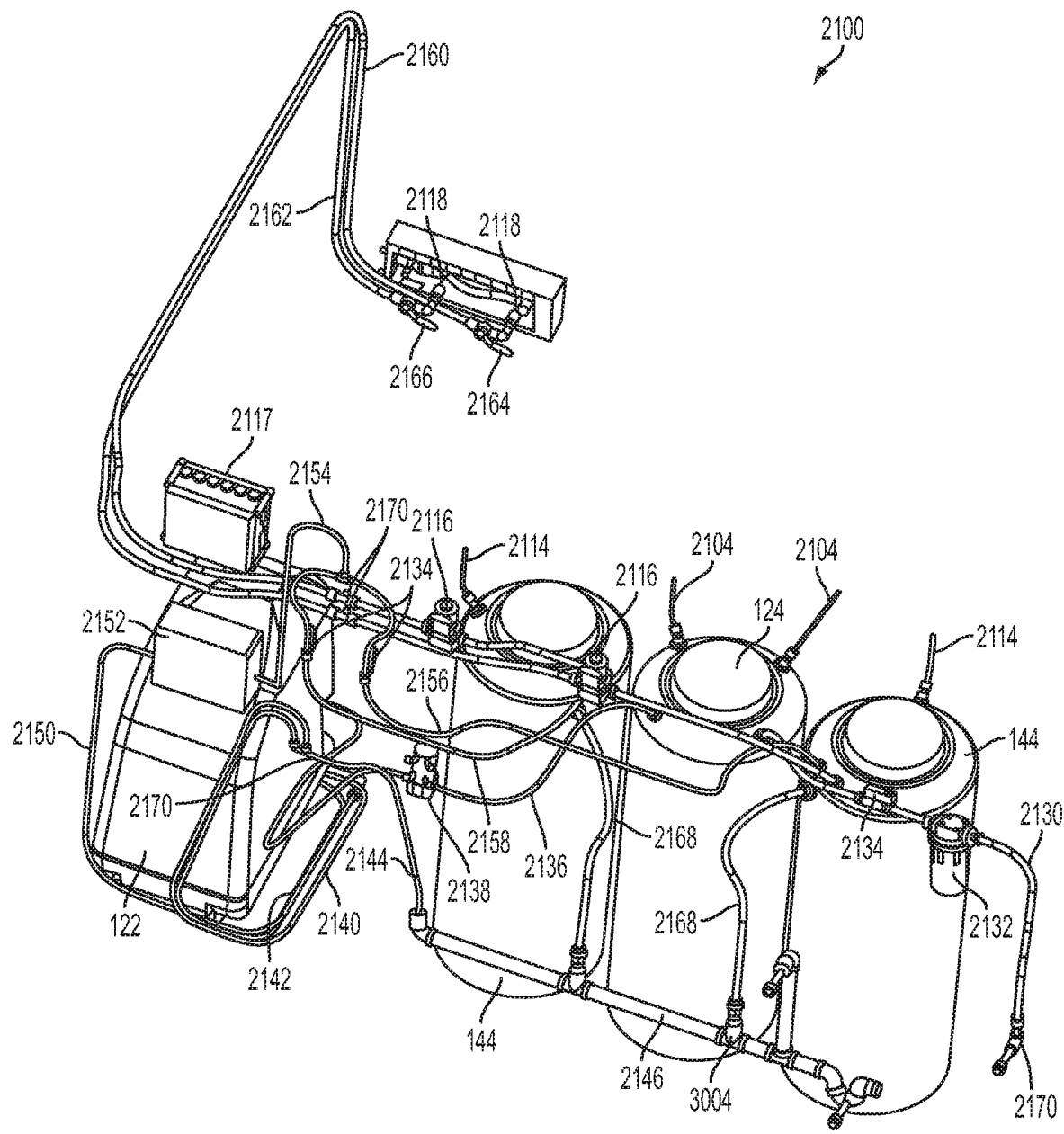
FIG. 40B is an embodiment of a water purification system in accordance with one embodiment of the present disclosure.
Figure 40C:
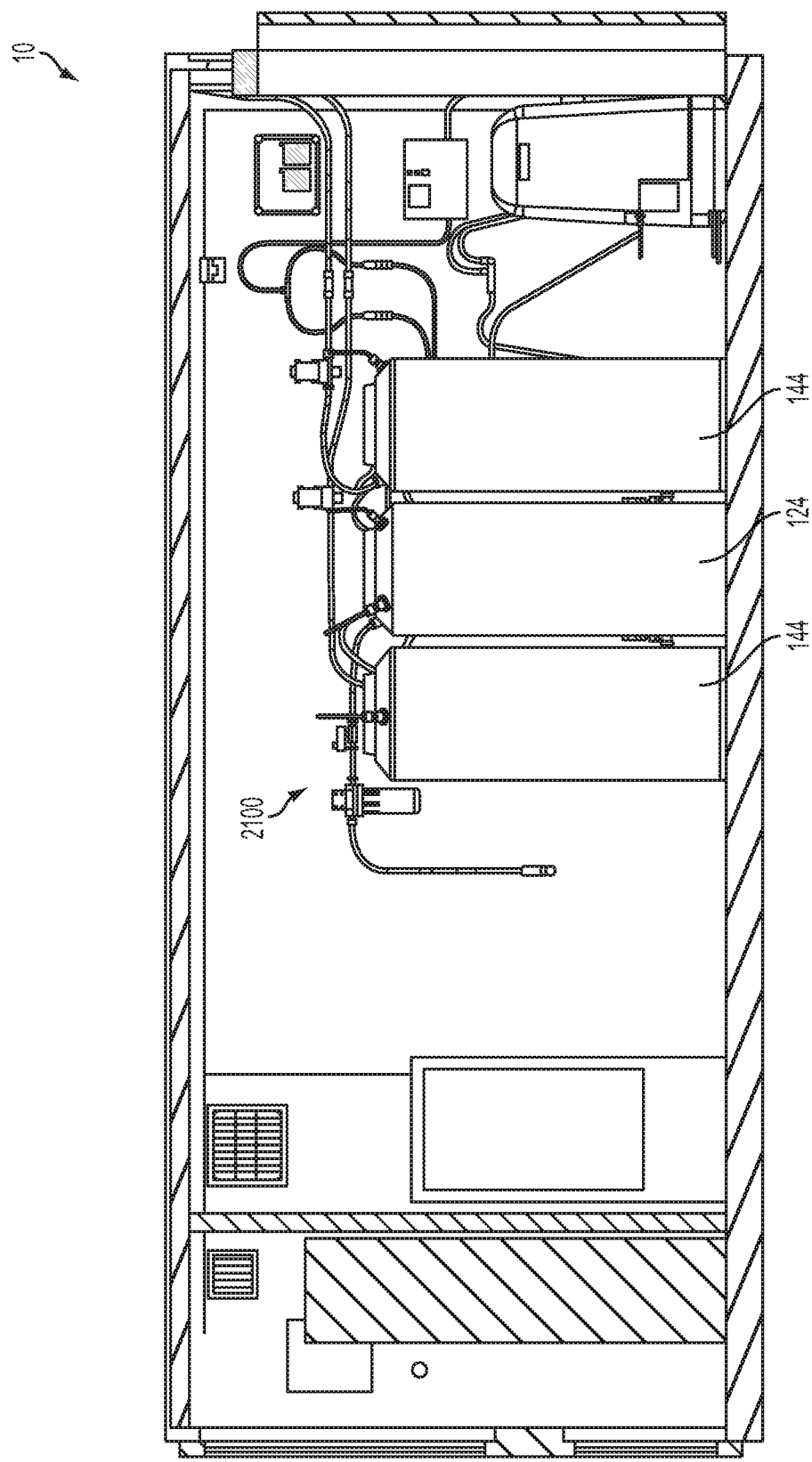
FIG. 40C is an embodiment of a water purification system in an example kiosk for resource distribution accordance with one embodiment of the present disclosure.

Referring now also to FIGS. 40A-40C, in various embodiments, a water purification system 2100 may be used. The water purification system 2100 may serve to purify contaminated or polluted water from a source into potable water for a surrounding community. A water purification system 2100 for a kiosk for resource distribution 10 may include a number of pumps, reservoirs, and a purification device. Such a water purification system 2100 may also include a number of valves and plumbing lines. Additionally, such a water purification system 2100 may also include a means for automatically controlling when at least one of the pumps is on/off or when at least one of the valves is open or closed. In various embodiments, a dispenser may also be included. A water purification system 2100 for a kiosk for resource distribution 10 may also include at least one filter and at least one sensor. The at least one filter may be any type of filter, including, but not limited to, one or more of the following: a screen, a particulate filter and/or a charcoal filter. The at least one sensor may sense one or more, but not limited to, the following: water quality, liquid levels, volume of water dispensed, and/or water pressure. Some embodiments may also include at least one sampling port from which samples can be drawn to have their quality measured. Various components of the water purification system 2100 may be chosen or configured to be long lasting, serviceable by untrained personnel, and to require minimal maintenance.

As shown, the water purification system 2100 includes a water source 2102. The water source 2102 may be any water source 2102 including, but not limited to, a pond, a lake, a river, a stream, a puddle, well, municipal water and/or the ocean. The water source 2102 may be polluted. In some embodiments, water is pumped from the water source 2102 to at least one source water reservoir 124 by a source water pump 130. The source water pump 130 may be any suitable source water pump 130 such as, but not limited to, any of those described above in reference to FIGS. 1-5. The source water pump 130 may be controlled by an electronics box 2117 with a relay that turns the source water pump 130 on and off. As shown, the source water reservoir 124 may include a source water liquid level sensor 2104 which may trip the power relay for the source water pump 130. When the water level in the source water reservoir 124 is low, the source water liquid level sensor 2014 may turn on the source water pump 130. When the water level in the source water reservoir 124 is high the source water liquid level sensor 2104 may trip the relay and turn the source water pump 130 off. The source water liquid level sensor 2104 may be any suitable liquid level sensor described herein, for example, those described in reference to FIGS. 1-5.

A source water may travel from the at least one source water reservoir 124 to a water purification device which may be a water distillation device 122. The water purification system may include at least one filter (which may include any of the filters described herein). In some embodiments, source water may pass through one or more source water filters 2106 on its way to the water distillation device 122. Preferably, in embodiments including source water filters 2106, the source water filters 2106 may be removable or otherwise disassembled to allow them to be cleaned and reused. The source water filters 2106 may help to remove sand, grit, organic materials, and other particles from the source water. In some embodiments, the example water purification system 2100 may not include a source water reservoir 124 and instead pump directly from the water source 2102 to the water purification device as needed.

In various embodiments, the water distillation device 122 may be any water distillation device, including, but not limited to, any water distillation device described in Appendix B.

Referring still to FIGS. 40A-40C, the source water filters 2106 in the water purification system 2100 may be located downstream from a source water reservoir pump 2108. This may help protect the source water reservoir pump 2108 and the water purification device downstream from the source water reservoir pump 2108 from damage and clogging. In some embodiments, the source water reservoir pump 2108 may be controlled by a water distillation device 122 such that the source water reservoir pump 2108 ensures the proper water level in the water distillation device 122 is maintained. In some specific embodiments, a water distillation device 122 may control the source water reservoir pump 2108 by supplying pulse width modulated power to the motor of the source water reservoir pump 2108.

When source water reaches the water distillation device 122 or other water purification device the water is distilled or otherwise cleaned and made potable. The clean/potable product water may then travel to at least one product water reservoir 144. The water may also pass at least one water parameter sensor 2109 on its way to the at least one product water reservoir 144. The water parameter sensor 2109 may measure water quality and prevent water from entering the at least one product water tank 144 if the water quality is deemed unacceptable. In some embodiments, the water parameter sensor 2109 may be included as part of the water purification device. In some embodiments, there may be a water parameter sensor 2109 in the water purification device and in the line from the water purification device to the at least one product water reservoir 144. In some embodiments, the water parameter sensor 2109 may be a conductivity sensor. In some embodiments, there may be both a water parameter sensor 2109 in the water purification device and in the line from the water purification device to the at least one product water reservoir 144.

In some embodiments, the water purification system 2100 may include at least one, and in some embodiments, two product water reservoirs 144. In embodiments where the water purification device is a water distillation device 122 a return or blowdown water drainage system 2110 may also be included. The blowdown water drainage system 2110 may be configured to remove the blowdown water or otherwise rejected water from the water purification system 2100 in accordance with any applicable standards.

In various embodiments, the at least one product water reservoir 144 and at least one source water reservoir 124 may be any of the varieties of reservoirs described herein. In some embodiments, the at least one product water reservoir 144 and the at least one source water reservoir 124 may be tanks each having a maximum fill volume of 255 gallons. However, in various other embodiments, the maximum fill volume may be less than or greater than 255 gallons. In some embodiments, the tanks may be any shape, including, but not limited to, substantially cylindrical and/or cylindrical. The at least one product water reservoir 144 may be constructed of a material which is certified for storing potable water. In some embodiments, the at least one product water reservoir 144 and at least one source water reservoir 124 may be made from roto-molded polyethylene, however, in various other embodiments, other materials may be used. In some embodiments, the at least one source water reservoir 124 may be a different color than the at least one product water reservoir 144 to make it visually obvious upon a cursory glance which reservoir is filled with source water and which is filled with clean product water.

In some embodiments, the two product water reservoirs 144 may be arranged such that one may be taken offline for cleaning while the other is still able to vend water to a consumer/user. In some embodiments of the water purification system 2100 the two product water reservoirs 144 may be fluidly connected. The fluid connection between the two product water reservoirs 144 may include a valve 2112 which may isolate one of the product water reservoirs 144 from the other. This valve 2112 may, in some embodiments, be a manual valve 2112. However, in various embodiments, the valve 2112 may be an automatic/active valve. The valve 2112 may be actuated to isolate one of the product water reservoirs 144 such that the isolated product water reservoir 144 may be cleaned. This may allow the water purification system 2100 to retain the ability to store product water even during cleaning of a product water reservoir 144. In some embodiments, the at least one source water reservoir 124 and or the at least one product water reservoir 144 may include an access port such as a lid to facilitate cleaning.

In various embodiments, at least one of the at least one product water reservoir 144 may include a product water liquid level sensor 2114. The product water liquid level sensor 2114 may be configured to determine when power may be supplied to a product water distribution pump 2116. The product water distribution pump 2116 may pump water out of the at least one product water reservoir 144 and to a consumer product water container 940. In some embodiments, an electronics box 2117 with a relay may be included in the water purification system 2100. The relay may be tripped such that power to the product water distribution pump 2116 is turned off when the water level in the at least one product water reservoir 144 is low. The product water liquid level sensor 2114 may be any suitable liquid level sensor, such as any of those described herein in reference to FIGS. 1-5. In some embodiments with multiple product water reservoirs 144, each product water reservoir 144 may have a product water liquid level sensor 2114. In such embodiments, during cleaning, the product water liquid level sensor 2114 in the product water reservoir 144 being cleaned may be disabled such that it may not trip a relay for a distribution pump 2116.

In some embodiments of the water purification system 2100 the product water distribution pump 2116 may be capable of supplying product water to a user at a rate of approximately 3 gallons per minute. In other embodiments, different product water distribution pumps 2116 capable of achieving other flow rates may be used. When water is not being drawn from the water purification system 2100 by a user, the product water distribution pump 2116 may pressurize water in the line from the at least one product water reservoir 144 to the product water dispensers 2118 to a predetermined/pre-programmed threshold. In some embodiments, the threshold may be approximately 45 psi, however, in various other embodiments, the threshold may be greater than or less than 45 psi. After the product water distribution pump 2116 has pressurized the water to the appropriate pressure, the product water distribution pump 2116 may shut off. In other embodiments, the product water distribution pump 2116 may pressurize the water in the line to any other suitable set point. In some embodiments, the threshold may be user adjustable.

Figure 40D:
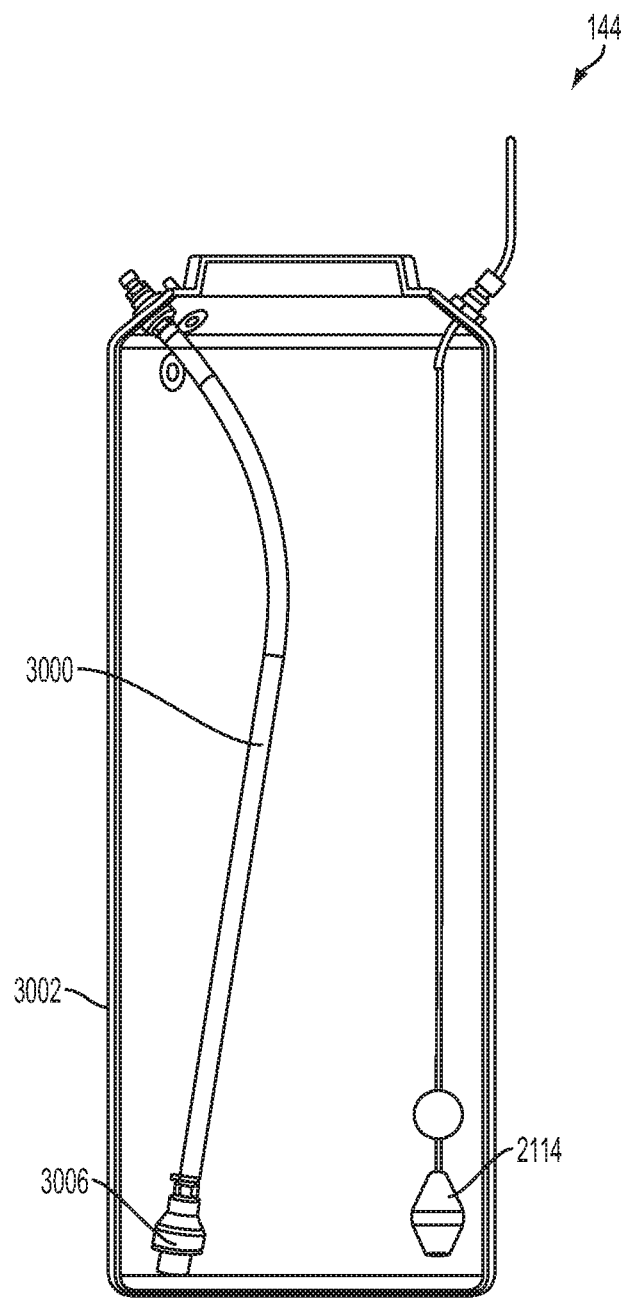
FIG. 40D is a cross section of one embodiment of a product water reservoir.

Referring now also to FIG. 40D, in various embodiments, the product water reservoir 144 may include a housing 3002, which in various embodiments may be made from any materials, including, but not limited to, plastic and/or metal which may include, but is not limited to, stainless steel. In some embodiments, the product water reservoir 144 may include at least one product water liquid level sensor 2114 and at least one check valve 3006 connected to a water line 3000. In some embodiments, the product water reservoir may include a second water level sensor (not shown). In various embodiments, the source reservoir 124 may include at least one liquid level sensor, and in various embodiments, the source reservoir 124 may include two liquid level sensors, wherein one liquid level sensor may be located near the bottom of the reservoir (as shown in FIG. 40D) for determining if there is liquid in the reservoir, and a second liquid level sensor located near the top of the reservoir (not shown) for determining if the reservoir is full. In various embodiments, when the reservoir is full, additional liquid will not be added to the reservoir.

The product water reservoirs 144 may be configured to allow water to be pull out of the top of the product water reservoir 144 so that no water lines exit the bottom of the tanks where leaks may cause water loss. Self priming pumps that can pull water up to at least the height of the top of the product water reservoir 144 may drain the tanks. The water line 3000 connected to the pump extends from above the product water reservoir 144 to the bottom of the product water reservoir 144. This allows the product water reservoir 144 to be fully drained. Once this pump and water line 3000 are primed with water, the prime may be maintained with a check valve 3006 at the end of the water line 3000 in the bottom of the product water reservoir 144. The check valve 3006 does not allow water to drain back into the product water reservoir 144 so that even when the water level in the product water reservoir 144 drops, the water line 3000 remains full of water, and the water line 3000 remains primed.

A pump between the product water reservoir 144 and the product water dispenser 2118 may generate pressure to dispense water. However, the pump does not need to be on when water is not being dispensed. A pressure sensor between the pump and product water dispenser 2118 may determine when water is being dispensed. When the product water dispenser 2118 is open and the pump is on, the pressure will be low. If the product water dispenser 2118 is closed and the pump is on, the pressure will be high. If the pump is a positive displacement pump, the pressure in the water line will be maintained as long as the product water dispenser 2118 remains closed. A pressure switch may be used with a positive displacement pump to switch the pump on when the pressure is low and off when the pressure is high. When the product water dispenser 2118 is opened, the pressure will drop, and the pump will turn on. Water will then be dispensed. When the product water dispenser 2118 is closed, the pressure in the water line will increase until the preset pressure switch value is reached, and the pump will shut off. The positive displacement pump will remain off until the pressure in the water line decreases when the product water dispenser 2118 is opened. This system and method of maintaining prime in the pump is beneficial/desirable for many reasons. For example, if the pump looses prime, the line pressure will drop and the pump will turn on and not turn off. This is because the pump will not be able to generate the preset pressure level to signal to the pump to turn off. As continuous running of the pump will damage or wear out the pump, it is beneficial/desirable to maintain prime in the pump. In some embodiments, a water level sensor may be used. The water sensor may assure that the pump will shut off before all the water is drawn out of the product water reservoir 144 and the pump pulls air in and looses prime.

As mentioned above, in various embodiments, the water purification system 2100 may include product water dispensers 2118 which may in some embodiments be spigots. A user or the entrepreneur may be able to turn on the product water dispensers 2118. In some embodiments, only the entrepreneur may be able to turn on the product water dispenser 2118. In some embodiments, the product water dispensers 2118 may be removed from or locked into the water purification system 2100. This may be beneficial/desirable to avoid vandalism or theft of product water when a kiosk for resource distribution 10 is "closed for business". When the product water dispensers 2118 are turned on, the example water purification system 2100 may vend product water to a user such that a user may fill up one or more consumer product water container 940. In embodiments where the product water dispensers 2118 may be removed from the water purification system 2100, a self-sealing quick disconnect may be included at the attachment point of the product water dispensers 2118. In various embodiments, the product water dispensers 2118 (and other hardware in the fluid path) may be made from FDA food grade certified and/or National Sanitation Foundation certified materials. However, in other embodiments, the materials used may vary. In some embodiments, the product water dispensers 2218 may include aerators.

In various embodiments, the water purification system 2100 may also include at least one UV filter 2120. The UV filter 2120 treats product water before it is dispensed to the user through the product water dispenser 2118. Some embodiments may not include a UV filter 2120. Some embodiments may include multiple UV filters 2120 disposed at various locations within a water purification system 2100.

In some embodiments including at least two product water reservoirs 144, the lines from each product water reservoir 144 to the product water dispensers 2118 may be independent and isolated from one another. Each product water reservoir 144 may also have its own dedicated product water dispenser 2118. This may be desirable/beneficial for many reasons, including, but not limited to, the ability to prevent dispensing water from a product water reservoir 144 while being serviced, cleaned or otherwise off-line. For example, the dedicated product water dispenser 2118 may be removed thus precluding a consumer from dispensing water from the product water reservoir 144.

Other embodiments of a water purification system 2100 may differ. In some embodiments, the water purification system 2100 includes a number of reservoirs, plumbing lines, drains, valves, filters, pumps, etc. In various embodiments, the water purification system 2100 includes one source water reservoir 124. The source water reservoir 124 may be filled water from a water source 2102 (see, for example, FIG. 40A) via plumbing line 2130. A source water pump 130 (see for example, FIG. 40A) may also be included to drive water through the plumbing line 2130 to the source water reservoir 124. The plumbing line 2130 may also include at least one filter 2132. In some embodiments including filter 2132, the filters 2132 may be removable or otherwise disassembled to allow them to be cleaned and reused. The filters 2132 may help to remove sand, grit, organic materials, and other particles from the water. In some embodiments, the filter may include a charcoal filter. In some embodiments, the filter may be any sized filter and may be made of any material. In various embodiments, the plumbing line 2130 may also include a valve 2134. The valve 2134 may be automatically actuated or may be manually actuated. As shown, the valve 2134 is a solenoid type valve 2134. The valve 2134 may be switched on or off depending on the water level in the source water reservoir 124.

The source water reservoir 124 may include at least one source water liquid level sensor 2104. Two source water liquid level sensors 2104 may be included in various embodiments. The depicted source water liquid level sensors 2104 are float switches in FIG. 40B, but other embodiments may employ other varieties of source water liquid level sensors 2104. The source water liquid level sensor 2104 may be used to automatically actuate the valve 2134 to open or close. The source water liquid level sensor 2104 may likewise be used to automatically determine when and when not to run a source water pump 130 (see FIG. 40A).

In some embodiments, water may travel from the source water reservoir 124 to a water distillation device 122 through plumbing line 2136. A metering pump 2138 may be included on the plumbing line 2136 to ensure that a proper flow of source water is fed to the water distillation device 122. The water distillation device 122 may, through distillation, purify the source water into a drinkable product. In other embodiments, the water purification system 2100 may not use a water distillation device 122, but rather a water purification device that uses some other process to purify water into a potable product.

In various embodiments, the water distillation device 122 may be coupled to a return or blowdown line 2140 and a divert water line 2142. The return or blowdown line 2140 and the divert water line 2142 may allow rejected water or concentrate to be removed from a water distillation device 122. Both of these lines 2140, 2142 in some embodiments are combined into a single plumbing line 2144. The path to the plumbing line 2144 taken by the blowdown line 2140 and the divert water line 2142 may be arranged such that pressure may be required to allow water to backfeed into the water distillation device 122. This may be desirable/beneficial for many reasons, including, but not limited to, preventing such an occurrence. The plumbing line 2144 connects to a drain line 2146 which may be plumbed into communication with a destination for the blowdown and diverted water. The drain line 2146 may include various traps, venting, and other features commonly used in plumbing lines. In embodiments which do not include a water distillation device 122, but rather a different water purification device, the blowdown line 2140 and the divert water line 2142 may not be included.

Still referring also to FIGS. 40A-40C, water which has been through the water distillation device 122 may be passed through at least one sensor to determine if it is of acceptable quality. In some embodiments, two conductivity sensors may be included. In various embodiments, more than two conductivity sensors may be included. In other embodiments, the sensor or sensors may measure other parameters of the water to determine its quality. The first conductivity sensor (not shown) may be a part of the water distillation device 122. In some embodiments, both the first and second conductivity sensors may be part of the water distillation device 122. The first conductivity sensor may divert water to the divert water line 2142 if it is determined that the water produced by the water distillation device 122 is of unacceptable quality. In some embodiments, any water which is measured to have a conductance greater than a threshold, for example, 20 microsiemens per centimeter (which, in various other embodiments, may vary) may be sent to the divert water line 2142. Water which passes the first conductivity sensor test may pass into plumbing line 2150 and be fed to a second conductivity sensor 2152. The second conductivity sensor 2152 may act as a back-up for the first conductivity sensor and prevent water produced by the water distillation device 122 from fouling the product water reservoirs 144 if the water is deemed to be of unacceptable quality.

Water that is determined to be acceptable by the second conductivity sensor 2152 may then travel to the two product water reservoirs 144 through plumbing lines 2154, 2156, and 2158. As shown, a valve 2134 is included on each of the plumbing lines 2156 and 2158. In some embodiments, these valves 2134 may be manual ball valves 2134. In other embodiments, the valves 2134 on plumbing lines 2156 and 2158 may be any other suitable type of valve 2134. These valves 2134 may be included such that the flow of clean, portable product water may be shut off to one of the product water reservoirs 144 so that that product water reservoir 144 may be cleaned or otherwise serviced.

Figure 40E:
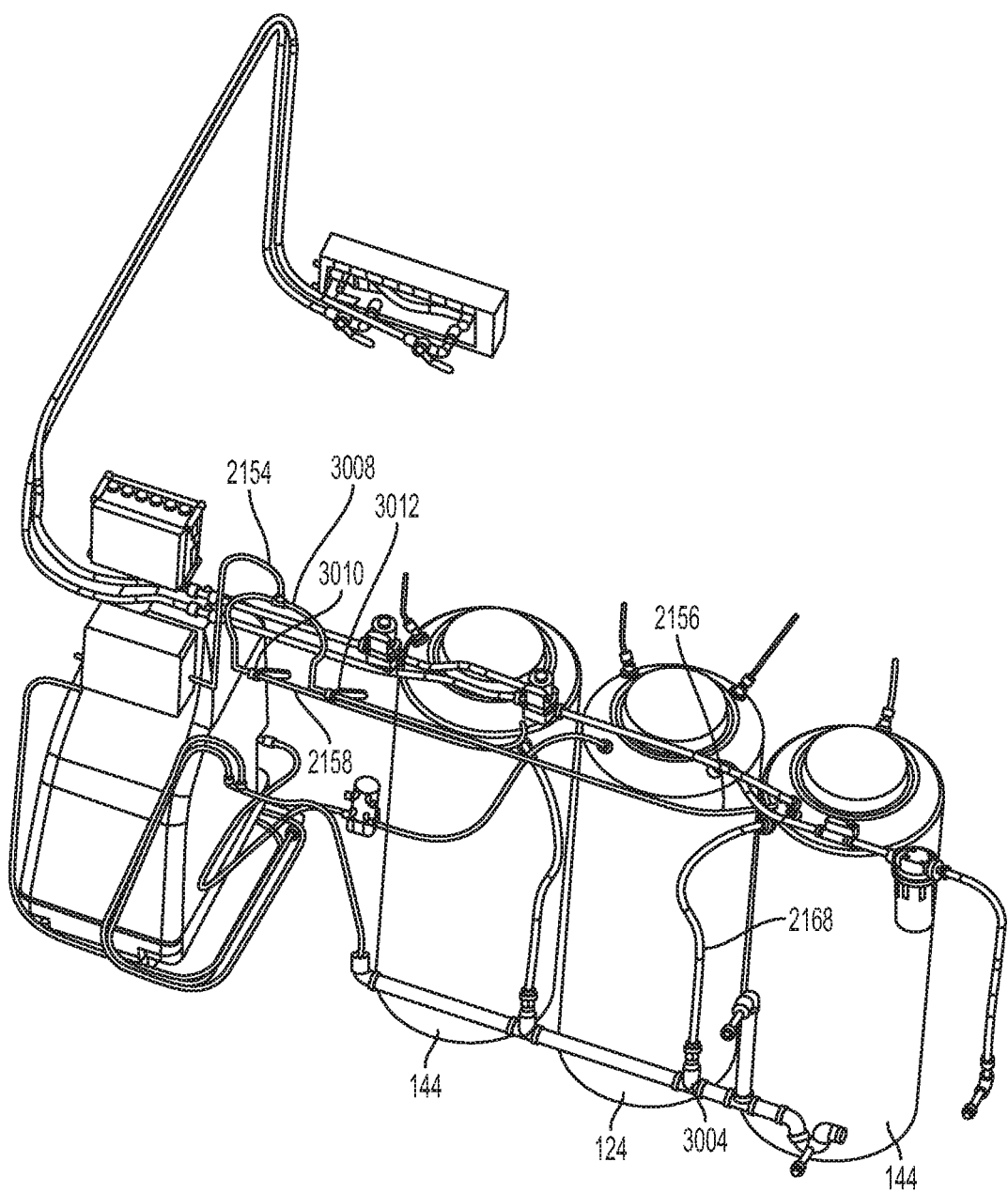
FIG. 40E is an embodiment of a water purification system.

Referring now also to FIG. 40E, in various embodiments, a gravity driven system may be used to evenly distribute water to the product water reservoirs 144. In some embodiments, the system may include a single plumbing line 2154 that feeds into a "T" fitting 3008 with two plumbing lines 2156, 2158 that are connected to the product water reservoirs 144. To avoid the flow of water being stopped by hydraulic lock, in various embodiments, the system may be arranged so the water continuously flows down hill. The single plumbing line 2154 is the highest part of the system. The "T" fitting 3008 is below this single plumbing line 2154. The two plumbing lines 2156, 2158 from the "T" fitting 3008 to the product water reservoirs 144 both drop continuously in elevation to the product water reservoirs 144. The two plumbing lines 2156, 2158 after the "T" fitting 3008 have valves 3010, 3012 that allow water to be diverted to one or the other product water reservoirs 144. These valves 3010, 3012 may be, in some embodiments, manual but in other embodiments may be controlled by an automated system.

The embodiment of the water purification system 2100 shown includes two product water reservoirs 144. Other embodiments may include additional product water reservoirs 144 or may include only a single product water reservoir 144. Some embodiments may also include a different number of source water reservoirs 124. Each of the product water reservoirs 144 includes a product water liquid level sensor 2114 in some embodiments. In other embodiments, each product water reservoir 144 may include more than one product water liquid level sensor 2114. In some embodiments, the product water liquid level sensors 2114 may be float switches. Other embodiments may include other varieties of product water liquid level sensors 2114.

Potable water stored in the product water reservoirs 144 may be dispensed to consumers/users. This water may travel out of the product water reservoirs 144 through lines 2160 and 2162. A product water distribution pump 2116 may be included on each of lines 2160 and 2162 to pump the water out to product water dispensers 2118. As shown, the product water dispensers 2118 may be controlled turned on and off or disabled by valves 2164 and 2166. In the example embodiment, the valves 2164 and 2166 are manually operated ball valves. In other embodiments, the valves 2164 and 2166 may be any other suitable variety.

In some embodiments, the product water reservoirs 144, their respective lines 2160 and 2162, and their respective valves 2164 and 2166 may be color coded. This may be desirable/beneficial for many reasons, including, but not limited to, that it may be helpful to visually ensure that a product water reservoir 144 being cleaned or serviced may not be used to supply water to a consumer/user. For example, when a red product water reservoir 144 is being cleaned, any red valves 2134, 2164, 2166 should be in the closed position.

Still referring also to FIGS. 40A-40C, the water purification system 2100 shown may also include an electrical box 2117. The electrical box 2117 may be in communication with the source water liquid level sensors 2104 and the product water liquid level sensors 2114. The electrical box 2117 may use liquid level measurements provided by the liquid level sensors 2104 and 2114 to determine when to run and when not to run the source water pump 130 and water distribution pumps 2116. In embodiments where the liquid level sensors 2104 and 2114 are float switches, the float switches may trip a relay in the electrical box 2117 causing a related pump to turn on or off.

Additionally, and still referring also to FIGS. 40A-40C, in some embodiments, the electrical box 2117 may also be in communication with one or more valves 2134, 2164, and/or 2166. The electrical box 2117 may actuate the valves 2134, 2164, and/or 2166 to an open or closed state depending on levels sensed by the liquid level sensors 2104 and 2114, for example. In some embodiments, the electrical box 2117 may actuate various valves 2134, 2164, and/or 2166 and/or turn various pumps on or off in response to readings from the first conductivity sensor (not shown) or the second conductivity sensor 2152.

In various embodiments, each product water reservoir 144 includes an overflow release 2168. In some embodiments, the overflow releases 2168 are plumbing lines which are linked into the drain line 2146. Any overflow from a product water reservoir 144 may pass through these plumbing lines and into the drain line 2146. In some embodiments where the overflow releases 2168 are so arranged, a check valve 3004 may be included to ensure nothing in the drain line 2146 may travel back through the overflow releases 2168 and into the product water reservoirs 144. The check valve 3004 also prevents noxious fumes from sewer lines, or other elements from entering the product water reservoirs 144 and generally prevents anything from flowing backwards into the product water reservoirs 144. In other embodiments, the overflow releases 2168 may differ. In some embodiments, where the water purification system 2100 is not located indoors, the overflow releases 2168 may simply be a line which drains out to the ground around the water purification system 2100. Any other suitable overflow release 2168 may also be used.

The water purification system 2100 may also include any number of sampling ports 2170. Sampling ports 2170 may be included so that water samples may be manually taken from various lines in a water purification system 2100. These samples may then be tested for various parameters or for overall water quality. The various water tests may include, but are not limited to, one or more of the following: pH; conductance; and/or turbidity. In some embodiments, a sampling port 2170 may be included as part of a water purification device or water distillation device 122.

In some embodiments, a sampling port 2170 may be included on plumbing line 2130 to allow sampling of the source water. Such sampling may be useful for a number of reasons, including, but not limited to one or more of the following: determining safety of a water source 2102, determining when a water purification device needs maintenance (for example, descaling), and/or determining use lifetime for filters.

Still referring to FIGS. 40A-40C, in some embodiments, a sampling port 2170 for the blowdown and divert water is also included on drain line 2146. Sampling the blowdown and divert water may be useful for a number of reasons. Such sampling may, for example, be useful in determining what the drained water may be useful for or how the water should be handled. Additionally, such sampling may be needed to ensure compliance with local law.

Sampling ports 2170 may also be included to sample product water on its way to a product water dispenser 2118. Among other uses, these sampling ports 2170 may be useful to double check the functionality of a sensor or sensors measuring water quality in the water purification system 2100. The sampling ports 2170 for the product water may also be useful, for example, if it is suspected that water in one of the product water reservoirs has become contaminated. The sampling ports 2170 may also be desirable because they can be used to measure various qualities of the water which is being delivered to the consumer.

In some embodiments, the water purification system 2100 may be used within one or more embodiments of the kiosk for resource distribution 10. Referring now specifically to FIG. 40C which is a cross sectional view taken at line 37-37 of FIG. 30, in some embodiments, the water purification system 2100 may also be disposed within other embodiments of kiosks for resource distribution 10. Additionally, in some embodiments, a water purification system 2100, such as that depicted in FIGS. 40A-40C, may be a stand-alone system.

Referring still to FIGS. 40A-40C, the various plumbing lines, pumps, and/or filters may be mounted to the interior walls of a kiosk for resource distribution 10. In some embodiments, the various plumbing lines, pumps, and/or filters, may be exposed to simplify maintenance which may be desired. The various plumbing lines, pumps, and/or filters may also be disposed in locations where they are out of the way and would be unlikely to interfere with an entrepreneur/user in a kiosk for resource distribution 10. The source water reservoir 124 may be disposed between the two product water reservoirs 144 in various embodiments of the water purification system 2100. This configuration may be desirable/beneficial for many reasons, including, but not limited to, making the source water reservoir 124 more difficult to access. Referring now also to FIG. 38, this is especially true when a wall such as the interior wall 2028 is included in a kiosk for resource distribution 10. Making the source water reservoir 124 more difficult to access may be desirable/beneficial for many reasons, including, but not limited to, necessitating that a user must make an effort to draw water from the source water reservoir 124. This makes it more difficult to unintentionally drink water from the source water reservoir 124.

Figure 41:
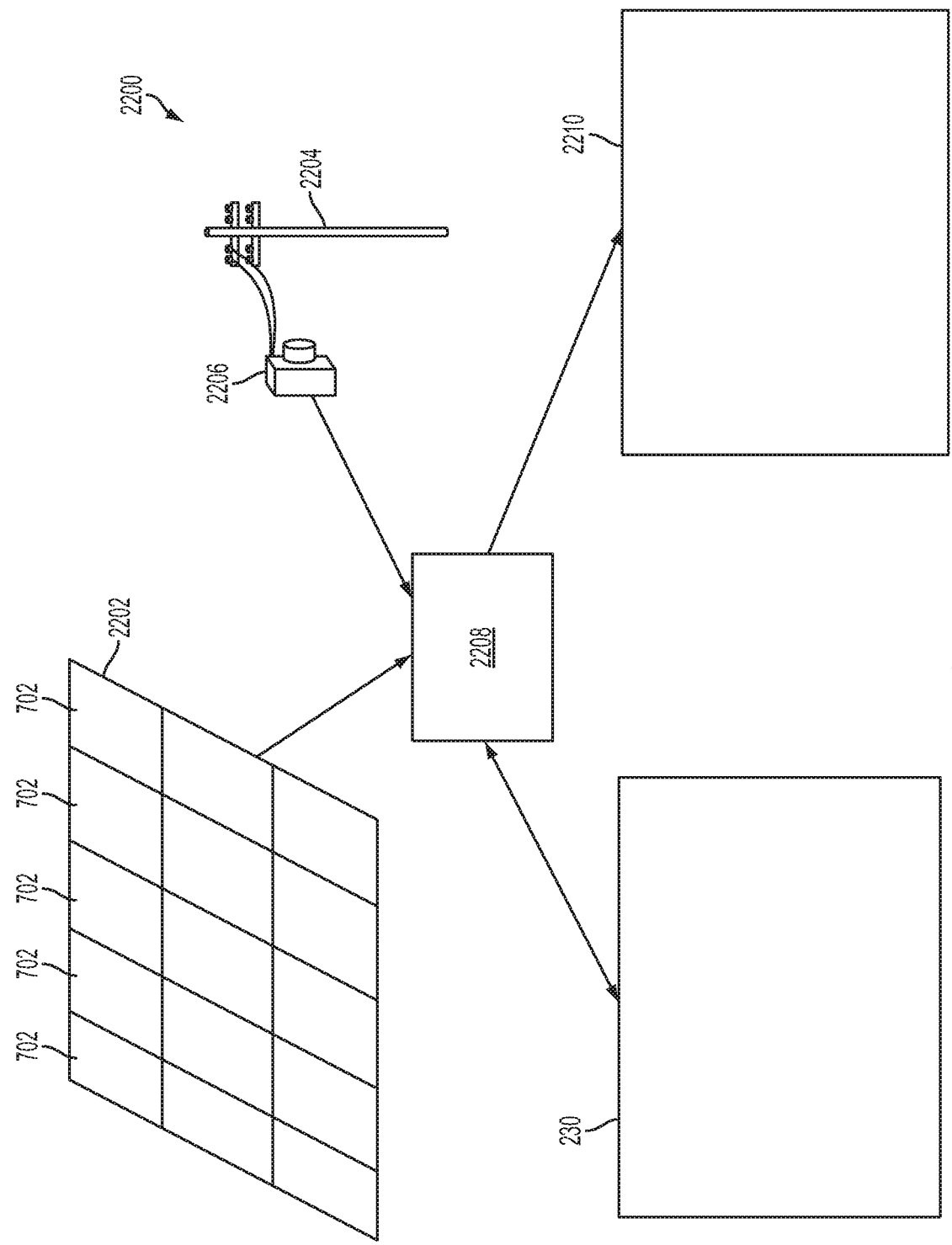
FIG. 41 is a block diagram of one embodiment of a power system.

Referring now also to FIG. 41, a block diagram of a power system 2200 for a kiosk for resource distribution 10 is depicted. As shown, the power system 2200 includes a local energy resource 2201, power grid 2204 connection, power control and distribution hardware 2208, a battery bank 230, an auxiliary generator 2209, and at least one powered device 2210. The local energy resource 2201 may include any of a variety of suitable components, including, but not limited to, a solar panel array 2202, one or more wind turbines 2203, and/or a hydropower source 2205. The local energy resource 2201 is described as a solar panel array 2202 for non-limiting, exemplary purposes. Other embodiments of power systems 2200 may differ. For example, in a location with no access to an electrical grid which power may be drawn, the power grid 2204 connection may not be included. In some embodiments, the power grid 2204 connection may be for a mini-grid which distributes power from a kiosk for resource distribution 10. In some embodiments, a kiosk for resource distribution 10 may include two power grid connections 2204, one for a mini-grid, the other for a municipal power grid. In some embodiments, the power system 2200 may not include one of the components shown in FIG. 41. For example, the power system 2200 may make use of a local energy resource 2201, but not include an auxiliary generator 2209. In various embodiments, the power system 2200 may include one or more of any of the components described herein.

The solar panel array 2202 may include at least one solar panels 702. In some embodiments, there may only be a single solar panel 702 and in some other embodiments, there4 may be multiple solar panels 702 and in some embodiments, the solar panel array 2202 may not be included. The solar panel array 2202 in some embodiments may generate approximately 34-37 kWh of power generation daily. In embodiments not including a solar panel array 2202, another variety of energy generator may be included. In various embodiments, the solar panel array 2202 may generate more or less than approximately 34-37 kWh of power generation daily.

In some embodiments, the solar panel array 2202 may be assembled with tamper resistance fasteners to reduce theft risk. In some embodiments, a solar panel array 2202 may be attached to the roof of a kiosk for resource distribution 10. In some embodiments, a solar panel array 2202 may be mounted on an awning 19 (see, for example, FIG. 7). In other embodiments, a solar panel array 2202 may be ground mounted near the kiosk for resource distribution 10.

As shown, the power system 2200 may be capable of receiving power off of a power grid 2204. In such embodiments, power may be drawn from the power grid 2204 during times when the solar panel array 2202 is not producing sufficient power (e.g. at night). In some embodiments, a utility meter 2206 may also be included in the power system 2200 to meter the amount of energy from the power grid 2204 that has been used. In locations where the power grid 2204 is so configured, energy may also be fed onto the power grid 2204 from the power system 2200 when excess power, or more power than is required by the kiosk 10, is being produced. In some embodiments, the kiosk for resource distribution 10 may not draw power from the power grid 2204, but may act as a power plant and feed power to a mini-power grid.

Still referring also to FIG. 41, the power system 2200 may also include power control and distribution hardware 2208. In various embodiments, the power control and distribution hardware 2208 may include at least one inverter, at least one battery charge controller, breaker panel, power control and/or switching hardware. However, in various other embodiments, the power control and distribution hardware 2208 may include one or more of the above listed and/or may include additional hardware. The power control and distribution hardware 2208 may be a modular power conversion system such as one of those described later in the specification.

The power control and distribution hardware 2208 in some embodiments may use as a default solar power to supply the power needs of the kiosk for resource distribution 10. However, if sufficient solar power is unavailable, the power control and distribution hardware 2208 may use the available solar power in combination with power from a power grid 2204 or power from an auxiliary generator 2209. In some embodiments, the power control and distribution hardware 2208 may draw power from an auxiliary power generator 2209 when other power sources are unavailable (e.g. nighttime, during grid outages, etc.). The power control and distribution hardware 2208 may be configured to supply excess power onto the power grid 2204. In other embodiments, the power control and switching hardware may be configured not to do so.

Referring still also to FIG. 41, in various embodiments, the power control and distribution hardware 2208 in the power system 2200 may also charge and draw power from a battery bank 230. The battery bank 230 may be charged either by solar energy when it is available and/or by energy from the power grid 2204 and/or energy auxiliary generator 2209 when the available solar power is not sufficient. The battery bank 230 may act as back-up energy storage. Power may be drawn from the battery bank 230 when solar power and power from the power grid 2204 or auxiliary generator 2209 is unavailable or not sufficient. In some embodiments, the battery bank 230 and power control and distribution hardware 2208 may be physically segregated from other components of a kiosk for resource distribution 10.

In some embodiments, the batteries which make up the battery bank 230 may be lead acid AGM seal cell batteries. Such batteries may be desirable because they require little maintenance. To prolong the life of the batteries, some embodiments of the power system 2200 may be designed such that the battery capacity is large enough that the battery bank 230 is not drained below, for example, 50% of its capacity over the course of a day. In some specific example embodiments, the battery bank 230 may provide 26 kWh of usable energy when discharged from 100% capacity to 50% capacity. The battery bank 230 capacity, in some embodiments, may be tailored to suit the needs of a particular location. For example, in a location where the kiosk for resource distribution 10 is to operate without a connection to a power grid 2204, the battery bank 230 capacity may be relatively large. In a location where the kiosk for resource distribution 10 is connected to a power grid 2204, the battery bank 230 capacity may be smaller since it may only be needed when the power grid 2204 goes down. In some embodiments, the battery bank 230 may include a battery rack for the batteries which make up the battery bank 230.

Still referring to FIG. 41, the power system 2200 also includes at least one powered device 2210 which is to be powered by the power system 2200. The at least one powered device 2210 may be, for example, any such device described herein. In a specific embodiment, the power system 2200 may power a water distillation device 122 (see FIG. 40A), at least one pump, lighting 2032 (see, for example, FIG. 35), a television 300 (see, for example, FIG. 28), a refrigerator 160 (see, for example, FIG. 38), and a charging station 800 (see, for example, FIG. 10). Other embodiments may have any other number or combination of powered devices 2210.

Figure 42A:
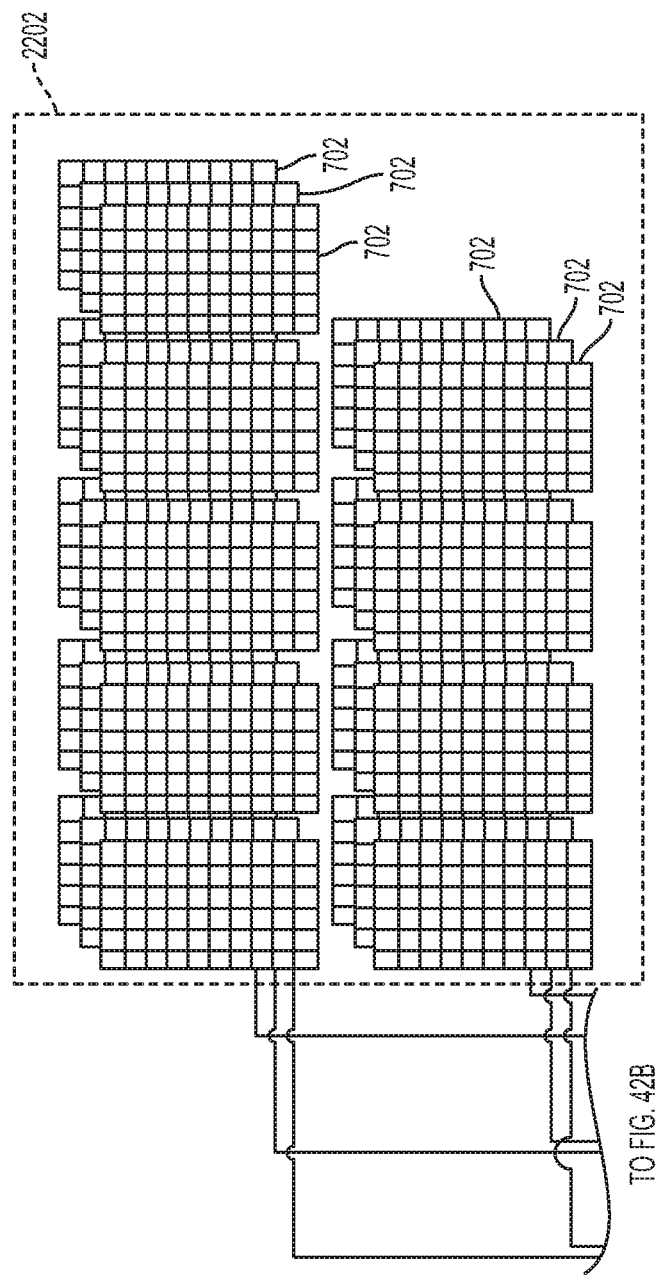
FIGS. 42A-42C is an embodiment of an electrical system for a kiosk for resource distribution.
Figure 42B:
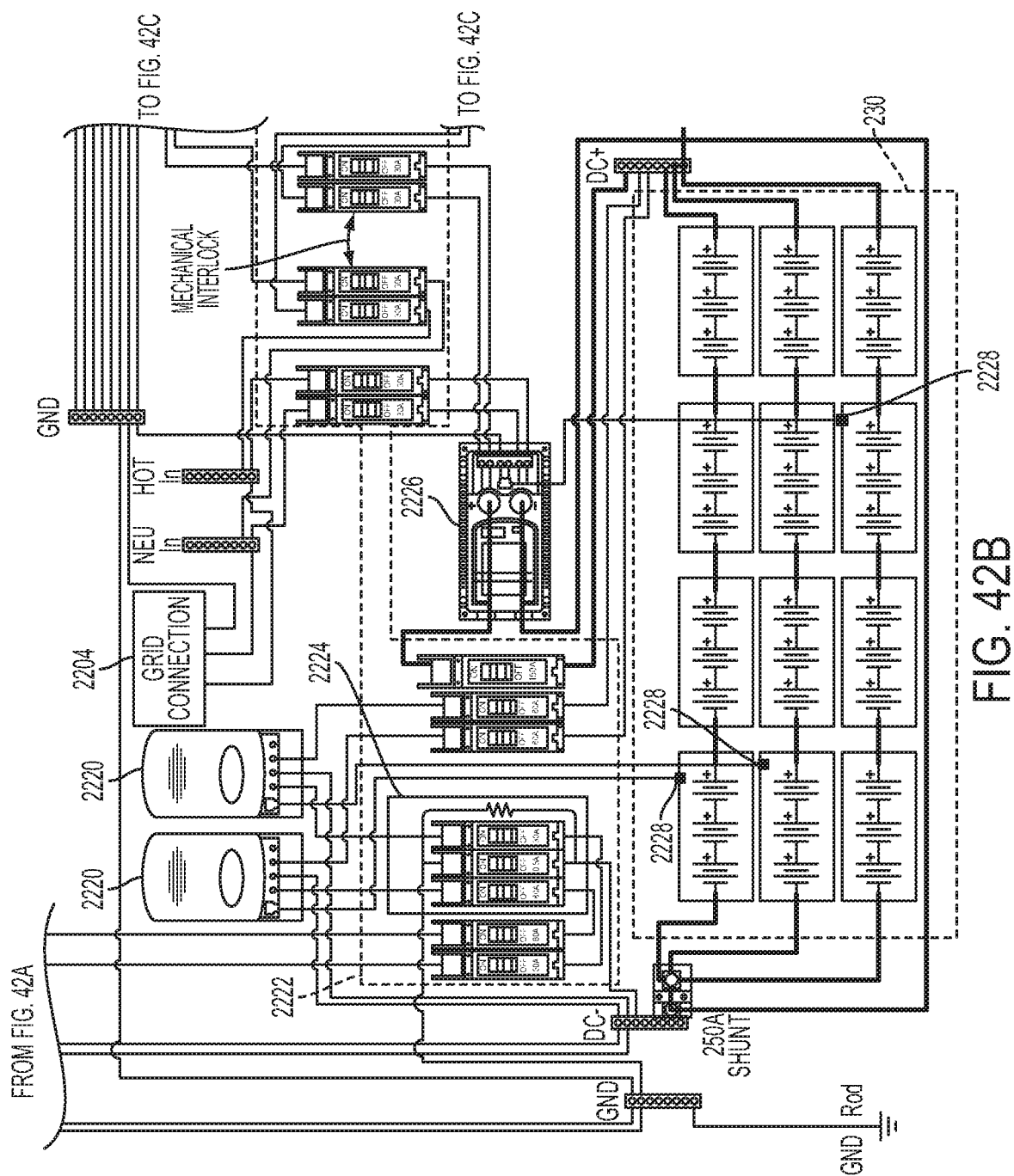
Figure 42C:
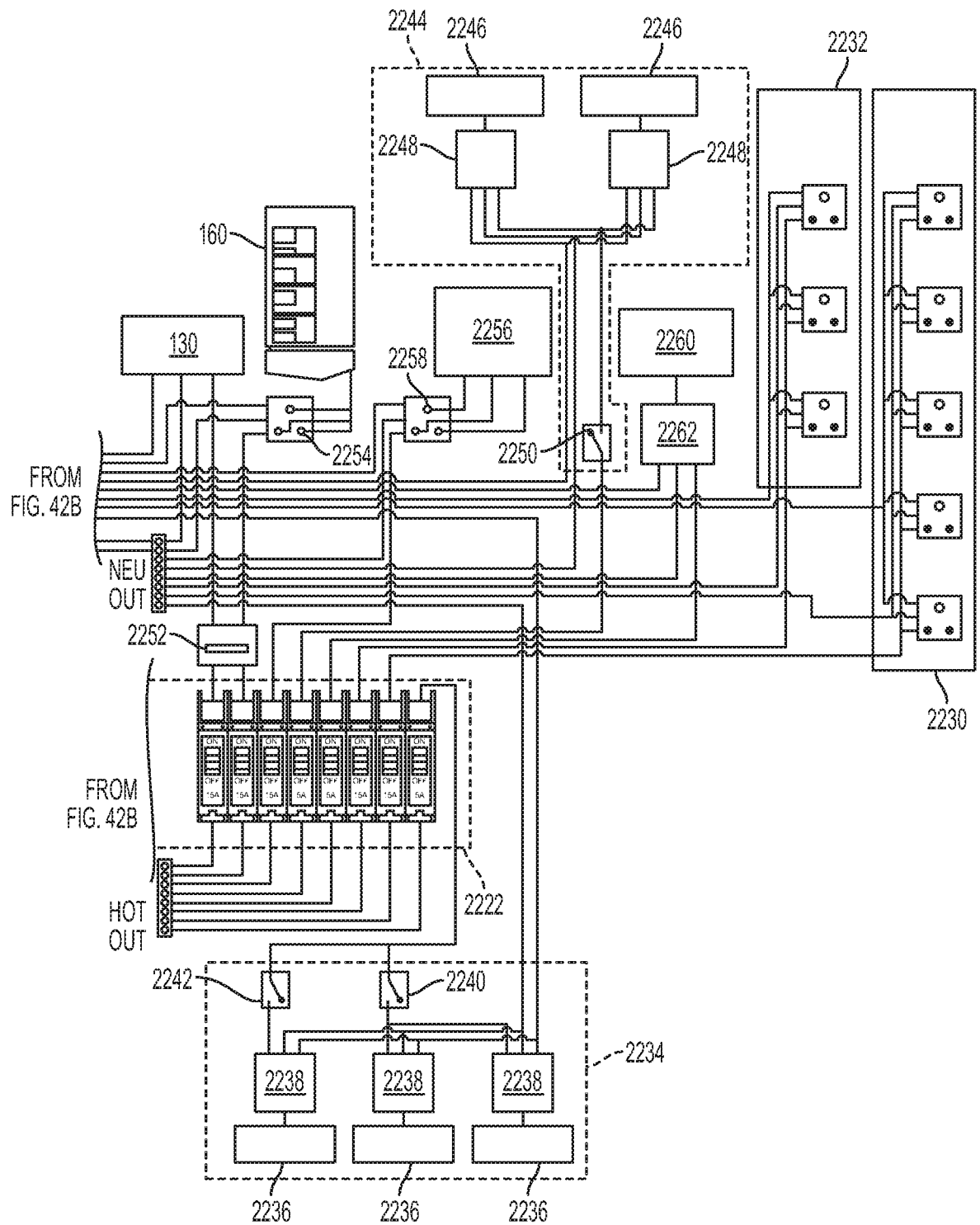

Referring now also to FIGS. 42A-42C depict a detailed diagram of an embodiment of an example electrical and power system of a kiosk for resource distribution 10. FIGS. 42A-42C depict one of many possible specific examples of the power system 2200 shown in FIG. 41. As shown in FIG. 42A, the example electrical and power system includes a solar panel array 2202. The solar panel array 2202 in FIG. 42A includes 27 individual solar panels 702. In some specific embodiments of the electrical and power system shown in FIGS. 42A-C, the solar panel array 2202 may be comprised of CHSM 6610P series solar panels available from Astronergy Solar Inc. of 795 Folsom Street, suite 1125, San Francisco, Calif.

Referring now also to FIG. 42B, power generated by the solar panel array 2202 travels to at least one charge controller 2220. The example embodiment includes two charge controllers 2220. The incoming power from the solar panel array 2202 may be routed through a breaker panel 2222 before reaching the at least one charge controller 2220. The breaker panel 2222 may include a ground-fault detection and interruption system 2224 in some embodiments.

Still referring also to FIG. 42B, the at least one charge controller 2220 may perform a number of functions. The at least one charge controller 2220 may block reverse current flow to the solar panel array 2202, which may occur, for example, at night. The at least one charge controller 2220 may perform a voltage regulating function, determining when to charge a battery bank 230 and prevent overcharging of a battery bank 230. In some embodiments, the at least one charge controller 2220 may also be capable of automatic temperature compensation to change its battery charging set-points. This may, in some embodiments, be accomplished with at least one remote temperature sensor 2228 in a battery bank 230. The at least one charge controller 2220 may also have display and metering capabilities. The at least one charge controller 2220 may also be capable of logging data about power generation in a file which can be retrieved manually or over an internet connection. In some embodiments, the at least one charge controller 2220 may be of the maximum power point tracker type. In specific embodiments, the at least one charge controller 2220 may be a FLEXmax 60 MPPT Charge Controller available from OutBack Power Systems Inc. of 17825 59th Ave. NE, Suite B, Arlington, Wash.

In some embodiments, a kiosk for resource distribution 10 may includes at least one additional charge controller 2220. This additionally charge controller 2220 may be used to intelligently charge batteries brought to a kiosk for resource distribution 10 by locals or consumers. Additionally, the additional charge controller may be used to intelligently charge rentable batteries which may provide revenue to a kiosk for resource distribution 10.

Still referring also to FIG. 42B, and as mentioned above, the example electrical and power system may include a battery bank 230. In the example embodiment shown in FIG. 42B, the battery bank 230 includes three parallel strings of four batteries in series. In some specific embodiments, the batteries making up the battery bank 230 may be model DC400-6 AGM deep cycle batteries produced by Fullriver. The battery bank 230 may be charged by solar energy or by energy drawn off of a power grid 2204. In other embodiments where a power grid 2202 connection is not included, the battery bank 230 may include a larger number of batteries. This may be done to ensure that the battery bank 230 is not drawn down, on a daily basis, to a percentage of its energy storage capacity that would quickly damage the batteries and cause failures. As shown, all power running to and from the example battery bank 230 may be routed through a breaker panel 2222.

Referring still also to FIG. 42B, the example electrical and power system includes an inverter/charger 2226. The inverter/charger 2226 may allow DC power from the battery bank 230 to be made into AC which can then be used to power at least one load in a kiosk for resource distribution 10. The example electrical and power system shown in FIGS. 42A-42C is also arranged such that at least one load in a kiosk for resource distribution 10 may be run off of a power grid 2204 when it is suitable or desirable to do so. As shown, breakers in the breaker panel 2222 for power coming from the inverter/charger 2226 and the power grid 2204 are mechanically interlocked such that the two sources cannot be connected at the same time.

In some embodiments, the inverter/charger 2226 may be a sine wave inverter. The inverter/charger 2226 may also have a high surge capacity in order to meet the start-up power needs of various pumps and motors which may be included in a kiosk for resource distribution 10. In some embodiments, the inverter/charger 2226 may have overload protection capabilities. Additionally, the inverter/charger 2226 may automatically shut off if the supply voltage from the battery bank 230 falls below a certain level. This may help to protect the battery bank 230 from damage caused by over-discharging. The inverter/charger 2226 may be capable of charging the battery bank 230 with power drawn from a power grid 2204 or power produced by an auxiliary generator (not shown). All power running to and from the inverter/charger 2226 may be routed through a breaker panel 2222. In some specific embodiments, the inverter/charger 2226 may be a VFX3048E sinewave inverter/charger available from OutBack Power Systems Inc. of 17825 59th Ave. NE, Suite B, Arlington, Wash.

Referring now also to FIG. 42C, another portion of the example electrical and power system is depicted. As shown, the example electrical and power system includes a first set of outlets 2230 and a second set of outlets 2232. The outlets depicted are standard South African electrical outlets. In other embodiments, the outlets may be those appropriate for the region in which a specific kiosk for resource distribution 10 is to be utilized. The first set of outlets 2230 and the second set of outlets 2232 may be used to power or charge at least one of a phone, computer and/or laptop, stereo, television, etc. In some embodiments, one of the first set of outlets 2230 and second set of outlets 2232 may be accessible only from the interior of a kiosk for resource distribution 10 while the other is accessible from the exterior of a kiosk for resource distribution 10. As shown, power is routed through a breaker panel 2222 to the first set of outlets 2230 and the second set of outlets 2232.

Still referring also to FIG. 42C, the example electrical and power system may include an interior lighting component 2234. The interior lighting component 2234 may include lights 2236. In the example embodiment in FIG. 42C three lights 2236 are included. The lights 2236 may in some example embodiments be the lighting 2032 in FIG. 35, for example. In some specific embodiments, two of the lights 2236 may produce approximately 3200 lumens a piece while the other light 2236 may produce approximately 1200 lumens. The example interior lighting component 2234 also includes transformers 2238 to drive the lights 2236. In FIG. 42C, the interior lighting component 2234 includes a first switch 2240 and a second switch 2242. In the example embodiment, the first switch 2240 controls two lights 2236. The second switch 2242 controls only a single light 2236. Some embodiments may include additional lights 2236 and respective transformers 2238 and/or additional switches. In some embodiments where the interior of a kiosk for resource distribution 10 is partitioned, dedicated switches for lights 2236 in each partitioned area may be included to turn lights on/off in each partitioned area. In the example embodiment, all power traveling to the interior lighting component 2234 is routed through a breaker panel 2222.

Referring still also to FIG. 42C, the example electrical and power system may include an exterior lighting component 2244. The exterior lighting component 2244 may include exterior lights 2246. In the example embodiment, the exterior lighting component 2244 includes two exterior lights 2246. In some specific embodiments, the exterior lights 2246 may produce approximately 1200 lumens or more each. The example exterior lighting component 2244 also includes exterior lighting transformers 2248 to drive the exterior lights 2246. An exterior lighting switch 2250 is also included in the exterior lighting component 2244 to toggle the exterior lights 2246 on and off. In the example embodiment, all power traveling to the exterior lighting component 2244 is routed through a breaker panel 2222.

Still referring also FIG. 42C, the example electrical and power system also includes a source water pump 130. The source water pump 130 in the example embodiment may be any suitable source water pump 130. The source water pump 130 may be included as part of a larger system such as a water module 1100 (see, for example, FIG. 14) or the water purification system 2100 described in relation to FIGS. 40A-40C. The example electrical and power system includes a contactor 2252. The contactor 2252 helps to reduce peak demand on the inverter/charger 2226 when the source water pump 130 is running by cutting power to a refrigerator 160 which is also powered by the example electrical and power system. Power running to both the source water pump 130 and the refrigerator 160 is routed through a breaker panel 2222. In the example embodiment, the refrigerator 160 is plugged into a dedicated refrigerator outlet 2254. Other high load devices can also be selectively shut off to manage peak demands as well.

Still referring also to FIG. 42C, the example electrical and power system may include a water purification device 2256 or in some specific embodiments a water distillation device 122 (see, for example, FIG. 40A). The water purification device 2256 may be included as part of a larger system such as a water module 1100 (see, for example, FIG. 14) or, for example, the water purification system 2100 described in relation to FIGS. 40A-40C. As shown in the example embodiment, a dedicated water outlet 2258 for the water purification device 2256 may be included in an example electrical and power system. Power running to the water purification device 2256 is routed through a breaker panel 2222 in the example embodiment.

Referring still also to FIG. 42C, the example electrical and power system also includes a dispensing pump 2260. In some embodiments, the dispensing pump 2260 may be used to dispense water purified by the water purification device 2256. In some embodiments, the dispensing pump 2260 may be the product water distribution pump 2116 of the water purification system 2100 described in relation to FIG. 40A. As shown, a dispensing pump transformer 2262 is included in the example electrical and power system to drive the dispensing pump 2260. Power running to the dispensing pump 2260 is routed through a breaker panel 2222.

In some embodiments, the electrical and power system or components of the electrical and power system shown in FIGS. 42A-42C may differ. In some embodiments, the amperage values on the breakers in the breaker panel 2222 may differ. In some embodiments, the electrical and power system may include other loads or components not shown in FIGS. 42A-42C. In some embodiments, some of the components and loads shown in FIGS. 42A-42C may not be included in the electrical and power system. The dispensing pump 2260 may not be included, for example, in some embodiments where water is arranged to be dispensed via gravity feed. In some embodiments, an auxiliary generator may be included in the electrical and power system. Some embodiments may not be tied to a power grid 2204 or may not gather solar energy. In some embodiments, the solar panel array 2202 may be replaced by or supplemented by another energy generator such as a Stirling engine generator, wind turbine, and/or water wheel, or other energy generating device.

In some embodiments, the power electronics may differ. In some embodiments, the electrical and power system may include various elements and components of a power conversion system such as that disclosed in U.S. patent application Ser. No. 13/827,140, filed Mar. 14, 2013 and entitled Modular Power Conversion System, and U.S. patent application Ser. No. 13/447,897, filed Apr. 16, 2012 and entitled Modular Power Conversion System, now U.S. Published Application No. US-2013-0099565-A1, published Apr. 25, 2013, which are each hereby incorporated herein by reference in their entireties. Such a system may consolidate the power electronics, including hardware and software, in an interchangeable, modular, or "block" format. Such a system may additionally be arranged such that it maximizes efficiency and flexibility while minimizing the cost of electricity generation and usage.

Figure 43:
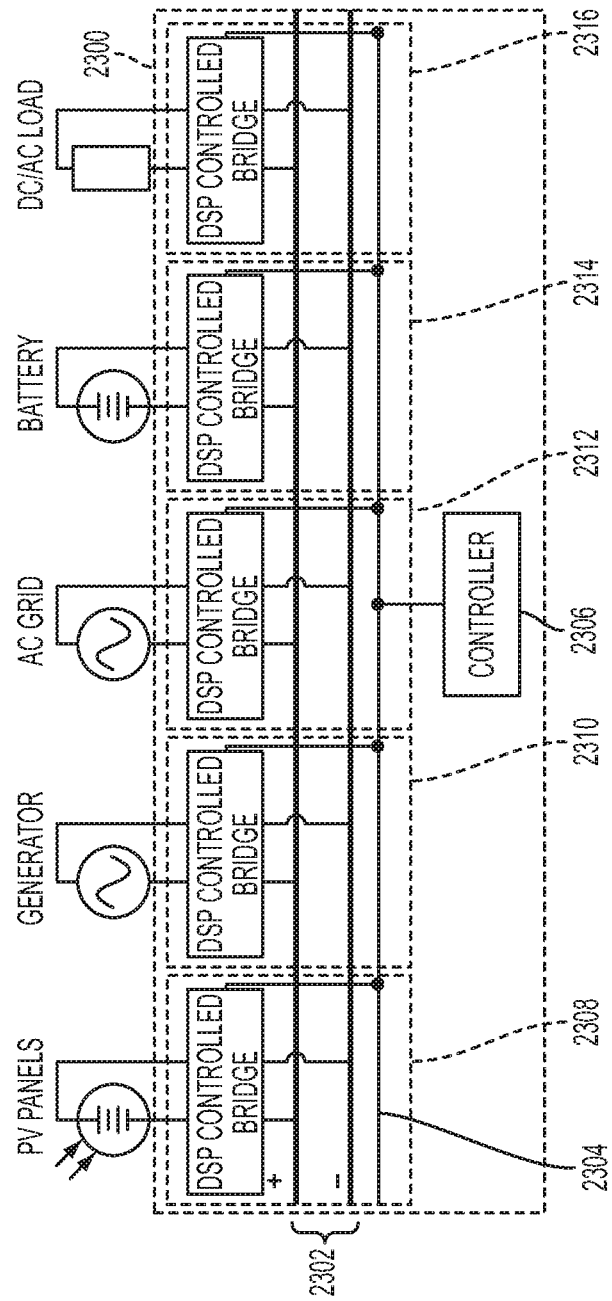
FIG. 43 is one embodiment of a modular power conversion system.

In some embodiments the modular power conversion system 2300 may be one similar to that disclosed in U.S. patent application Ser. No. 13/827,140, filed Mar. 14, 2013 and entitled Modular Power Conversion System, which is attached hereto as Appendix C and is depicted in FIG. 43. As shown, the modular power conversion system 2300 includes a number of modules which are connected to a DC bus 2302 which provides the backbone of the system 2300. In some embodiments, the modules may be boxes that plug into the high and low sides of the DC bus 2302 and a data bus 2304. The data bus 2304 may connect each module to a controller 2306. The inputs/outputs of each module (not shown) may be on the front or on the back of the modular power conversion system 2300. As shown, the modular power conversion system 2300 may include a solar array power module 2308, an auxiliary generator power module 2310, a grid power module 2312, a battery power module 2314, and an inverter module 2316.

In some embodiments, each module includes at least a DSP controlled bridge circuit, where the bridge circuit includes at least a half bridge and may comprise a number of inductive and capacitive elements, voltage and current sensing devices, transformers and relays. In this document, the term DSP may be used to describe any micro-processor with sufficient input/output and speed to read voltages, currents, control multiple sets of half-bridge circuits and do the calculations to produce good quality AC power from a DC bus. All of the computing power may, in some embodiments, be disposed in the controller 2306. Thus the operation of each module including the bridge circuits would be fully under the control of one or more DSPs in the controller 2306. In some embodiments, the DSP microprocessor may be a digital signal processor running at 150 MHz. The controller 2306 for the modular power conversion system 2300 may include a data input/output device such as a keyboard and display or a touch sensitive display or communication port to allow users to control the operation of the modular power conversion system 2300.

The modular power conversion system 2300 may also include a wireless or hard wired telecommunication ability to allow remote control the system 2300 and access to the system data by an interested party. The interested party may, for example, use the remote control capability of a modular power conversion system 2300 to turn on electric power sources such as generators, wind or PV arrays to provide power to a grid. The interested party may access the modular power conversion system 2300 to disconnect it from a grid. The interested party may also access the modular power conversion system 2300 to change any of the various set-points described later in the specification. This remote control of distributed power resources and loads may aid in minimizing brown-outs or power disruptions and/or minimizing electrical costs by using the least expensive power source or combination of sources at all times.

In general, it is desirable to draw power from the least expensive source of power first and as the demand for additional power increases, use the next least expensive power and so on until that last source of power engaged is the most expensive power. Similarly, in some embodiments, the power flows to the highest priority circuits first and when the load of the highest priority circuits is met, power is supplied to secondary and tertiary circuits. By way of example, a modular power conversion system connecting a PV circuit, the grid, a local load and a battery may be organized to take power from the PV first, the grid second and the battery last. The same system might charge the battery first and then supply power to the load and grid.

In some embodiments, prioritization may be achieved by assigning a specific and different operating point to each energy producer or consumer "node". This operating point is assigned in terms of a voltage regulation point on a common DC bus 2302 (i.e. shared by all such nodes). Each node embodies a voltage regulating control which in operation attempts to bring the common DC bus 2302 voltage equal to its assigned operating set-point. In some embodiments, the node does this by either causing current to flow into the common DC bus 2302 thereby raising its voltage, or causing current to flow out of the common DC bus 2302 thereby lowering its voltage. In some embodiments, each node causes current to flow in a direction that balances the current flow from other nodes such that the desired DC bus 2302 voltage is maintained. In some embodiments, the voltage regulators of each node are setup so that only one node at a time is not in saturation, meaning that all but one node are either fully open or fully closed to power flow and one node is actively varying the power flow to or from the DC bus 2302 to control the DC bus 2302 voltage. Alternative systems may be setup with nodes that do not attempt to control the DC bus 2302 voltage. Examples of such nodes may include a PV array operating with a maximum power point tracking and an engine-driven generator operating at a fixed or system-commanded engine speed. In some embodiments, the operating set-points of each energy producing or consumer node may be changed any time the system 2300 is on including, but not limited to, while the system 2300 is running. In some embodiments, the operating set-points may be changed using a user interface. In some embodiments, an overvoltage level may be set on the DC bus 2302 so that if the DC bus 2302 voltage reaches a set voltage, the system 2300 will shut off. In some embodiments, the overvoltage level of the DC bus 2302 may be changed any time the system 2300 is on including, but not limited to, while the system 2300 is running. In some embodiments, the overvoltage level of the DC bus 2302 may be changed using a user interface.

A PV array operating with a maximum power point tracking (MPPT) may operate in accordance with an algorithm. For example, in this case the PV subsystem may attempt to seek out the combination of voltage and current at the PV array that result in the greatest supply of power from the array. Maximum power does not correspond with either maximum voltage or maximum current and therefore it is counterproductive to require the MPPT implementation to operate at a fixed voltage target. Instead the MPPT PV node is allowed to operate over any range of voltage that it can achieve while other consumer nodes continue operate at fixed voltage points and consume the energy that is available from the PV.

An engine-driven generator operating at a fixed or system-commanded engine speed may deliver whatever net energy remains from the raw energy (fuel) that is supplied to its engine. Like the MPPT example above, other nodes will consume as much of this available energy as they able to (up to their respective limits). This type of node, as an energy producer, may always supply all of its capacity to the common bus, even when that capacity exceeds the combined demand of the consumer nodes.

In various embodiments, a given node may be of a type that may provide current flow in either direction, or only in one direction or the other. For example a grid-tied inverter may be designed to permit current flow in either direction; a photovoltaic array can only provide current flow into the common bus and may be arranged such that it may not consume current flowing out of the bus.

In various embodiments, it may be assumed that each node also embodies a current regulating or limiting control. The value assigned to each node's current control is chosen according to the physical limits or needs of that node (or the broader physical constraints of the overall system if they are more restrictive). For example, a battery charger node may be configured with current limits according to the physical requirements of the attached batteries, and possibly further restricted by the current carrying capacity of associated components and wiring that make up the charging system. In some embodiments, the value assigned to each node's current control may be changed any time the system is on including, but not limited to, while the system is running. In some embodiments, each node's current control may be changed using a user interface.

In various embodiments, the current limits of each node, when and if they are reached, will override the node's voltage regulating control and at this point the node will cease its ability to regulate the bus voltage and enter a mode of constant current regulation. Each node will act up to the limits of its ability, expressed in terms of current flow in one direction or the other, to maintain the common bus at its assigned voltage level. Once this limit is reached, that node continues to operate at its maximum capacity but inherently yields its control of the bus voltage to other nodes which have greater capacity.

Figure 44:
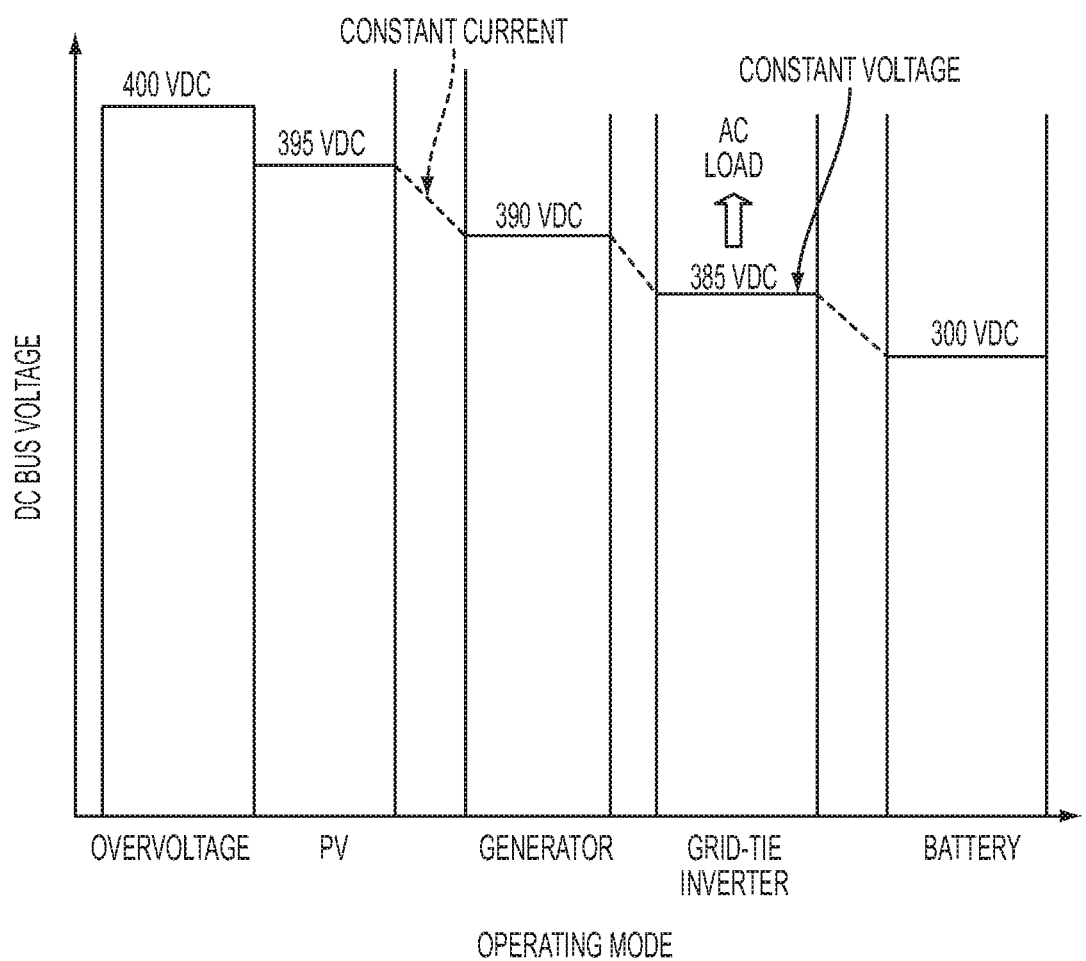
FIG. 44 is a diagram of a power source prioritization scheme in accordance with one embodiment of the present disclosure.

In some embodiments, the elements of the modular power conversion system 2300 in FIG. 43 may be prioritized to favor power from one source over another. This prioritized load and power source scheme is shown conceptually in reference also to FIG. 44, where the operating mode of the modular power conversion system 2300 is plotted against the DC bus 2302 voltage. In this example the voltages set-points on the power source modules are arranged to first use power from the solar array power module 2308 to meet as much of the load as possible. In the example, the voltage set-points are also arranged to use power from the auxiliary generator power module 2310 and last of all from the grid power module 2312 to meet the rest of the load.

The prioritization process, in some embodiments, may include the following process of providing enough power to meet a given load applied to the DC bus 2302 through module 2316. It should be noted that the set-point values given are given for exemplary purposes. In various embodiments, the set-point values may differ or the prioritization of power sources may differ. In some embodiments, a load reduces the DC bus 2302 voltage. The solar power array module 2308, which is set at the highest voltage set-point, attempts to bring the DC bus 2302 voltage up to its set-point by providing increasing amounts of power until either 1) the load is met or 2) all the available solar power is connected to DC bus 2302. In this embodiment the set-point of the solar power array module 2308 is 395 VDC. If the DC bus 2302 voltage rises too high, an overvoltage set-point may be reached and the system 2300 may shut off. This set-point is at 400 VDC in FIG. 44. If the DC bus 2302 voltage drops below the set-point for the auxiliary generator power module 2310, then in some embodiments, increasing amounts of power may be supplied to the DC bus 2302 from a generator via the auxiliary generator power module 2310. The amount of power supplied may be increased until DC bus 2302 voltage holds at the auxiliary generator power module 2310 voltage set-point. In this embodiment the auxiliary generator power module 2310 set-point voltage is 390 VDC. If the solar array power module 2308 and the auxiliary generator power module 2310 cannot meet the load, then the DC bus 2302 voltage may drop to the grid power module 2312 set-point. If the DC bus 2302 voltage drops to this set-point the grid power module 2312 will provide increasing amounts of power to attempt to hold the DC bus 2302 voltage at the grid power module 2312 voltage set-point. In this embodiment, the voltage set-point for the grid power module 2312 is 385 VDC. As mentioned above, these set-point values or the priority assigned to each power source may differ.

If the load is reduced, the grid power module 2312 will reduce the amount of power it provides to hold the DC bus 2302 voltage at 385 VDC until it is providing zero power. If the load is further reduced, excess power from the DC bus 2302 may flow onto a power grid via the grid power module 2312 if the modular power conversion system 2300 and power grid is so configured.

If needed or desirable, power may also be drawn from a battery bank via a battery power module 2314. If, for example, other power sources are unavailable (e.g. power grid failure, nighttime, no fuel for generator, etc.) the battery power module 2314 may serve to provide back-up power from a battery bank. The set-point for the battery power module is 300 VDC in FIG. 44. If the DC bus 2302 voltage is above this set-point, the modular power conversion system 2300 may be configured such that the battery power module 2314 does not supply power, but rather absorbs power by charging a battery bank. In some embodiments, the battery power module 2314 may continue to absorb more power until the voltage of the battery bank rises up to the charging limits of the battery bank.

The set-points may be controlled by the controller 2306 and may be changed from moment to moment. In some embodiments, if the price of grid power varies enough that power from a generator may from time to time be cheaper, the controller 2306 may switch the voltage set-points of the auxiliary generator power module 2310 and the grid power module 2312 to maximize the amount of power being provided from the cheapest sources for any moment in time thus minimizing the total cost of electricity.

This is one embodiment of controlling the prioritization of power resources through the operating voltage set-point of various modules. Other modules may be included in other embodiments. For example, the modular power conversion system 2300 may include power modules for any of a variety of other power sources, such as, though not limited to wind, hydro, or thermal power sources.

In some embodiments, various circuits may also be prioritized within a kiosk for resource distribution 10. In such embodiments, the power may flow to the highest priority circuits first and when the load of the highest priority circuits is met, power may then be supplied to secondary and tertiary circuits. This may allow various, less important or less critical loads to be shut off in favor of more important ones when there is not enough power available to meet demands of all loads. Referring now also to FIGS. 42A-C, power to the exterior lights 2246 for a kiosk for resource distribution 10 may, for example, be placed on a low priority circuit since they are relatively non-essential. A medical refrigerator, on the other hand, may be placed on the highest priority circuit since an undesired shut down of such a refrigerator could ruin medical supplies stored therein.

Figure 45:
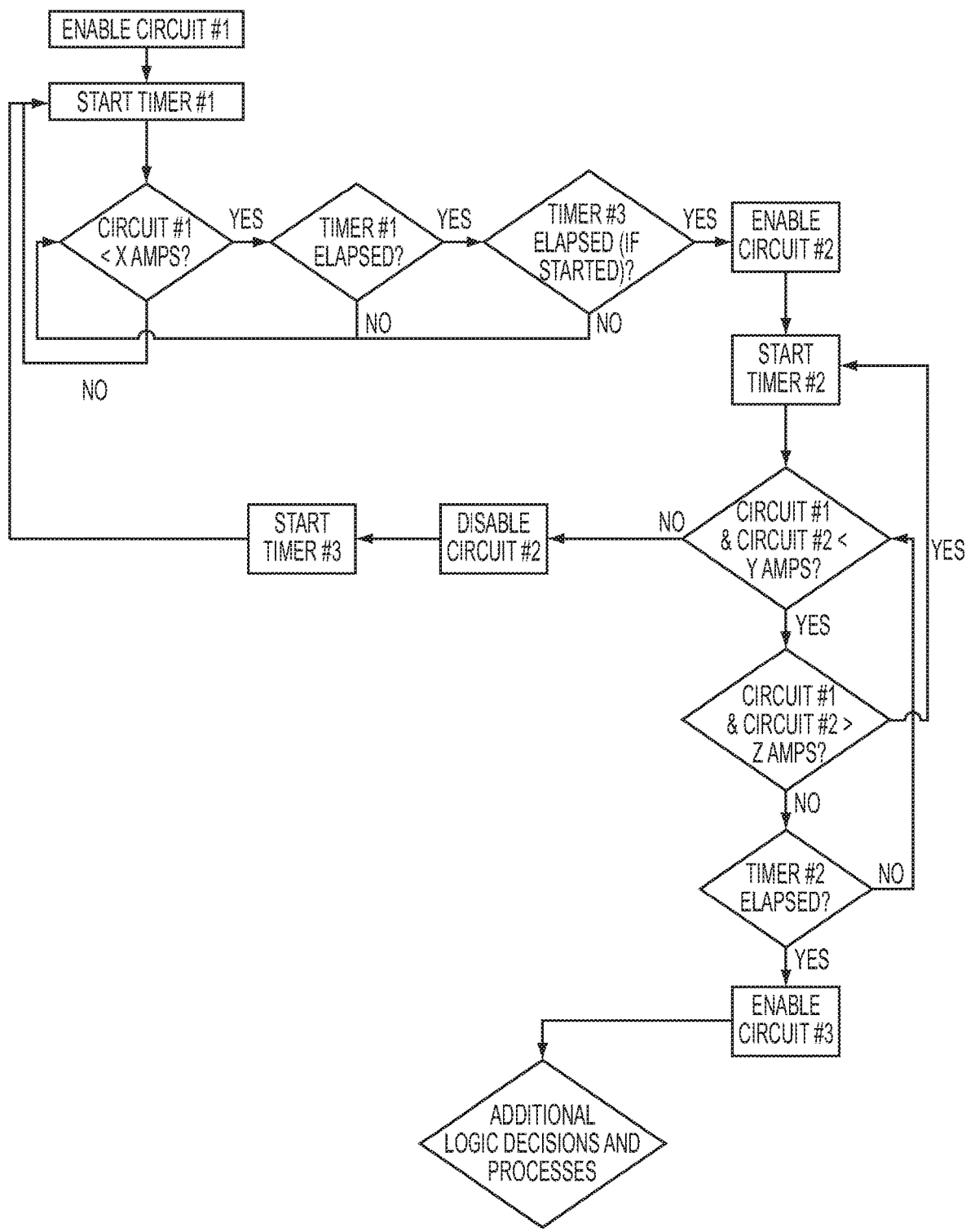
FIG. 45 is a diagram of an electrical circuit prioritization scheme in accordance with one embodiment of the present disclosure.

Referring now also to FIG. 45, a basic example of such a prioritization scheme is depicted conceptually in flowchart form. As shown the flowchart begins with a first, primary circuit enabled. After the primary circuit is enabled, a first timer is started. As shown, such a scheme may check the current draw from the primary circuit to determine if it is less than a first predetermined set-point. If it is not less than a first predetermined set-point, only the primary circuit is provided power and the first timer is restarted. A user may place essential loads or their most important loads on this circuit to ensure that when power is available that power demands of these loads will be satisfied first.

If the current draw is less than the first set-point, the system may check to see that a first timer has elapsed. The first timer may be set to ensure that the current being drawn by the first circuit is not changing. If the first timer has elapsed and a third timer (described later) has not been started, a secondary circuit may be powered. Less important loads may be placed on a secondary circuit. When the second circuit is enabled, a second timer may be started. The system may then check to see if the current draw of the first and second circuit combined is less than a second predetermined set-point.

If the sum of the current being drawn by the first and second circuit is not less than the second predetermined set-point, the system may disable the second circuit, start a third timer, and restart the first timer. This effectively restarts the decision tree. If the sum of the current being drawn by the first and second circuits is less than the second predetermined set-point, the system may check to see if this sum is greater than a third predetermined set-point. If the sum is greater than this third set-point, the system may restart the second timer and may continue to check the sum against the second and third set-points until the current being drawn is not less than the second set-point and if less, check that the sum is not greater than the third set-point. If the current being drawn by the first and second circuit is found not to be less than the second set-point, the system may act as described above in relation to such a scenario. If the current being drawn by the first and second circuits is not greater than the third predetermined set-point, the system may check to see if the second timer has elapsed. This may help ensure that the current being drawn is not changing.

If the second timer has elapsed, the system may allow power to flow to a third circuit. The least important or most non-essential loads may be placed on such a third, or tertiary circuit. The tertiary circuit may only be supplied power when power in addition to that needed to supply the primary and secondary circuits is available. Decision logic for the third circuit is not shown. As would be obvious to one skilled in the art, one could follow decision logic similar to that shown to control the tertiary circuit. As would also be obvious to one skilled in the art, other circuits such as a fourth or fifth circuit may also be added to the system using similar decision logic.

Additionally, some circuits may be arranged to behave in a manner which increases the efficiency of those circuits. A kiosk for resource distribution 10 may have a circuit which cycles off or periodically cycles off at certain times of day, for example, at night. A load such as a general purpose refrigerator may be placed on such a circuit. Other loads, such as those that draw standby power, may also be placed on such a circuit. By switching off such devices at night when instant-on capabilities are less important, a user may save about 9 kWh a year per watt of continuous standby power which would have otherwise needed to be produced and consumed.

Some circuits may be configured to only be powered during the day when solar power is being produced. In a kiosk for resource distribution 10 a user may plug a source water pump 130 (see FIG. 40A for example) and/or a product water distribution pump 2116 (see FIG. 40A for example) may be placed on such a circuit. This may help to ensure that periods of high load are also periods of peak power generation. By only powering a product water distribution pump 2116 during the day, a user may also help to prevent theft of product water.

Various power outlets, electrical wiring, breaker box components, etc. may include an indicator which may be understood by a user as denoting the priority level or behavior of the circuit they are a part of. In some embodiments, the outlets and or other electrical components may be color coded by priority level or behavior. In some embodiments, the outlets may include a numeric or text indicator identifying the priority or behavior of the circuit they belong to. Other indicators may also be utilized.

Figure 46:
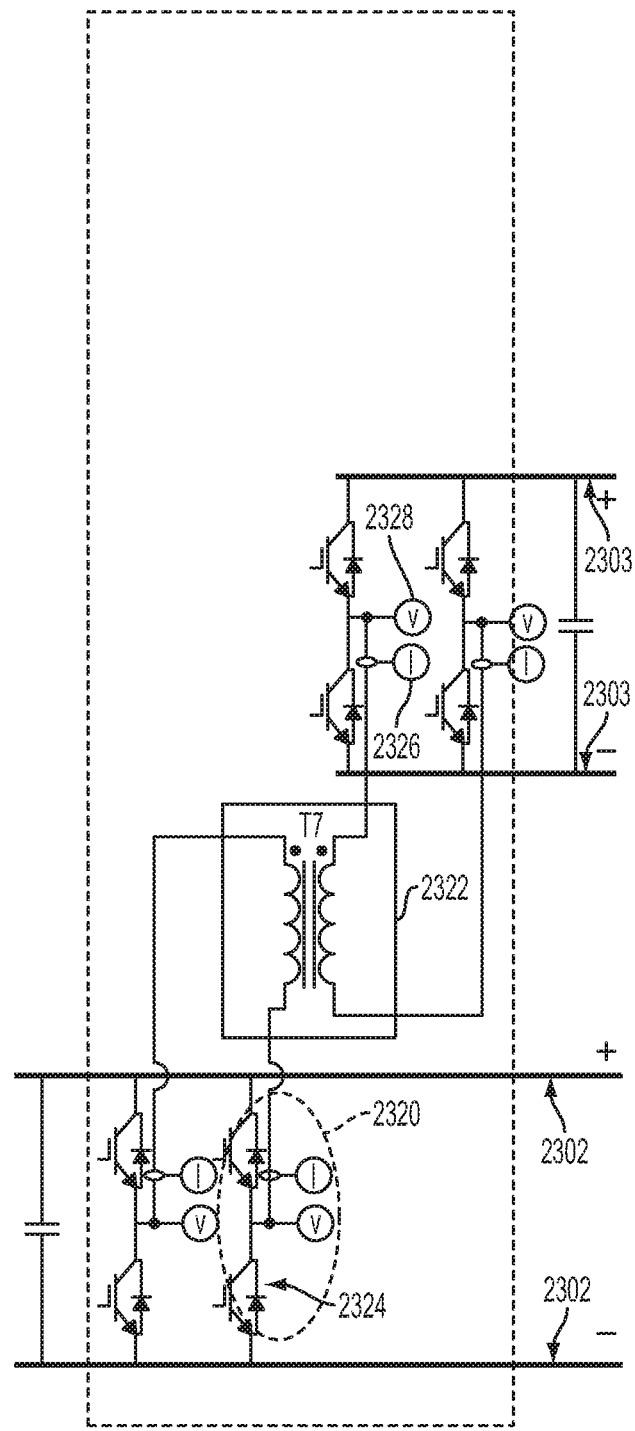
FIG. 46 is a topology of a portion of a modular power conversion system in accordance with one embodiment of the present disclosure.

A hardware topology to connect a DC bus 2302 to an electrically isolated second DC bus 2303 is shown in FIG. 46. The topology of FIG. 46 allows power to flow in both directions. The second DC bus 2303 may be at a higher or lower voltage than the first DC Bus 2302. Two half bridges 2320 may be connected across each DC bus 2302, 2303 and the midpoints of each pair connected across the one side of a transformer 2322. A DSP may (not shown) control the IGBTs 2324 to boost the voltage up or buck the voltage down as needed. The DSP may control the opening and closing of the IGBTs 2324 based on an algorithm known in the art and the current measured by sensors 2326 or voltage measured by sensors 2328.

The topology shown in FIG. 46 allows multiple DC buses at different voltages to which the modules can attach. It may be less expensive or more efficient to attach one or more modules to a DC bus at a different voltage than the main DC bus 2302. It may also be beneficial to provide a DC bus and and/or power supply that is isolated from main DC bus 2302. The multiple DC buses may allow the system architecture of a modular power conversion system 2300 to be optimized for minimum cost and/or maximum efficiency.

Figure 47:
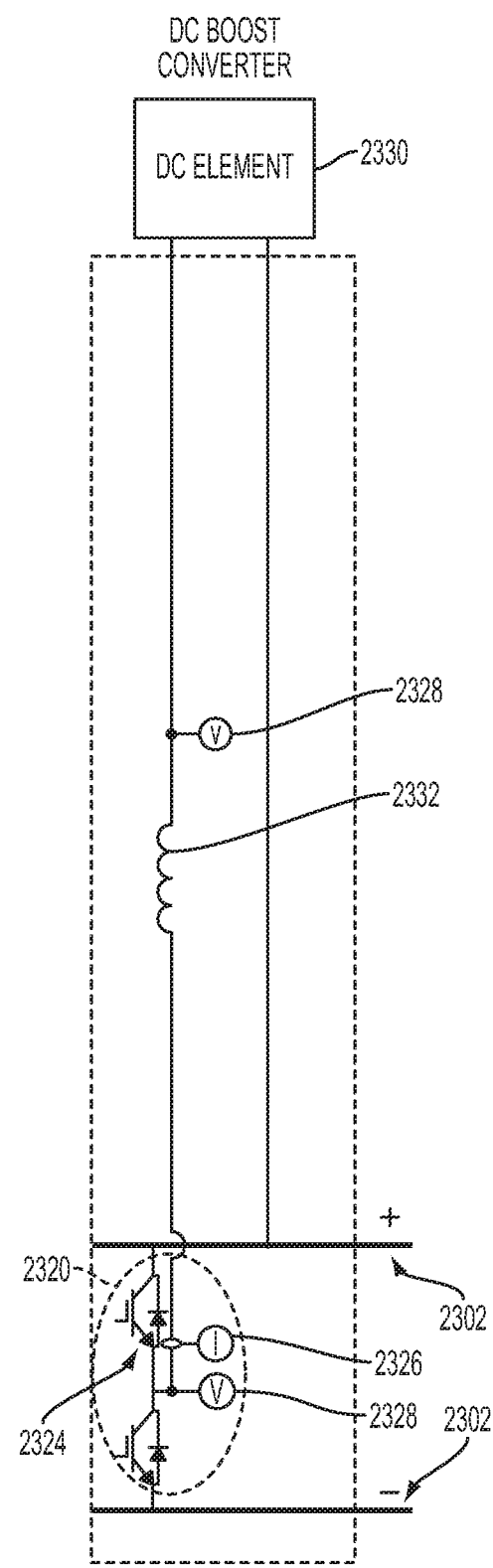
FIG. 47 is a topology of a portion of a modular power conversion system in accordance with one embodiment of the present disclosure.

Referring now also to FIG. 47, an embodiment of the hardware topology of part of a modular power conversion system 2300 that connects a DC element 2330 to the higher voltage DC bus 2302 is shown. In the embodiments shown, the DC element 2330 is connected via an inductor 2332 and one half bridge 2320 to the high and low sides of the DC bus 2302. The IGBT's 2324 are controlled by a DSP (not shown) based on the high speed measurements by voltage sensor 2328 to boost the voltage of the DC element 2330 to the DC bus 2302 voltage. The DSP control algorithm to boost the voltage may be one that is known in the art. The DC element 2330 may be one or more of, but not limited, the following sources: battery bank, photovoltaic array, and/or fuel cell.

In some embodiments, a modular power conversion system 2300 such as that shown in FIG. 43 may supply power to a DC electrical system and an AC electrical system. In one specific example, a modular power conversion system 2300 may supply power, in DC form, to a water distillation device in a kiosk for resource distribution 10. Other DC powered equipment may also be a part of such a system. If a kiosk for resource distribution 10 is configured such that the power it supplied to various loads was in the form of AC only, a high voltage DC load, such as a water distillation device, would increase the overall cost of the system by creating the need for extra equipment and components which are configured to handle high voltages. In embodiments with such a DC system, the water distillation device may be placed as close to the modular power conversion system 2300 as possible. This may help to minimize the cost of cabling to the DC load or loads. In some embodiments, a water distillation device may be the DC element 2330 called out in FIG. 48.

Figure 48:
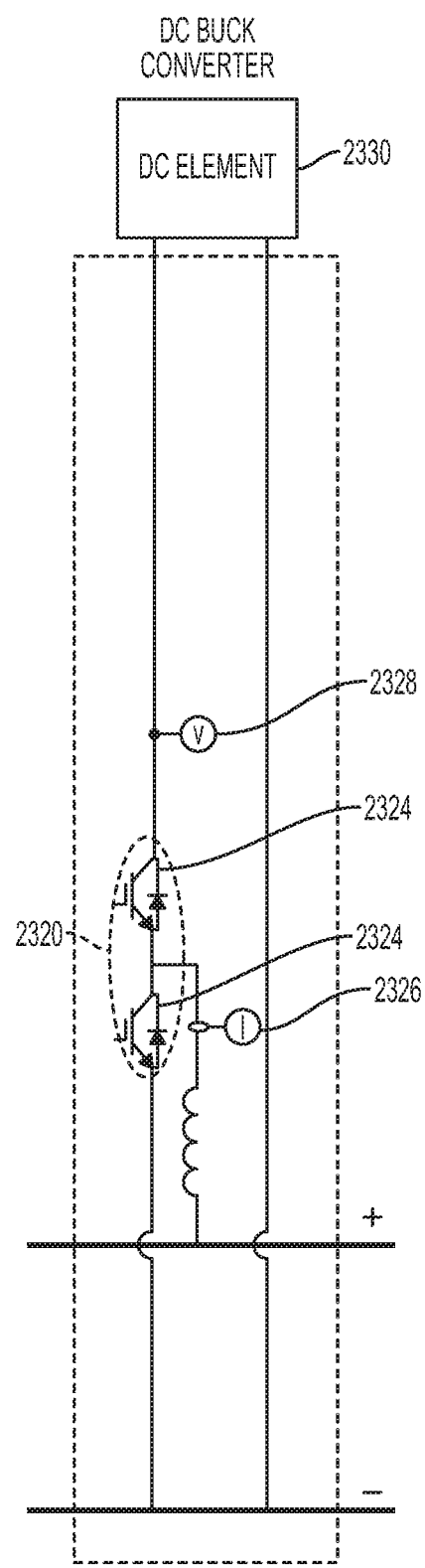
FIG. 48 is one embodiment of a DC Buck Converter.

FIG. 48 shows another embodiment which connects a DC element to the higher voltage DC bus 2302. In FIG. 48, the half bridge 2320 is connected to the DC Element 2330 on one side and the low side of the DC bus 2302 on the other. The midpoint of the half bridge 2320 is connected to the high side of the DC bus 2302 via an inductor 2332. A DSP (not shown) controls the opening and closing of the IGBTs 2324 based on an algorithm known in the art and the current measured by sensor 2326, or voltage measured by sensor 2328.

The system 2300, modules, set-points, priority levels, etc. shown and described in relation to FIG. 43-FIG. 48 are examples of embodiments of a modular power conversion system 2300. Other arrangements of components, other components and voltages are contemplated in and are considered to be within the scope of this disclosure. Additionally, various power and electrical systems for a kiosk for resource distribution 10 may not include some of the components described in relation to FIG. 43-FIG. 48.

Various alternatives and modifications may be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in the drawings are presented only to demonstrate certain examples of the disclosure. The drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present disclosure, the only relevant components of the device are A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for the distribution of resources comprising:
   a housing comprising:
      at least one power generation source connected to the housing;
      a power control and distribution system; and
      at least one water distillation system, the system comprising:
         a first product reservoir;
         at least one source reservoir; and
         a first plumbing line connected to the water distillation device, the first plumbing line feeds into a second plumbing line, wherein the second plumbing line is connected to the first product reservoir,
         wherein water from the at least one source reservoir is distilled by the water distillation device to produce product water, and
         wherein the first plumbing line is located higher in elevation than the second plumbing line,
   wherein power from the at least one power generation source powers the at least one water distillation device.

2. The system of claim 1, further comprising:
   a power control and distribution system comprising:
      power control and distribution hardware comprising:
         at least one inverter;
         at least one battery charge controller; and
         a breaker panel,
   wherein power from the at least one power generation source powers the at least one water distillation device.

3. The system of claim 2, wherein the at least one power generation source is a Stirling generator.

4. The system of claim 2, wherein the at least one power generation source is at least one solar panel.

5. The system of claim 2, further comprising at least one communications tower.

6. The system of claim 2, further comprising a charging station configured to charge at least one portable power source.

7. The system of claim 1, wherein the second plumbing line comprising a valve.

8. The system of claim 1, further comprising a second product reservoir.

9. The system of claim 8, further comprising a third plumbing line connected to the first plumbing line and the second product reservoir.

10. The system of claim 9, wherein the third plumbing line comprising a valve.

11. The system of claim 1, wherein the first product reservoir comprising a water liquid level sensor.

12. The system of claim 1, wherein the first product reservoir comprising a water line connected to a check valve.

13. The system of claim 1, wherein the at least one source reservoir comprising at least two liquid level sensors.

14. The system of claim 1, further comprising at least one energy storage device.

15. The system of claim 14, wherein the at least one energy storage device is a battery bank.

16. A water distillation system comprising:
   a first product reservoir;
   at least one source reservoir;
   a water distillation device, wherein water from the at least one source reservoir is distilled by the water distillation device to produce product water;
   a source water pump, wherein the source water pump pumps source water into the source water reservoir; and
   a first plumbing line connected to the water distillation device, the first plumbing line feeds into a second plumbing line, wherein the second plumbing line is connected to the first product reservoir,
   wherein the first plumbing line is located higher in elevation than the second plumbing line.

17. The system of claim 16, further comprising a second product reservoir.

18. The system of claim 17, further comprising a third plumbing line connected to the first plumbing line and the second product reservoir.

19. The system of claim 16, wherein the first product reservoir comprising a water liquid level sensor.

20. The system of claim 19, wherein the first product reservoir comprising a water line connected to a check valve.

* * * * *